(12) United States Patent
Noh et al.

(10) Patent No.: US 12,158,596 B2
(45) Date of Patent: Dec. 3, 2024

(54) CAMERA DEVICE

(71) Applicant: LG INNOTEK CO., LTD., Seoul (KR)

(72) Inventors: Yun Ho Noh, Seoul (KR); Kap Jin Lee, Seoul (KR); Hyun Soo Kim, Seoul (KR); Tae Bong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 373 days.

(21) Appl. No.: 17/618,592

(22) PCT Filed: Jun. 17, 2020

(86) PCT No.: PCT/KR2020/007840
§ 371 (c)(1),
(2) Date: Dec. 13, 2021

(87) PCT Pub. No.: WO2020/256404
PCT Pub. Date: Dec. 24, 2020

(65) Prior Publication Data
US 2022/0357487 A1 Nov. 10, 2022

(30) Foreign Application Priority Data

Jun. 18, 2019 (KR) .......... 10-2019-0072231
Jun. 18, 2019 (KR) .......... 10-2019-0072232
Jun. 18, 2019 (KR) .......... 10-2019-0072233

(51) Int. Cl.
*G02B 3/14* (2006.01)
*G03B 17/12* (2021.01)

(52) U.S. Cl.
CPC .............. *G02B 3/14* (2013.01); *G03B 17/12* (2013.01)

(58) Field of Classification Search
CPC . G02B 3/14; G02B 7/021; G02B 7/08; G02B 26/004; G02B 27/646; G02B 3/12;
(Continued)

(56) References Cited

U.S. PATENT DOCUMENTS 9,807,286 B2 * 10/2017 Kim .................. G03B 9/08
2008/0037973 A1 * 2/2008 Jung .................. G03B 13/32
396/89

(Continued)

FOREIGN PATENT DOCUMENTS

CN 101331753 A1 12/2008
CN 108540696 A 9/2018
(Continued)

*Primary Examiner* — Darryl J Collins
*Assistant Examiner* — Matthew Y Lee
(74) *Attorney, Agent, or Firm* — Birch, Stewart, Kolasch & Birch, LLP

(57) ABSTRACT

The present embodiment relates to a camera device comprising: a holder having a groove formed on an upper surface thereof; a lens holder coupled to the holder; a variable lens part disposed in the lens holder; a holder terminal disposed on the holder; a first connection terminal coupled to the variable lens part; and a conductive member disposed in the groove, wherein a portion of the first connection terminal extends to the outside of the variable lens part and is electrically connected by means of the holder terminal and the conductive member.

20 Claims, 42 Drawing Sheets

(58) Field of Classification Search
CPC .... G02B 2207/115; G02B 7/04; G02B 7/023;
G02B 7/09; G03B 17/12; G03B 30/00;
G03B 2205/0053; G03B 3/10; G03B
13/36; G03B 13/32; G03B 2205/0061;
G03B 2205/0084; G03B 2217/002; G03B
2205/0015; G03B 5/00; G03B 17/02;
G03B 2205/0069; G03B 2205/0007;
H04N 23/00; H04N 23/55; H04N 23/57
See application file for complete search history.

(56) References Cited

U.S. PATENT DOCUMENTS

| | | | |
|---|---|---|---|
| 2008/0165427 A1* | 7/2008 | Tseng | G02B 13/006 |
| | | | 359/666 |
| 2008/0225403 A1 | 9/2008 | Weekamp et al. | |
| 2011/0304762 A1* | 12/2011 | Chiu | G02F 1/29 |
| | | | 348/335 |
| 2014/0362243 A1* | 12/2014 | Han | G03B 13/36 |
| | | | 348/208.12 |
| 2015/0146073 A1 | 5/2015 | Kim | |
| 2016/0274328 A1 | 9/2016 | Shin et al. | |
| 2018/0039157 A1* | 2/2018 | Lee | H02K 41/0356 |

FOREIGN PATENT DOCUMENTS

| | | |
|---|---|---|
| EP | 2 390 720 A2 | 11/2011 |
| JP | 2007-140417 A | 6/2007 |
| JP | 2011-20207 A | 2/2011 |
| KR | 10-2008-0014274 A | 2/2008 |
| KR | 10-2013-0124671 A | 11/2013 |
| KR | 10-2016-0081243 A | 7/2016 |
| KR | 10-2017-0129532 A | 11/2017 |
| KR | 10-2018-0084435 A | 7/2018 |
| KR | 10-2018-0088080 A | 8/2018 |
| KR | 10-1908658 B1 | 12/2018 |

* cited by examiner

CAMERA DEVICE

CROSS REFERENCE TO RELATED APPLICATIONS

This application is the National Phase of PCT International Application No. PCT/KR2020/007840, filed on Jun. 17, 2020, which claims priority under 35 U.S.C. 119(a) to Patent Application Nos. 10-2019-0072231, 10-2019-0072232 and 10-2019-0072233, all filed in the Republic of Korea on Jun. 18, 2019, all of which are hereby expressly incorporated by reference into the present application.

TECHNICAL FIELD

The present embodiment relates to a camera device.

BACKGROUND ART

The content described below provides background information on the present embodiment and does not describe the prior art.

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, an autofocus function for automatically adjusting a focus according to a distance of a subject is applied to a recent camera device. In addition, a hand shake correction function that prevents the image from being shaken due to hand shake of the photographer is applied.

In recent years, liquid lens whose shape is deformed according to the application of electric current to perform an autofocus function or a handshake correction function is undergoing development. Furthermore, there is a growing demand for size reduction in a camera device equipped with a liquid lens.

Meanwhile, the variable lens may be disposed to be spaced apart from the substrate, and in this case, an electrical conduction structure for electrically conducting the variable lens with the substrate is required.

DETAILED DESCRIPTION OF THE INVENTION

Technical Subject

An object of the present embodiment is to provide a camera device having a minimized size in a direction perpendicular to an optical axis.

An object of the present embodiment is to provide a camera device comprising an electrical conduction structure for electrically conducting a variable lens with a substrate.

Technical Solution

A camera device according to a first embodiment of the present invention comprises: a holder having a groove formed on an upper surface thereof; a lens holder coupled to the holder; a variable lens part disposed in the lens holder; a holder terminal disposed in the holder; a first connection terminal coupled to the variable lens part; and a conductive member disposed in the groove, wherein a portion of the first connection terminal extends outside the variable lens part so as to be electrically connected to the holder terminal by the conductive member.

The variable lens part may be any one among a liquid lens, a polymer lens, a liquid crystal lens, a voice coil motor (VCM) actuator, a shape memory alloy (SMA) actuator, and a micro electro mechanical systems (MEMS) actuator.

The variable lens part may comprise a liquid lens and a liquid lens holder coupled to the liquid lens.

A camera device according to a first embodiment of the present invention comprises: a holder; a lens holder coupled to the holder; a variable lens part disposed in the lens holder and comprising a variable lens; a holder terminal disposed on the holder; and a first connection terminal coupled to the variable lens part and electrically connected to the holder terminal, wherein the first connection terminal may comprise a first region disposed on one side of the variable lens part and electrically connected to the variable lens, and a second region being extended from the first region in an optical axis direction and electrically coupled to the holder terminal.

The first connection terminal may comprise a first terminal disposed in a first corner region of the variable lens and a second terminal disposed in a second corner region of the variable lens.

The second region of the first connection terminal may be exposed from a lateral surface of the variable lens part and being extended further below than a lower surface of the variable lens part.

The first region of the first connection terminal may be exposed on an upper surface of the variable lens part, and the second region of the first connection terminal may be bent and being extended from the first region of the first connection terminal.

The holder comprises a groove, and a portion of the second region of the first connection terminal is disposed in the groove and may be coupled to the holder terminal by a conductive member.

A second connection terminal disposed on the other side of the variable lens part is comprised, wherein the second connection terminal may comprise: a first region disposed on an upper surface of the variable lens part; a second region being extended from the first region of the second connection terminal and disposed on a lateral surface of the variable lens part; and a third region being extended from the second region of the second connection terminal in a direction perpendicular to the optical axis direction and being overlapped with a part of the holder terminal in the optical axis direction.

The variable lens part comprises a variable lens, and the first region of the first connection terminal may be coupled to an individual terminal of the variable lens.

The variable lens part may comprise a variable lens holder coupled to the variable lens, and the first region of the first connection terminal may be extended to the inner side of the variable lens holder.

The second connection terminal may not be overlapped with the lens holder in a direction perpendicular to the optical axis direction.

It may comprise a connection terminal coupled to the terminal of the variable lens, and a third connection terminal electrically coupled to the connection terminal.

The third connection terminal may comprise a first region electrically coupled to the connection terminal, a second region disposed in the variable lens part, and a third region being protruded to the outer side of the variable lens part.

The first region of the third connection terminal and the connection terminal may be exposed to face each other.

The first region of the third connection terminal is connected to the second region of the third connection terminal, and the second region of the third connection terminal may be connected to the third region of the third connection terminal.

The second region of the third connection terminal may have a U-shape.

The second region of the third connection terminal may be connected to the first region of the third connection terminal and the third region of the third connection terminal.

The first region of the third connection terminal and the third region of the third connection terminal may be bent from the second region of the third connection terminal.

The first connection terminal may be extended to the outer side of the variable lens part and be electrically connected to the holder terminal by a conductive member.

At least a portion of the second region of the first connection terminal may be overlapped with the lens holder in a direction perpendicular to the optical axis direction.

The variable lens part comprises a variable lens holder and a variable lens disposed inside the variable lens holder, the first region of the first connection terminal comprises a first portion disposed on the variable lens holder and a second portion being extended inwardly from the first portion and connected to the terminal of the variable lens, and the second region of the first connection terminal may be extended downwardly from a portion of the first portion of the first region of the first connection terminal.

The first connection terminal may not be protruded to the outer side than the variable lens holder.

The first region of the first connection terminal may not be overlapped with the holder in a direction perpendicular to the optical axis direction.

A part of the holder may be disposed between the lens holder and the second region of the first connection terminal in a direction perpendicular to the optical axis direction.

The lens holder comprises a groove formed at a corner of the lens holder to expose a portion of the upper surface of the variable lens part, and an adhesive for fixing the variable lens part to the lens holder may be disposed in the groove of the lens holder.

A plurality of lenses disposed on the lens holder is comprised, and the variable lens may be disposed between the plurality of lenses.

The holder terminal is integrally formed in the holder by insert injection, the first connection terminal is integrally formed in the variable lens part by insert injection, and the conductive member may comprise Ag epoxy.

A lateral surface of a portion of the first connection terminal may be disposed on the same plane as a lateral surface of the variable lens part.

A camera device according to a first embodiment of the present invention comprises a holder; a lens holder coupled to the holder; a plurality of lenses disposed on the lens holder; a variable lens disposed between the plurality of lenses; a variable lens holder coupled to the variable lens; a holder terminal disposed on the holder; and a first connection terminal disposed on the variable lens holder and electrically connecting the variable lens and the holder terminal, wherein the holder comprises a groove being formed by recessing an upper surface of the holder, the lens holder comprises a hole penetrating the lens holder in a direction perpendicular to the optical axis direction, and the variable lens is disposed in the hole of the lens holder, wherein the hole of the lens holder comprises a bottom surface opposite to the lower surface of the variable lens, wherein the first connection terminal comprises a first region disposed on the variable lens holder and electrically connected to the variable lens, and a second region being extended from the first region in the optical axis direction and electrically coupled to the holder terminal, and wherein at least a portion of the second region of the first connection terminal may be extended below the bottom surface of the hole of the lens holder.

A camera device according to a second embodiment of the present invention comprises: a variable lens holder; a variable lens disposed in the variable lens holder; and a connection terminal disposed on the variable lens holder and electrically connected to the variable lens, wherein the variable lens comprises a first terminal disposed on a first surface of the variable lens and a second terminal disposed on a second surface opposite to the first surface of the variable lens, wherein the connection terminal comprises a first connection terminal electrically connected to the first terminal of the variable lens, and a second connection terminal electrically connected to the second terminal of the variable lens, and wherein the second connection terminal comprises: a first region disposed along a first surface of the variable lens holder corresponding to the first surface of the variable lens; a second region bent in the first region and disposed along a lateral surface of the variable lens holder; and a third region bent in the second region and being extended to the outer side of the variable lens holder.

A third connection terminal connecting the second terminal of the variable lens and the second connection terminal is comprised, the first terminal of the variable lens comprises a plurality of first terminals, the second terminal of the variable lens comprises a plurality of second terminals, the first connection terminal is provided in a number corresponding to the plurality of first terminals and is electrically connected to the plurality of first terminals by matching pairs, and at least some of the plurality of second terminals of the variable lens may be electrically connected to the third connection terminal.

A first conductive member connecting the second connection terminal and the third connection terminal is comprised, an outer surface of the second region of the second connection terminal is exposed to the outside, and the third connection terminal can be connected via an inner surface of the second region of the second connection terminal and the first conductive member.

The first conductive member may connect the third connection terminal to the second region and the third region of the second connection terminal.

The third region of the second connection terminal may be extended to a height corresponding to the second surface of the variable lens holder.

The first region of the second connection terminal may be connected to one end of the second region of the second connection terminal, and the third region of the second connection terminal may be connected to the other end of the second region of the second connection terminal.

The second region of the second connection terminal may have a shape not being overlapped in a direction perpendicular to the optical axis.

The second region of the second connection terminal is extended downward from the first part of the outer circumference of the first region, the second connection terminal comprises a fourth region being extended downward from a second part of the outer circumference of the first region and comprising a hook shape, and the fourth region may be shorter than the second region in a direction parallel to the optical axis.

The camera device comprises: a holder; a holder terminal disposed on the holder; a lens holder disposed on the holder; and a plurality of lenses coupled to the lens holder, wherein the variable lens is disposed between the plurality of lenses, and wherein the connection terminal may electrically connect the variable lens and the holder terminal.

The holder terminal comprises a second conductive member exposed on an upper surface of the holder and disposed on the holder terminal, and the third region of the second connection terminal may be connected to the second conductive member.

A camera device according to a second embodiment of the present invention comprises: a variable lens holder; a variable lens disposed in the variable lens holder; and a connection terminal disposed on the variable lens holder and electrically connected to the variable lens, wherein the variable lens comprises; a first terminal disposed on an upper surface of the variable lens; and a plurality of second terminals disposed on a lower surface of the variable lens, wherein the connection terminal comprises: a first connection terminal electrically connected to the first terminal of the variable lens; a second connection terminal electrically connected to the second terminal of the variable lens; and a third connection terminal connecting the second terminal of the variable lens and the second connection terminal, wherein at least some of the plurality of second terminals are electrically connected to the third connection terminal, wherein the second connection terminal comprises: a first region extending along the upper surface of the variable lens holder; a second region extending from the first region toward the lower surface of the variable lens holder; and a third region extending from the second region to the outside of the variable lens holder, and wherein an outer surface of the second region of the second connection terminal may be exposed, and an inner surface of the second region of the second connection terminal may be connected to the third connection terminal through a conductive member.

A camera device according to a third embodiment of the present invention comprises: a holder; a lens holder coupled to the holder; a variable lens disposed on the lens holder; a variable lens holder coupled to the variable lens; a holder terminal disposed on the holder; a first connection terminal disposed on the variable lens holder; and a second connection terminal disposed on the variable lens holder and electrically connecting the first connection terminal and the variable lens, wherein the first connection terminal may comprise a first region connected to the second connection terminal, and a second region being extended from the first region of the first connection terminal and disposed on a lateral surface of the variable lens holder.

The second connection terminal comprises: a first region connected to the terminal of the variable lens; a second region connected to the first region of the first connection terminal; and a third region being extended from the second region of the second connection terminal and being protruded outward than the variable lens holder, wherein the third region of the second connection terminal may be extended straight in a horizontal direction to be connected to the holder terminal by a conductive member.

The holder comprises: a side wall being overlapped with the variable lens holder in a horizontal direction; and a groove formed in the upper surface of the side wall, wherein the holder terminal comprises: a first region disposed on the outer surface of the sidewall of the holder; a second region connected to the first region of the holder terminal and disposed on the inner surface of the side wall of the holder; a third region connected to the second region of the holder terminal and disposed on the bottom surface of the groove of the holder, and wherein the conductive member is disposed in the groove of the holder and may be connected to at least one of the second region and the third region of the holder terminal.

An upper surface of the third region of the second connection terminal may be disposed on the same plane as an upper surface of the second region of the second connection terminal.

The variable lens comprises: a plurality of individual terminals disposed on the upper surface of the variable lens; and a plurality of common terminals disposed on a lower surface disposed opposite to the upper surface of the variable lens, wherein the second connection terminal may comprise: a plurality of first terminals individually connected to the plurality of individual terminals of the variable lens; and a second terminal commonly connected to the plurality of common terminals of the variable lens.

The holder comprises: a side wall overlapping the variable lens holder in a horizontal direction; and a groove formed in the upper surface of the side wall, wherein a conductive member connecting the holder terminal and the second connection terminal is disposed in the groove of the holder, wherein the groove of the holder comprises: a first groove formed at a position corresponding to the plurality of first terminals; and a second groove formed at a position corresponding to the second terminal, and wherein a bottom surface of the first groove of the holder may be disposed at a position higher than a position of a bottom surface of the second groove.

The first connection terminal may be formed along the surface of the variable lens holder, and the holder terminal may be formed along the surface of the holder.

The camera device comprises: a substrate; and an image sensor disposed on the substrate, wherein the holder terminal may be connected to the terminal of the substrate by a conductive member.

A thermistor disposed on the holder is comprised, and the holder terminal may comprise a thermistor terminal electrically connecting two terminals of the thermistor to the substrate.

A camera device according to a third embodiment of the present invention comprises: a holder; a lens holder coupled to the holder; a variable lens disposed on the lens holder; a variable lens holder coupled to the variable lens; a holder terminal disposed on the holder; a first connection terminal disposed on the variable lens holder; and a second connection terminal electrically connecting the first connection terminal and the variable lens, wherein the second connection terminal comprises: a first terminal electrically connected to individual terminals disposed on the upper surface of the variable lens; and a second terminal electrically connected to a common terminal disposed on the lower surface of the variable lens, wherein each of the first terminal and the second terminal comprises a portion being extended straight in the horizontal direction and more protruded toward outer side than the variable lens holder, wherein the holder terminal comprises: a first holder terminal electrically connected to the first terminal; and a second holder terminal electrically connected to the second terminal, and wherein an upper surface of the first holder terminal facing the lower surface of the first terminal may be disposed at a position higher than a position of an upper surface of the second holder terminal facing the lower surface of the second terminal.

A camera device according to a third embodiment of the present invention comprises: a holder; a lens holder coupled to the holder; a variable lens disposed on the lens holder; a variable lens holder coupled to the variable lens; a holder terminal disposed on the holder; a first connection terminal disposed on the variable lens holder; and a second connection terminal electrically connecting the first connection terminal and the variable lens, wherein the variable lens comprises: an individual terminal disposed on a first surface of the variable lens; and a common terminal disposed on a second surface disposed at a different height from the first surface of the variable lens, wherein the second connection terminal comprises: a first terminal electrically connected to the individual terminal of the variable lens; and a second terminal electrically connected to the common terminal of the variable lens, wherein the holder comprises: a first groove formed at a position corresponding to the first terminal; and a second groove formed at a position corresponding to the second terminal, and wherein a height of the bottom surface of the first groove of the holder may be different from a height of a bottom surface of the second groove of the holder.

Advantageous Effects

Through the present embodiment, the size of a camera device in a direction perpendicular to an optical axis can be minimized.

Through the present embodiment, a substrate may supply a current to a variable lens disposed spaced apart from a substrate.

BEST MODE

Figure 1:
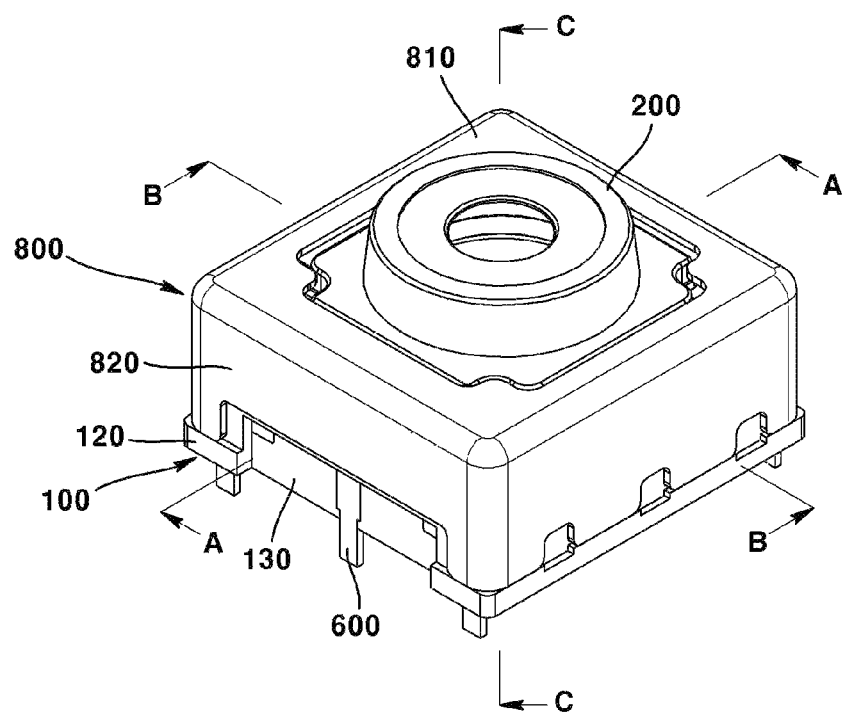
FIG. 1 is a perspective view of a partial configuration of a camera device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, the configuration of an optical apparatus according to the present embodiment will be described.

The optical apparatus may be any one among a cell phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for taking an image or a picture may be comprised in the optical apparatus.

The optical apparatus may comprise a main body. The main body may form the outer appearance of the optical apparatus. The main body can accommodate the camera device. A display unit may be disposed on one surface of the main body. For example, a display unit and a camera device may be disposed on one surface of the main body, and a camera device may be additionally disposed on the other surface (a surface positioned opposite to one surface) of the main body.

The optical apparatus may comprise a display unit. The display unit can be placed on one surface of the main body. The display unit can output an image photographed by the camera device.

The optical apparatus may comprise a camera device. The camera device can be placed on the main body. At least a part of the camera device may be accommodated inside the main body. A plurality of camera devices may be provided. The camera device may be disposed on one surface of the main body and the other surface of the main body, respectively. The camera device may photograph an image of a subject. The optical apparatus may comprise any one or more of the camera devices of the following first to third embodiments.

Hereinafter, the configuration of a camera device according to a first embodiment of the present invention will be described with reference to the drawings.

Figure 2:
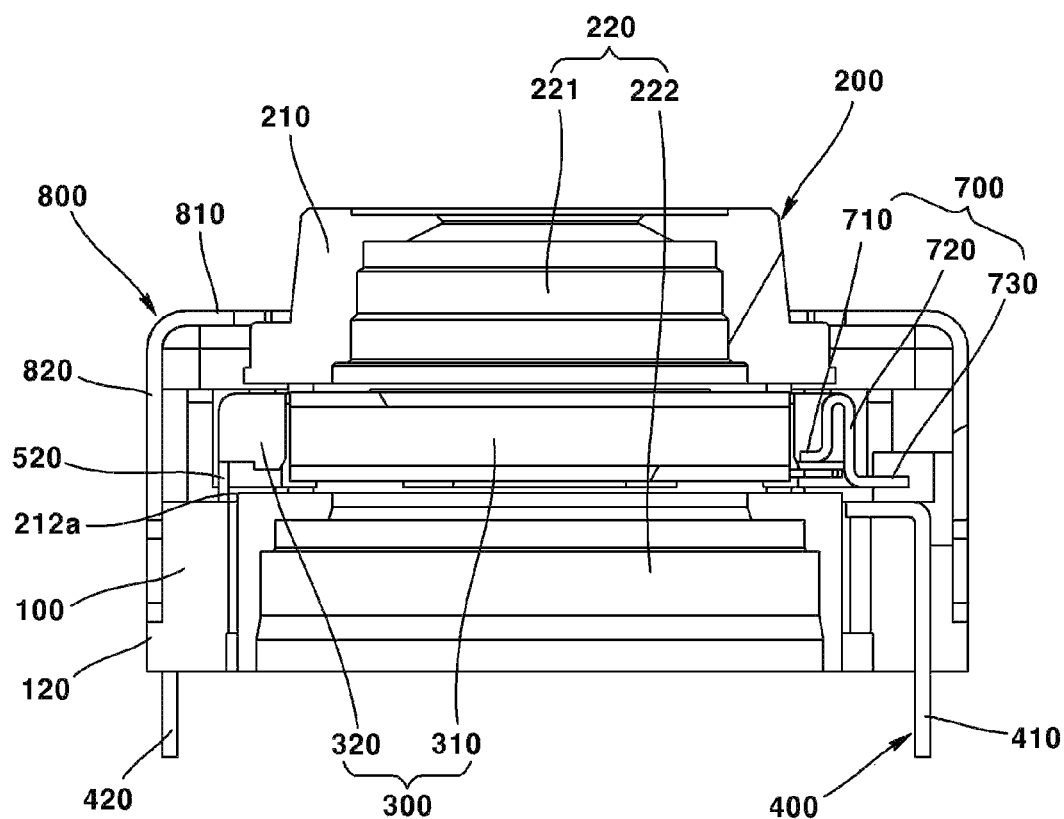
FIG. 2 is a cross-sectional view taken along line A-A of FIG. 1.
Figure 3:
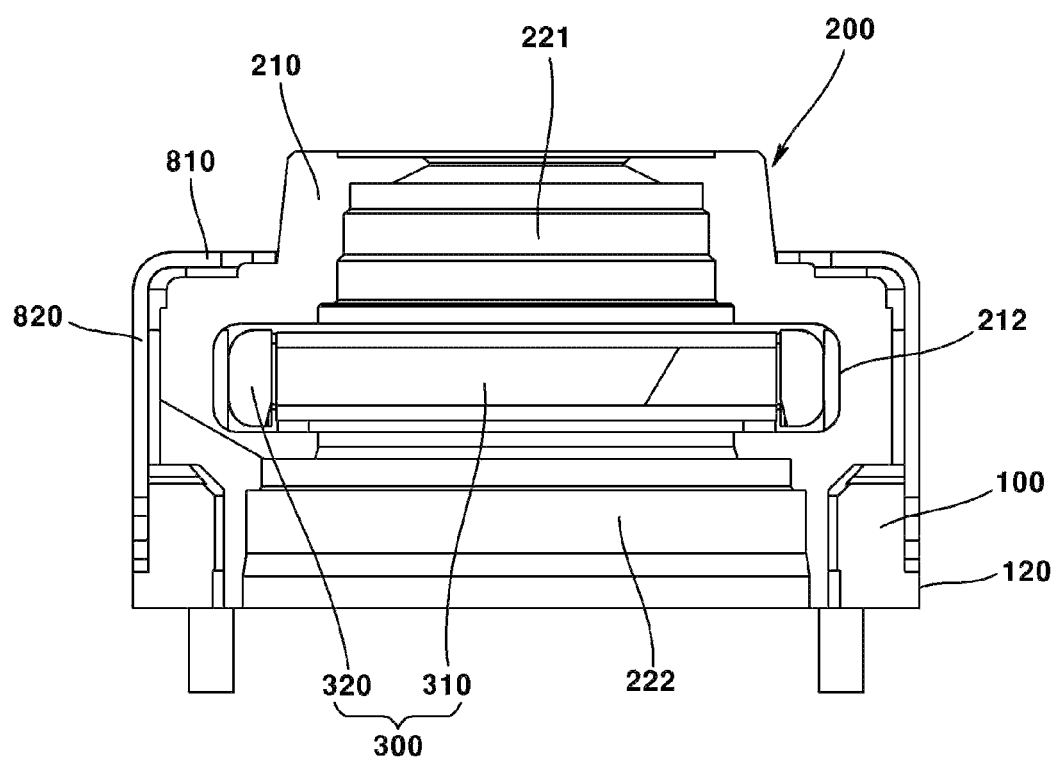
FIG. 3 is a cross-sectional view taken along line B-B of FIG. 1.
Figure 4:
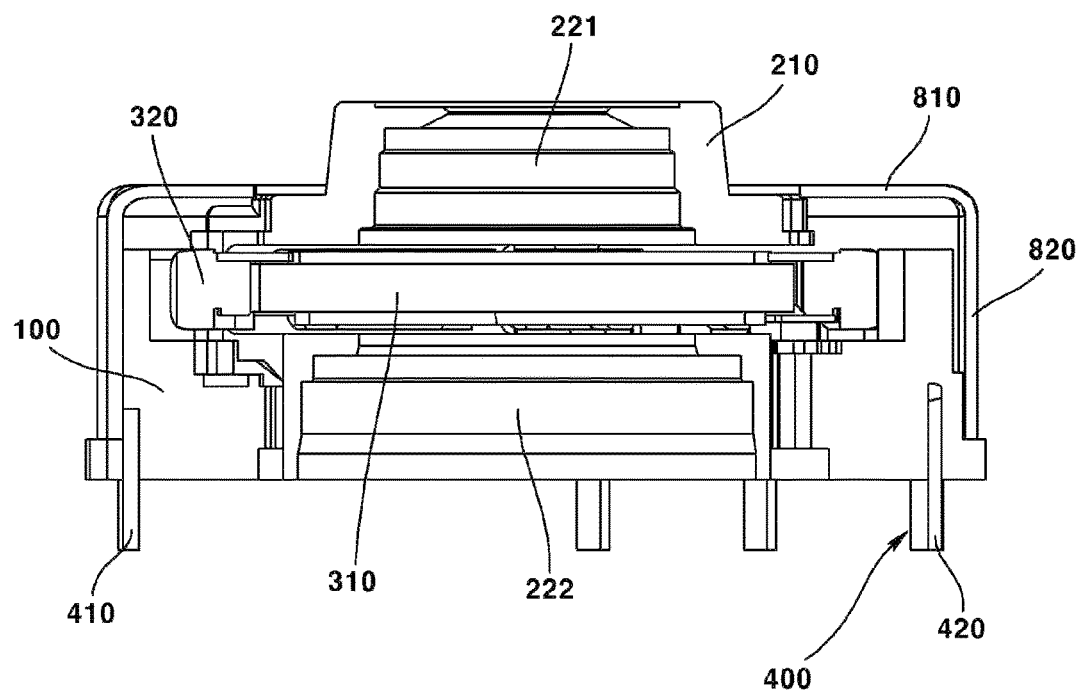
FIG. 4 is a cross-sectional view taken along line C-C of FIG. 1.
Figure 5:
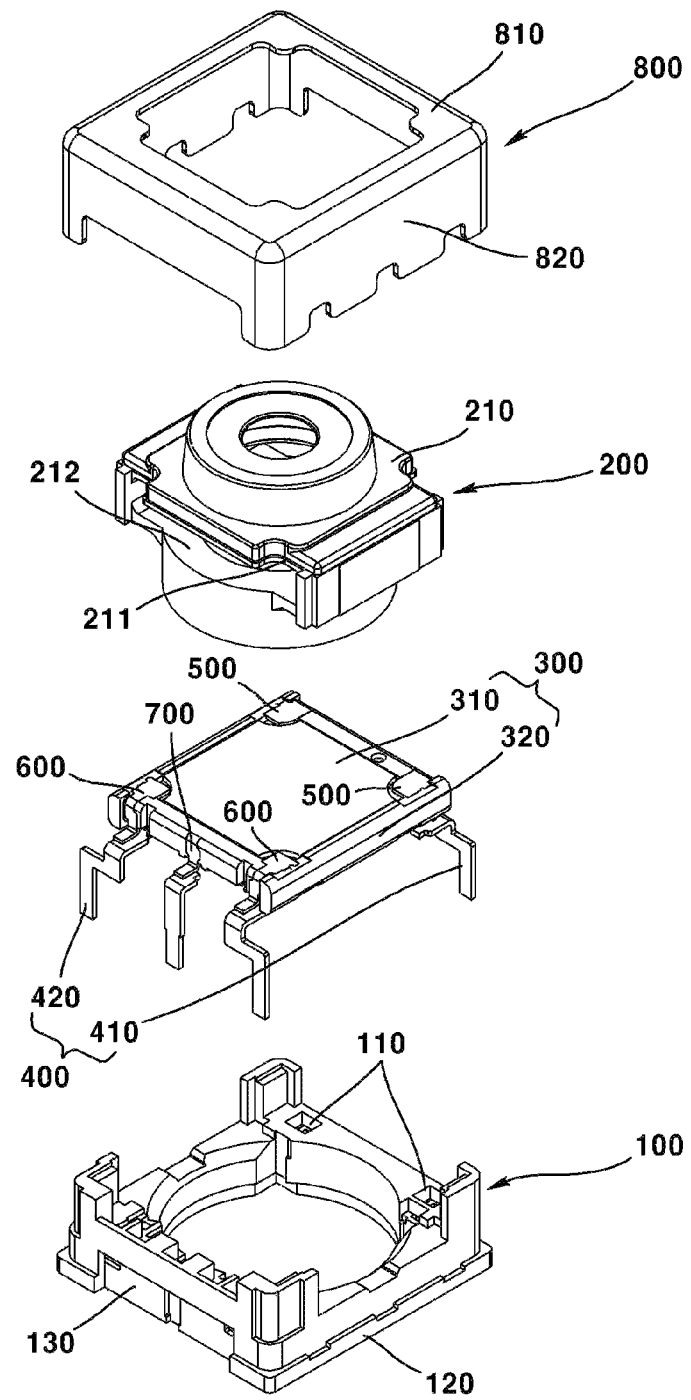
FIG. 5 is an exploded perspective view of a partial configuration of a camera device according to a first embodiment of the present invention.
Figure 6:
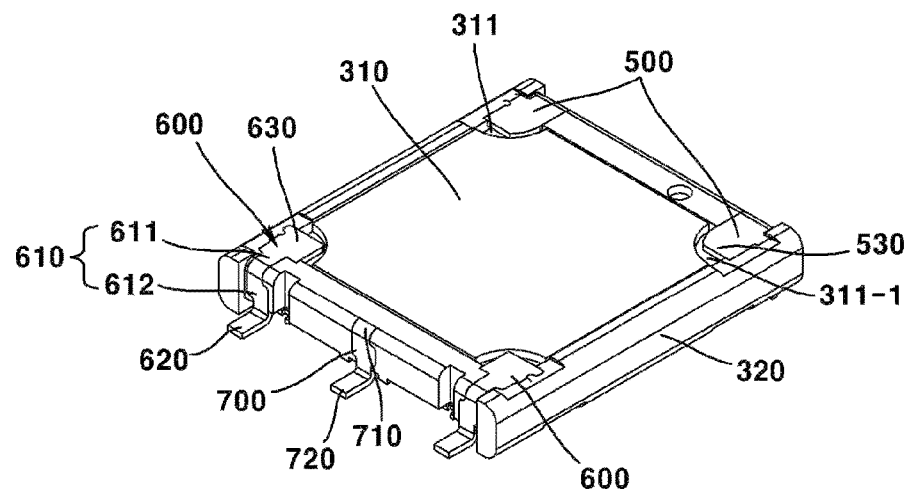
FIG. 6 is an exploded perspective view of a partial configuration of a camera device according to a first embodiment of the present invention.
Figure 6:
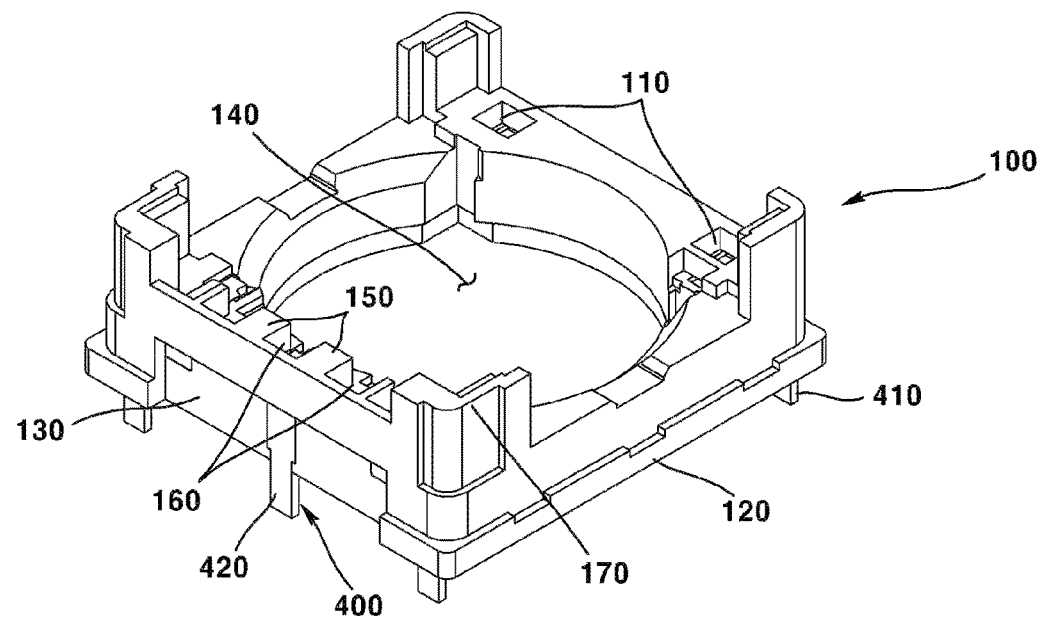
Figure 7:
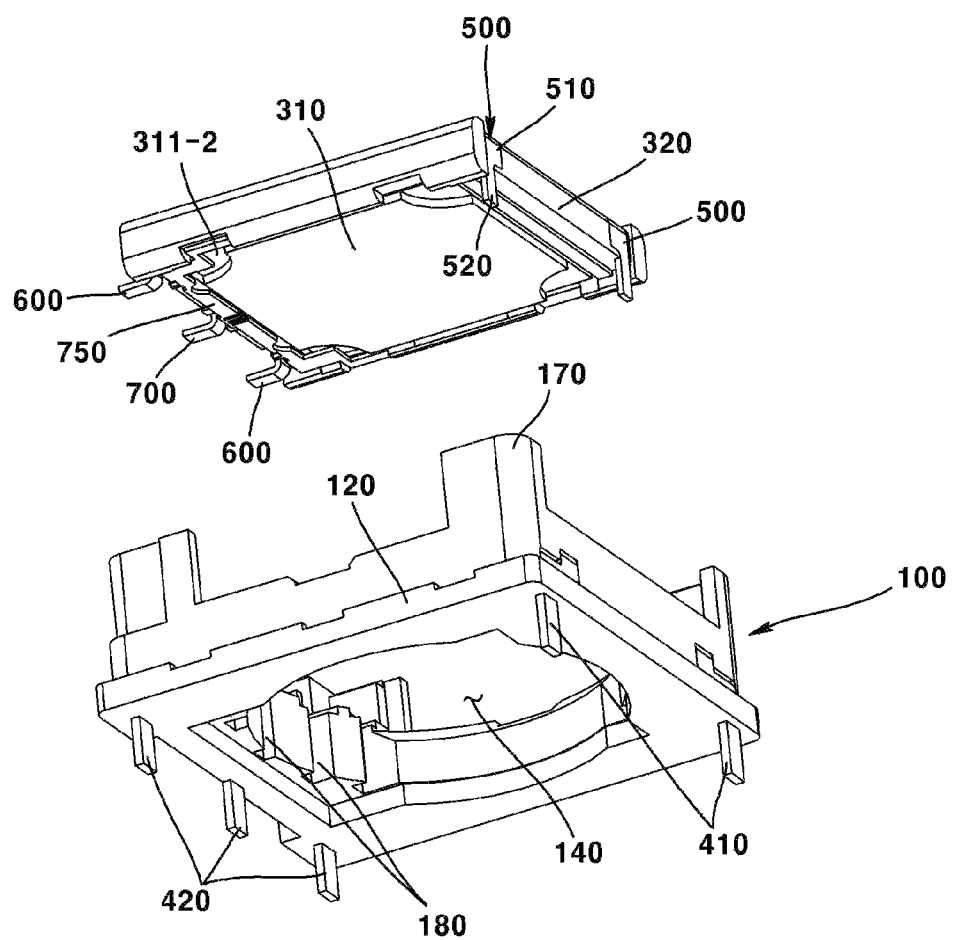
FIG. 7 is a bottom exploded perspective view of a partial configuration of a camera device of FIG. 6 viewed from another angle.
Figure 8:
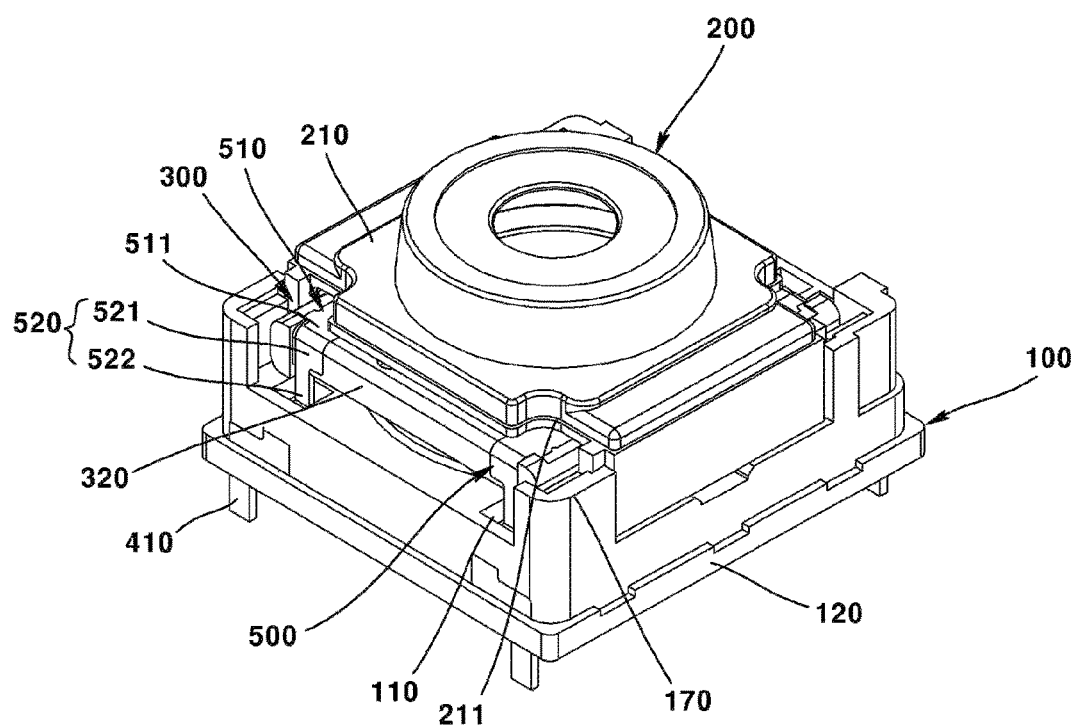
FIG. 8 is a perspective view of a partial configuration of the camera device according to a first embodiment of the present invention.
Figure 9:
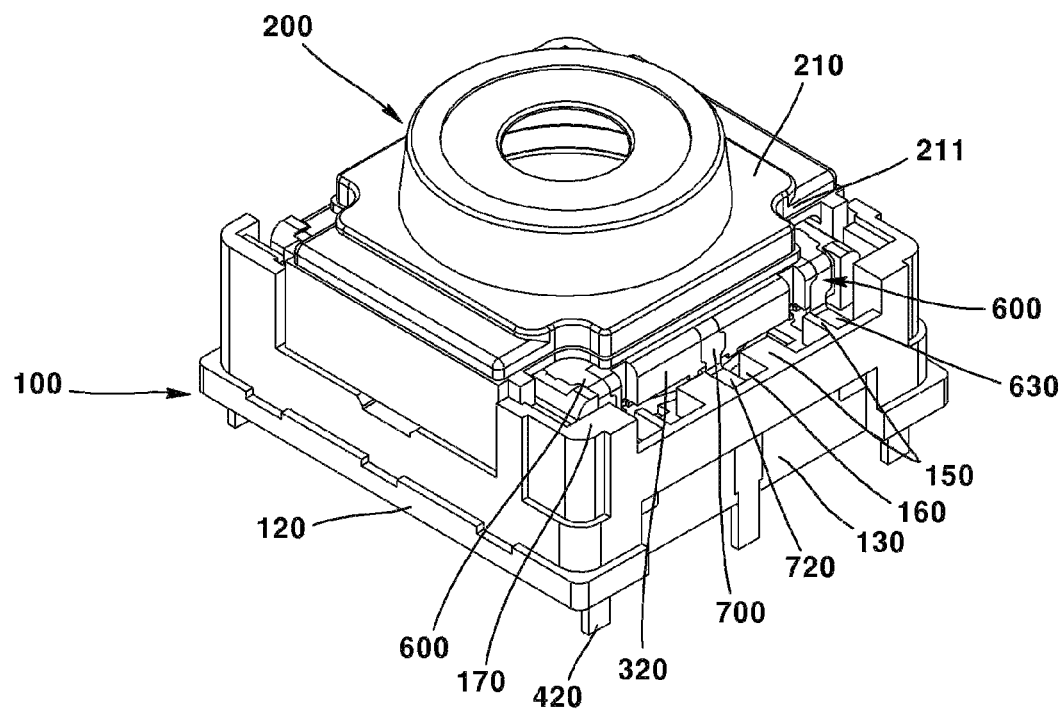
FIG. 9 is a perspective view of a partial configuration of a camera device of FIG. 8 viewed from another angle.
Figure 10:
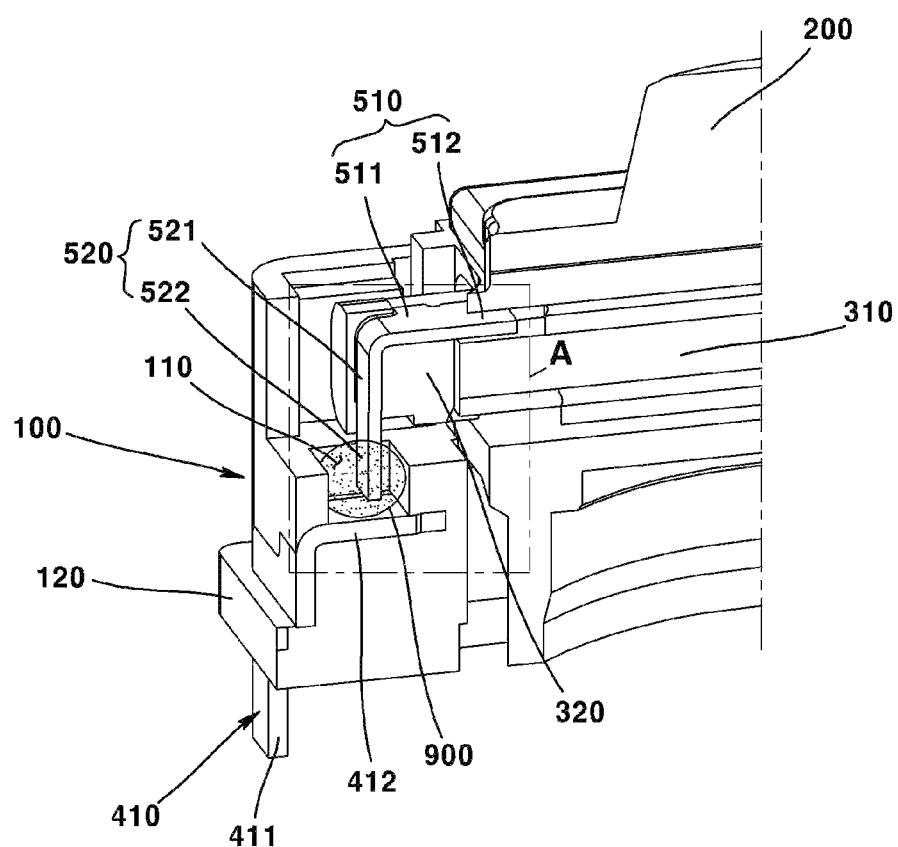
FIG. 10 is a cross-sectional view illustrating a partial configuration of a cross section of a partial configuration of the camera device of FIG. 8.
Figure 11:
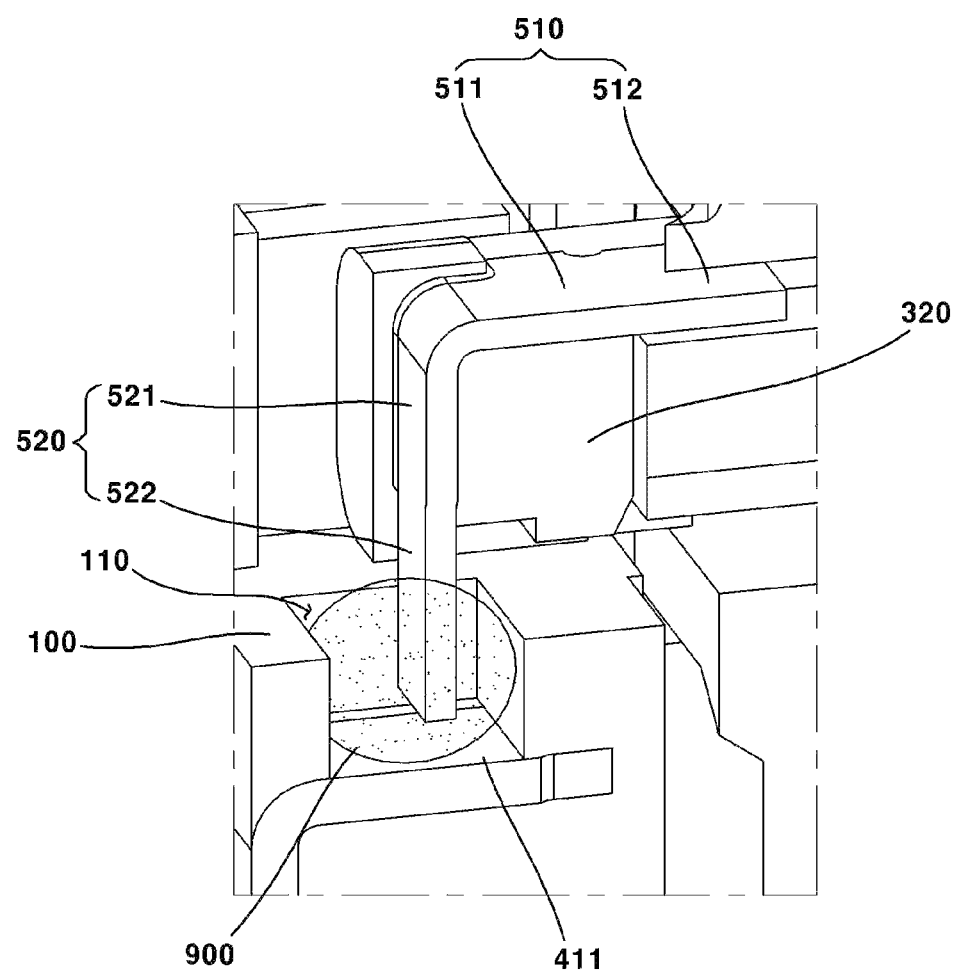
FIG. 11 is an enlarged cross-sectional view illustrating a portion A of FIG. 10.
Figure 12:
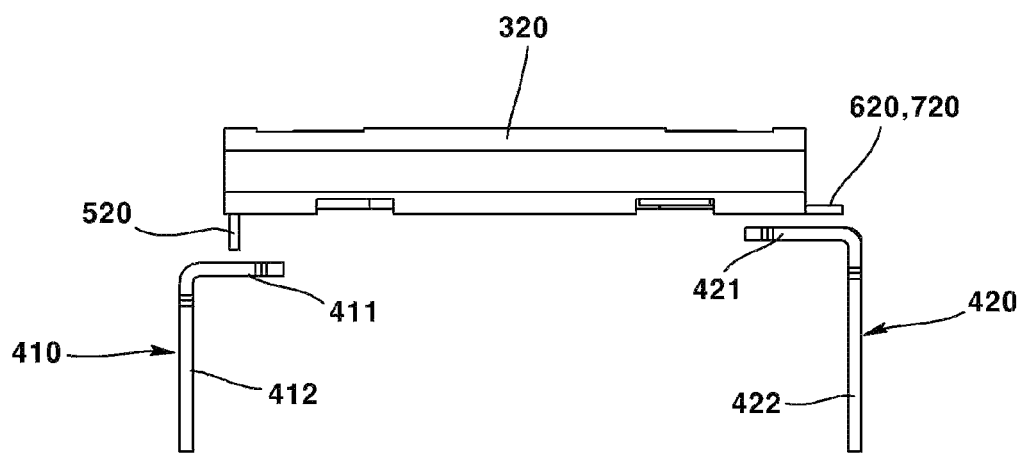
FIG. 12 is a side view of a partial configuration of the camera device according to a first embodiment of the present invention.
Figure 13:
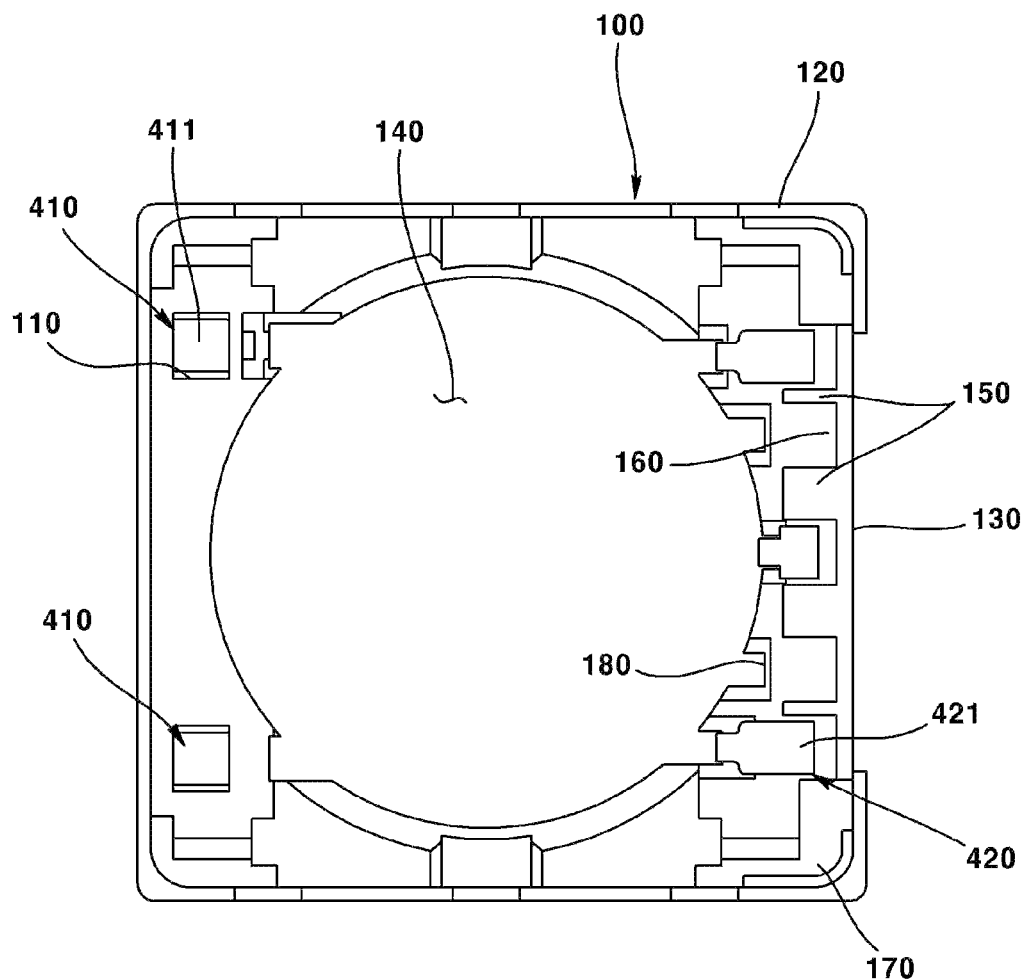
FIG. 13 is a plan view illustrating a holder and a holder terminal of a camera device according to a first embodiment of the present invention.
Figure 14:
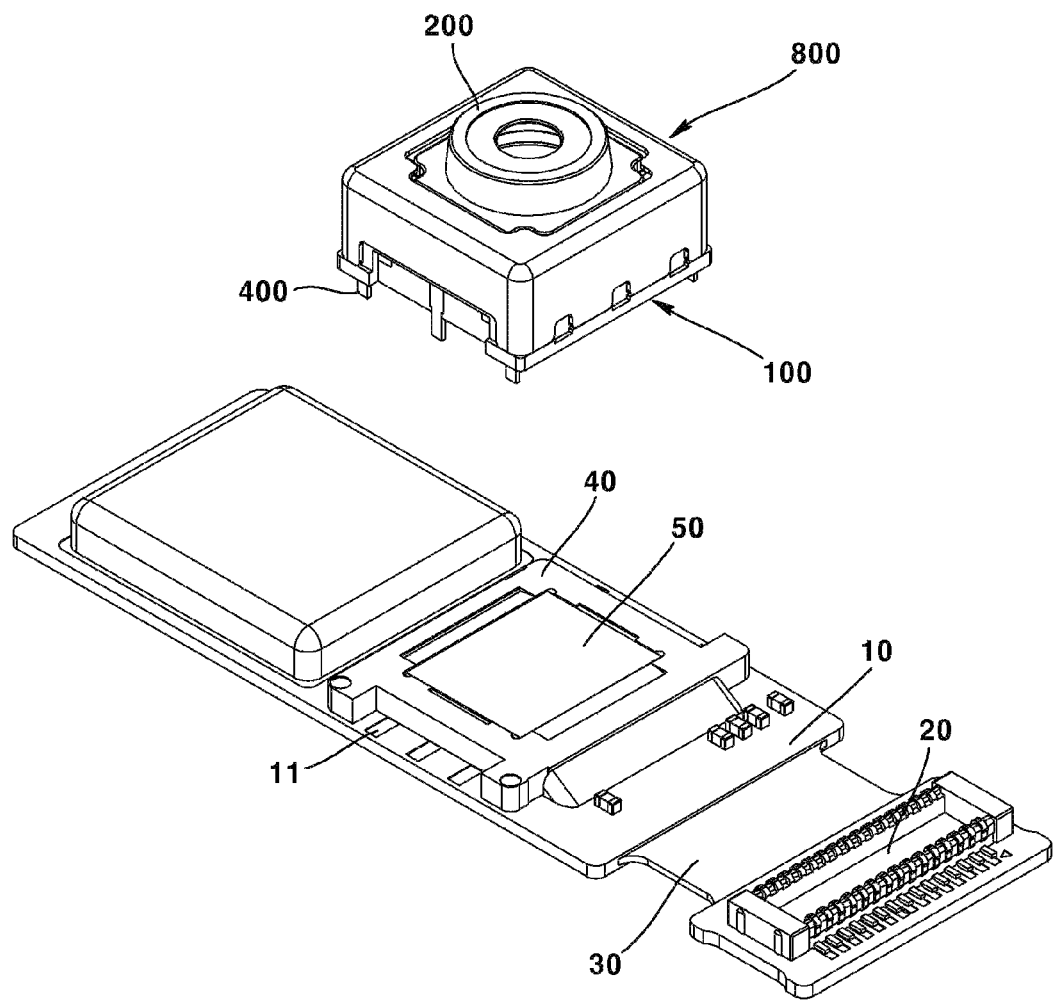
FIG. 14 is an exploded perspective view of a camera device according to a first embodiment of the present invention.

FIG. 1 is a perspective view of a partial configuration of a camera device according to a first embodiment of the present invention, FIG. 2 is a cross-sectional view taken along line A-A of FIG. 1, FIG. 3 is a cross-sectional view taken along line B-B of FIG. 1, FIG. 4 is a cross-sectional view taken along line C-C of FIG. 1, FIG. 5 is an exploded perspective view of a partial configuration of a camera device according to a first embodiment of the present invention, FIG. 6 is an exploded perspective view of a partial configuration of a camera device according to a first embodiment of the present invention, FIG. 7 is a bottom exploded perspective view of a partial configuration of a camera device of FIG. 6 viewed from another angle, FIG. 8 is a perspective view of a partial configuration of the camera device according to a first embodiment of the present invention, FIG. 9 is a perspective view of a partial configuration of a camera device of FIG. 8 viewed from another angle, FIG. 10 is a cross-sectional view illustrating a partial configuration of a cross section of a partial configuration of the camera device of FIG. 8, FIG. 11 is an enlarged cross-sectional view illustrating a portion A of FIG. 10, FIG. 12 is a side view of a partial configuration of the camera device according to a first embodiment of the present invention, FIG. 13 is a plan view illustrating a holder and a holder terminal of a camera device according to a first embodiment of the present invention, and FIG. 14 is an exploded perspective view of a camera device according to a first embodiment of the present invention.

The camera device may comprise a substrate 10. The substrate 10 may be a printed circuit board (PCB). The substrate 10 may comprise an upper surface. An image sensor and a sensor holder 40 may be disposed on the upper surface of the substrate 10. The substrate 10 may comprise a terminal 11. The terminal 11 of the substrate 10 may be electrically connected to the holder terminal 400 through a conductive member.

The camera device may comprise an image sensor. The image sensor may be disposed in the substrate 10. The image sensor may be disposed on the substrate 10. The image sensor may be disposed on an upper surface of the substrate 10. The image sensor may be electrically connected to the substrate 10. For example, the image sensor may be coupled to the substrate 10 by a surface mounting technology (SMT). As another example, the image sensor may be coupled to the substrate 10 by flip chip technology. The image sensor may be disposed so that the lens 220 and the optical axis coincide. That is, the optical axis of the image sensor and the optical axis of the lens 220 may be aligned. The image sensor may convert light irradiated to an effective image region of the image sensor into an electrical signal. The image sensor may be any one of a charge coupled device (CCD), a metal oxide semi-conductor (MOS), a CPD, and a CID.

The camera device may comprise a connector 20. The connector 20 may be connected to the board 10 through the connection board 30. The connector 20 may comprise a port for electrically connecting to an external device.

The camera device may comprise a sensor holder 40. The sensor holder 40 may be disposed between the holder 100 and the substrate 10. A filter 50 may be disposed on the sensor holder 40. An opening may be formed in a portion of the sensor holder 40 in which the filter 50 is disposed so that light passing through the filter 50 may be incident on the image sensor.

The camera device may comprise a filter 50. The filter 50 may comprise an infrared filter. The infrared filter may block light of the infrared region from being incident on the image sensor. An infrared filter may reflect infrared radiation. Alternatively, the infrared filter may absorb infrared radiation. The infrared filter may be disposed between a lens module 200 and the image sensor. The infrared filter may be disposed on the sensor holder 40.

The camera device may comprise a holder 100. The holder 100 may be disposed on the substrate 10. The holder 100 may be disposed in the sensor holder 40. The holder 100 may be disposed on an upper surface of the sensor holder 40. The holder 100 may be coupled to the sensor holder 40. The holder 100 may be coupled to the lens module 200. The holder 100 may be disposed inside a cover 800. The holder 100 may be formed of an insulating material.

The holder 100 may comprise a groove 110. The groove 110 may be an epoxy tank in which Ag epoxy is accommodated. The groove 110 may be formed by being recessed in an upper surface of the holder 100. The groove 110 may be spaced apart from the inner surface of the holder 100. The groove 110 may be spaced apart from the outer surface of the holder 100. A conductive member 900 may be disposed in the groove 110 of the holder 100. The holder 100 may form an epoxy tank in which the conductive member 900 is accommodated. The conductive member 900 disposed in the groove 110 of the holder 100 may be connected to the holder terminal 400. The holder terminal 400 may form a portion of the bottom surface of the groove 110 of the holder 100.

In a first embodiment of the present invention, a portion of the holder 100 may be disposed between the second region 520 of the first connection terminal 500 and the lens module 200 in a direction perpendicular to the optical axis. Through this, the Ag epoxy tank formed in the groove 110 may have a structure in which all four lateral surfaces are blocked. Therefore, according to a first embodiment of the present invention, there is an advantage in that there is no concern of a short circuit due to the failure to control the amount of epoxy applied. In addition, according to a first embodiment of the present invention, since a total of five surfaces comprising the four lateral surfaces and the bottom surface are in contact with the Ag epoxy, it can be stable against external impact.

The holder 100 may comprise a step portion 120. The step portion 120 may be protruded from a lateral surface of the holder 100. The step portion 120 may be formed in an outer circumference of the holder 100. A side plate 820 of the cover 800 may be disposed in the step portion 120. The step portion 120 may be overlapped with the side plate 820 of the cover 800 in a direction parallel to an optical axis (vertical direction).

The holder 100 may comprise a groove 130. The groove 130 may be formed on a lateral surface of the holder 100. The groove 130 may be recessed from the lateral surface of the holder 100 to the lateral surface of the holder terminal 400. Through this, the groove 130 may expose at least a portion of the lateral surface of the holder terminal 400.

The holder 100 may comprise a hole 140. The hole 140 may be a hollow hole penetrating the holder 100 in an optical axis direction. The lens module 200 may be disposed in the hole 140.

The holder 100 may comprise a partition wall 150. A plurality of partition walls 150 may be provided to form an epoxy tank in which Ag epoxy is accommodated. That is, an epoxy tank may be formed between the plurality of partition walls 150. In a first embodiment of the present invention, the epoxy tank may be described as being formed as the partition wall 150 is protruded from an upper surface and an inner lateral surface of the holder 100. Alternatively, the epoxy tank may be described as being formed by a groove 160 in which a portion of the holder 100 is recessed. In a first embodiment of the present invention, an epoxy tank, which is a space in which the epoxy is accommodated, is formed between the plurality of partition walls 150, and this portion may be referred to as a groove 160. A conductive member 900 may be disposed between the partition walls 150. Ag epoxy may be disposed between the partition walls 150.

The holder 100 may comprise a pillar 170. The pillar 170 may be protruded from an upper surface of the holder 100. The pillars 170 may be formed at each of the four corners of the holder 100. The four pillars 170 may prevent the lens module 200 and the variable lens part 300 disposed therein from being separated. The pillar 170 may be coupled to the cover 800.

The camera device may comprise a lens module 200. The lens module 200 may be coupled to the holder 100. The lens module 200 may be disposed inside the holder 100. The lens module 200 may be coupled to the holder 100.

The lens module 200 may comprise a lens holder 210. The lens holder 210 may be a lens barrel. The lens holder 210 may be coupled to the holder 100. The lens holder 210 may be disposed in the holder 100. The lens may be accommodated inside the lens holder 210. The inner circumferential surface of the lens holder 210 may be formed in a shape corresponding to the outer circumferential surface of the lens 220. The lens holder 210 may be formed of an insulating material.

The lens holder 210 may comprise a groove 211. The groove 211 may comprise an avoidance portion or a cutout portion. The groove 211 may be formed in a corner of the lens module 200. The groove 211 may expose a portion of an upper surface of a liquid lens holder 320. An adhesive for fixing the liquid lens holder 320 to the lens module 200 may be disposed in the groove 211. In a first embodiment of the present invention, according to the minimization of the size of the liquid lens holder 320, a groove 211 may be formed in the lens holder 210 to facilitate the application of adhesive between the lens module 200 and the liquid lens holder 320.

The lens holder 210 may comprise a hole 212. The hole 212 may be a liquid lens accommodating hole in which a variable lens part 300 is disposed. The variable lens part 300 may be disposed in the hole 212. The hole 212 may be formed to have a height greater than the height of the variable lens part 300 by a predetermined size. The hole 212 may penetrating through the lens module 200 in a direction perpendicular to the optical axis. The liquid lens 310 may be horizontally inserted into the hole 212 of the lens module 200 and coupled thereto. The hole 212 may comprise a bottom surface 212a facing the lower surface of the liquid lens 310.

The lens module 200 may comprise a lens 220. The lens 220 may be disposed in the lens holder 210. The lens may be a solid lens. The lens may be a plastic lens. The lens 220 may comprise a plurality of lenses. The lens 220 may comprise an upper lens 221 and a lower lens 222. The upper lens 221 may be disposed on an upper side of the liquid lens 310. The lower lens 222 may be disposed below the liquid lens 310. Each of the upper lens 221 and the lower lens 222 may comprise a plurality of lenses. The upper lens 221 may comprise three or two lenses, and the lower lens 222 may comprise two or three lenses. However, the number of lenses of the upper lens 221 and the number of lenses of the lower lens 222 are not limited thereto. Although the lens 220, the upper lens 221, and the lower lens 222 are illustrated in the drawing, the corresponding reference numerals may correspond to a space in which a lens is accommodated, not a lens.

The camera device may comprise a variable lens part 300. The variable lens part 300 may be coupled to the lens module 200. The variable lens part 300 may be coupled to the lens holder 210. The variable lens part 300 may be disposed in the lens holder 210. The variable lens part 300 may be spaced apart from the holder 100. The variable lens part 300 may be aligned with the lens 220 and the image sensor. The variable lens part 300 may be fixedly inserted into the lens module 200 in a horizontal direction.

The variable lens part 300 may comprise a variable lens. The variable lens may be a variable focus lens. The variable lens may be a lens whose focus is controlled. The focus may be adjusted by moving the lens and/or changing the shape of the lens. The variable lens may comprise at least one among a liquid lens 310, a polymer lens, a liquid crystal lens, a voice coil motor (VCM) actuator, a shape memory alloy (SMA) actuator, and a micro electro mechanical systems (MEMS) actuator.

The liquid lens 310 may comprise at least one of a liquid lens 310 containing one type of liquid and a liquid lens 310 containing two types of liquid. The liquid lens 310 comprising one type of liquid may change the focus by adjusting a membrane disposed at a position corresponding to the liquid. For example, the focus can be changed by pressing the membrane by the electromagnetic force of the magnet and coil. The liquid lens 310 comprising two types of liquids may comprise a conductive liquid and a non-conductive liquid. In this case, the focus may be changed by adjusting the interface formed between the conductive liquid and the non-conductive liquid using a voltage applied to the liquid lens 310.

The polymer lens may change the focus by controlling a polymer material through a driving unit such as a piezo. The liquid crystal lens can change the focus by controlling the liquid crystal by electromagnetic force. The VCM actuator can change focus by moving a solid lens or a lens assembly comprising a solid lens through electromagnetic force between a magnet and a coil. The SMA actuator may change the focus by moving a solid lens or a lens assembly comprising the solid lens using a shape memory alloy. The MEMS actuator may change a focus by moving a solid lens or a lens assembly comprising a solid lens through electrostatic force generated when voltage is applied.

The variable lens part 300 may comprise a liquid lens 310. The liquid lens 310 may be disposed in the lens module 200. The liquid lens 310 may be disposed inside the liquid lens holder 320. The liquid lens 310 may be disposed between the plurality of lenses 220. The liquid lens 310 may be disposed between the upper lens 221 and the lower lens 222. The liquid lens 310 may be disposed in the hole 212 of the lens module 200.

The liquid lens 310 whose focal length is adjusted in response to the driving voltage may receive an operating voltage through the terminal 311. The terminal 311 of the liquid lens 310 may comprise an individual terminal 311-1 and a common terminal 311-2. The individual terminal 311-1 may comprise four individual terminals disposed at four corners of the liquid lens 310. The individual terminal 311-1 may be disposed on the upper surface of the liquid lens 310. In this case, the individual terminal 311-1 may be referred to as an upper terminal. The common terminal 311-2 may comprise four common terminals disposed at four corners of the liquid lens 310. The common terminal 311-2 may be disposed on the lower surface of the liquid lens 310. In this case, the common terminal 311-2 may be referred to as a lower terminal. When an operating voltage is applied through the individual terminal 311-1 and the common terminal 311-2, the interface between the conductive liquid and the non-conductive liquid disposed in the lens region may be deformed.

The liquid lens 310 may be spaced apart from the solid lens. In a first embodiment of the present invention, epoxy may be applied to the space between the liquid lens 310 and the solid lens. At this time, active alignment between the liquid lens 310 and the solid lens may be performed. Active alignment between the liquid lens 310 and the solid lens may be performed through the following steps. First, the liquid lens 310 may be disposed on the solid lens, and the assembly of the liquid lens 310 and the solid lens may be disposed above the master sensor. Thereafter, while moving the liquid lens 310 on a virtual grid pattern and applying voltages assigned to a plurality of codes to the liquid lens 310, a point in which the amount of light sensed by the master sensor is greatest can be determined. When the point with the greatest amount of light is determined, the liquid lens 310 is positioned at the corresponding point, and the epoxy for bonding the liquid lens 310 to the solid lens can be pre-cured through ultraviolet rays. Thereafter, the liquid lens 310 may be fixed to the solid lens by main curing of the epoxy through heat.

Meanwhile, the lens unit formed by fixing the liquid lens 310 to the solid lens may be actively aligned with the image sensor. By moving the lens unit on a virtual grid and applying voltages assigned to a plurality of codes to the liquid lens 310, the point where the amount of light detected by the image sensor is the largest can be determined, and the lens unit can be fixed at the corresponding point. At this time, like the previously described coupling of the liquid lens 310 and the solid lens, the lens unit can be fixed in place through pre-curing and main curing using epoxy.

Furthermore, in the above description, the liquid lens 310 and the solid lens are first actively aligned and the assembly of the liquid lens 310 and the solid lens is actively aligned with the image sensor, but the solid lens and the image sensor may be first actively aligned, and then the liquid lens 310 may be actively aligned, and also, the liquid lens 310 and the image sensor may first be actively aligned, and then the solid lens may be actively aligned.

One side of the liquid lens 310 may be applied with a voltage from the individual terminal 311-1. The other side of the liquid lens 310 may be applied with a voltage from the common terminal 311-2. In a first embodiment of the present invention, the individual terminal 311-1 of the liquid lens 310 may be an individual electrode, and the common terminal 311-2 may be a common electrode. Alternatively, the individual terminal 311-1 of the liquid lens 310 may be a common electrode and the common terminal 311-2 may be an individual electrode. In the liquid lens 310, the interface formed between the conductive liquid and the non-conductive liquid may be deformed by the current and/or voltage applied to the individual terminal 311-1 and the common terminal 311-2. Through this, any one or more of the AF function and the OIS function may be performed.

The liquid lens 310 may comprise a terminal 311. The terminal 311 may comprise a plurality of terminals. The terminal 311 may comprise an individual terminal 311-1 formed on an upper surface of the liquid lens 310 and a common terminal 311-2 formed on a lower surface of the liquid lens 310. Each of the individual terminal 311-1 and the common terminal 311-2 may be formed at each of the four corners of the liquid lens 310.

The variable lens part 300 may comprise a liquid lens holder 320. The liquid lens holder 320 may be coupled to the liquid lens 310. A lower surface of the liquid lens holder 320 may be disposed higher than an upper surface of the holder 100. A liquid lens 310 may be disposed inside the liquid lens holder 320. The first to third connection terminals 500, 600, and 700 may be integrally formed in the liquid lens holder 320 by insert injection. The variable lens part 300 may comprise a variable lens holder. The description of the variable lens holder may be analogously applied to the description of the liquid lens holder 320.

The camera device may comprise a holder terminal 400. The holder terminal 400 may be disposed in the holder 100. The holder terminal 400 may be integrally formed with the holder 100 through insert injection. The holder terminal 400 may be exposed to a portion of the bottom surface of the groove 110 of the holder 100. The holder terminal 400 may electrically connect the first to third connection terminals 500, 600, and 700 with the substrate 10.

The holder terminal 400 may comprise a first-first terminal 410. The first-first terminal 410 may be electrically connected to the first connection terminal 500. The first-first terminal 410 may comprise a first portion 411. The first portion 411 of the first-first terminal 410 may be exposed on the upper surface of the holder 100. The upper surface of the first portion 411 of the first-first terminal 410 may be disposed on the same plane as the bottom surface of the groove 110 of the holder 100. The first-first terminal 410 may comprise a second portion 412. The second portion 412 may be extended downward from the first portion 411. A lower end of the second portion 412 may be connected to the terminal 11 of the substrate 10 through solder.

The holder terminal 400 may comprise a first-second terminal 420. The first-second terminal 420 may be electrically connected to the second connection terminal 600 and the third connection terminal 700. The first-second terminal 420 may comprise a first portion 421. The first portion 421 of the first-second terminal 420 may be exposed on the upper surface of the holder 100. The upper surface of the first portion 421 of the first-second terminal 420 may be disposed on the same plane as the bottom surface of the groove 110 of the holder 100. The first-second terminal 420 may comprise a second portion 422. The second portion 422 may be extended downward from the first portion 421. A lower end of the second portion 422 may be connected to the terminal 11 of the substrate 10 through solder.

In the first embodiment of the present invention, the first portion 411 of the first-first terminal 410 may be disposed at a lower position than the position of the first portion 421 of the first-second terminal 420. This may be because the lower ends of the first connection terminal 500 is extended below the lower ends of the second and third connection terminals 600 and 700.

The camera device may comprise a first connection terminal 500. The first connection terminal 500 may be coupled to the variable lens part 300. The first connection terminal 500 may be disposed on one side of the variable lens part 300. The first connection terminal 500 may be disposed in the liquid lens holder 320. The first connection terminal 500 may electrically connect the liquid lens 310 and the holder terminal 400. The first connection terminal 500 may be integrally formed in the liquid lens holder 320 through insert injection. A lateral surface of a portion of the first connection terminal 500 may be disposed on the same plane as a lateral surface of the liquid lens holder 320. A portion of the first connection terminal 500 may extend to the outside of the variable lens part 300 to be electrically connected to the holder terminal 400 and the conductive member 900. The first connection terminal 500 may not be protruded more outward than the variable lens holder.

In a first embodiment of the present invention, the first connection terminal 500 may not be protruded further outward than the liquid lens holder 320. That is, in the first embodiment of the present invention, the first connection terminal 500 may have a vertically descending structure. In the first embodiment of the present invention, the space required to form an epoxy tank containing the lower end of the first connection terminal 500 is also minimized by the shape of the first connection terminal 500, so the size of the camera device in the horizontal direction can be minimized. However, since the side portion between both corners of the holder 100 is narrow in width and cannot form an epoxy tank, the first connection terminal 500 may be disposed on the corner side.

The first connection terminal 500 may comprise a first region 510. The first region 510 may be disposed on one side of the variable lens part 300. The first region 510 may be electrically connected to the variable lens. The first region 510 may be exposed on the upper surface of the variable lens part 300. The first region 510 may be coupled to the individual terminals 311-1 of the variable lens. The first region 510 may be extended to the inner side of the variable lens holder.

In a modified embodiment, the first connection terminal 500 may be extended to the outer side of the variable lens part 300 and be electrically connected to the holder terminal 400 and the conductive member 900.

The first region 510 of the first connection terminal 500 may comprise: a first portion 511 disposed in the variable lens holder; and a second portion 512 extending inwardly from the first portion 511 and connected to the terminal 311 of the variable lens.

The first connection terminal 500 may comprise a second region 520. The second region 520 of the first connection terminal 500 may be extended in an optical axis direction from the first region 510 of the first connection terminal 500. The second region 520 of the first connection terminal 500 may be electrically coupled to the holder terminal 400. The second region 520 of the first connection terminal 500 may be electrically connected to the holder terminal 400. The second region 520 may be bent and extended from the first region 510 of the first connection terminal 500. A portion of the second region 520 may be disposed in the groove 110 of the holder 100. A portion of the second region 520 may be coupled to the holder terminal 400 and the conductive member 900.

The second region 520 of the first connection terminal 500 is exposed at the lateral surface of the variable lens part 300 and may be further extended downwardly than the lower surface of the variable lens part 300. The second region 520 of the first connection terminal 500 may comprise: a third portion 521 exposed from the lateral surface of the variable lens part 300; and a fourth portion 522 being extended the lower surface of the variable lens part 300. At least a portion of the second region 520 may overlap the lens holder 210 in a direction perpendicular to an optical axis direction. The first connection terminal 500 may comprise a first portion 511 and a third portion 521. The first portion 511 and the third portion 521 may be disposed in the liquid lens holder 320. The first portion 511 and the third portion 521 may be fixed to the liquid lens holder 320.

The first portion 511 may be disposed on the upper surface of the liquid lens holder 320. The third portion 521 may be extended from the first portion 511. The third portion 521 may be disposed on a lateral surface of the liquid lens holder 320.

In a first embodiment of the present invention, the third portion 521 of the first connection terminal 500 may not be overlapped with the holder 100 in a direction perpendicular to an optical axis. The third portion 521 may be disposed to be visible when viewed from the side after removing the cover 800 from the camera device according to a first embodiment of the present invention. The third portion 521 may be a portion where a pogo pin for applying a current to the liquid lens 310 in the process of aligning the liquid lens 310 with the lens module 200 and/or the image sensor is to be in contact with.

The first connection terminal 500 may comprise a fourth portion 522. The fourth portion 522 may be extended below the liquid lens holder 320. The second region 520 may be extended in an optical axis direction from the first portion 511 of the first region 510. The fourth portion 522 may be electrically connected to the holder terminal 400. The fourth portion 522 may be connected to the conductive member 900 disposed in the groove 110 of the holder 100. The distal end of the fourth portion 522 may be immersed in the conductive member 900 disposed in the groove 110 of the holder 100. The second region 520 may be extended downward from a lower end of the first portion 511 of the first region 510.

In a first embodiment of the present invention, at least a portion of the second region 520 of the first connection terminal 500 may be overlapped with the lens module 200 in a direction perpendicular to an optical axis. Through this, the width of the holder 100 being protruded more laterally than the liquid lens holder 320 may be minimized. At least a portion of the second region 520 of the first connection terminal 500 may be overlapped with the lens holder 210 in a direction perpendicular to the optical axis. At least a portion of the second region 520 of the first connection terminal 500 may be overlapped with the lens 220 disposed below the variable lens part 300 in a direction perpendicular to the optical axis. The liquid lens holder 320 may be overlapped with the holder 100 in a direction parallel to the optical axis. Here, the direction perpendicular to the optical axis may correspond to a portion of the horizontal direction. In a first embodiment of the present invention, the first connection terminal 500 is extended straight to the extent that the lower end of the first connection terminal 500 is overlapped with the lens module 200 and the optical axis in a direction perpendicular to the optical axis to be connected to the conductive member 900, and accordingly, the size in the horizontal direction of the camera device according to the first embodiment of the present invention can be reduced. At least a portion of the second region 520 of the first connection terminal 500 can be extended further below than the bottom surface 212a of the hole 212 of the lens module 200.

In a first embodiment of the present invention, a structure in which the end of the first connection terminal 500 being extended straight in the vertical direction is dipped in Ag epoxy by driving the first connection terminal 500 to the corner side and forming an Ag epoxy tank on the holder 100 side may be comprised. The first connection terminal 500 may comprise a first terminal disposed in a first corner region of the variable lens and a second terminal disposed in a second corner region of the variable lens.

The first connection terminal 500 may comprise a second portion 512. The second portion 512 may be extended inwardly from the first portion 511. The second portion 512 may be connected to the terminal 311 of the liquid lens 310. The second portion 512 may be connected to the individual terminals 311-1 of the liquid lens 310 through a conductive member. Alternatively, the second portion 512 may be connected to the common terminal 311-2 of the liquid lens 310 through a conductive member.

The camera device may comprise a second connection terminal 600. The second connection terminal 600 may be disposed at the other side of the variable lens part 300. The second connection terminal 600 may be disposed at the opposite side of the first connection terminal 500 in the liquid lens holder 320. The second connection terminal 600 may be disposed at the opposite side of the first connection terminal 500 with respect to the liquid lens 310. The second connection terminal 600 may electrically connect the liquid lens 310 and the holder terminal 400. The second connection terminal 600 may be formed in a shape different from that of the first connection terminal 500.

In a first embodiment of the present invention, the second connection terminal 600 may not be overlapped with the lens holder 210 in a direction perpendicular to an optical axis. The second connection terminal 600 may not be overlapped with the lens module 200 in a direction perpendicular to the optical axis. Through this, the variable lens part 300, of a form in which the liquid lens 310, the liquid lens holder 320, and the first to third connection terminals 500, 600, and 700 are coupled, can be assembled by inserting it into the hole 212 of the lens module 200 in the horizontal direction. As a modified embodiment, in the case when the first connection terminal 500, the second connection terminal 600, and the third connection terminal 700 disposed on both sides of the liquid lens holder 320 are all overlapped with the lens module 200 in the horizontal direction, it cannot be assembled to the lens module 200 after all of the first to third connection terminals 500, 600, and 700 are coupled to the variable lens part 300.

The second connection terminal 600 may comprise: a first region 610 disposed on the upper surface of the variable lens part 300; a second region 620 being extended from the first region 610 of the second connection terminal 600 and disposed on the side of the variable lens part 300; a third region 630 being extended from the second region 620 of the second connection terminal 600 in a direction perpendicular to an optical axis direction and being overlapped with a portion of the holder terminal 400 in the optical axis direction.

The first region 610 may comprise a first portion 611 and a second portion 612. The first portion 611 and the second region 620 may be disposed in the liquid lens holder 320. The first portion 611 and the second region 620 may be fixed to the liquid lens holder 320. The first portion 611 may be disposed on an upper surface of the liquid lens holder 320. The second region 620 may be extended from the first portion 611. The second region 620 may be disposed on a lateral surface of the liquid lens holder 320.

In a first embodiment of the present invention, the second region 620 of the second connection terminal 600 may not be overlapped with the holder 100 in a direction perpendicular to an optical axis. The second region 620 may be disposed to be visible when viewed from the side after removing the cover 800 from the camera device according to the first embodiment of the present invention. The second region 620 may be a portion where a pogo pin is to be in contact with to apply a current to the liquid lens 310 in the process of aligning the liquid lens 310 with the lens module 200 and/or the image sensor.

The second connection terminal 600 may comprise a third region 630. The third region 630 may be extended outwardly from the second region 620. A portion of the third region 630 may be electrically connected to the holder terminal 400. The third region 630 may be connected to a conductive member disposed between the partition walls 150 of the holder 100. The third region 630 may be connected to the holder terminal 400 through a conductive member.

The second connection terminal 600 may comprise a second portion 612. The second portion 612 may be extended inwardly from the first portion 611. The second portion 612 may be electrically connected to the terminal 311 of the liquid lens 310. The second portion 612 may be connected to the individual terminal 311-1 of the liquid lens 310 through a conductive member. Alternatively, the second portion 612 may be connected to the common terminal 311-2 of the liquid lens 310 through a conductive member.

As a first embodiment of the present invention, the first connection terminal 500 has a shape that is bent once and the second connection terminal 600 has been described as having a shape that is bent twice, but as a modified embodiment, the first connection terminal 500 may have a shape that is bent twice and the second connection terminal 600 may have a shape that is bent once. Furthermore, both the first connection terminal 500 and the second connection terminal 600 may have a shape that is bent once. At this time, each of the first connection terminal 500 and the second connection terminal 600 may comprise a first region 510 and a second region 520. Alternatively, both the first connection terminal 500 and the second connection terminal 600 may have a shape that is bent twice. In this case, each of the first connection terminal 500 and the second connection terminal 600 may comprise a first region 610, a second region 620, and a third region 630.

The camera device may comprise a third connection terminal 700. The third connection terminal 700 may be disposed at the other side of the variable lens part 300. The third connection terminal 700 may be disposed at the opposite side of the first connection terminal 500 in the liquid lens holder 320. The third connection terminal 700 may be disposed at the opposite side of the first connection terminal 500 with respect to the liquid lens 310. The third connection terminal 700 may electrically connect the liquid lens 310 and the holder terminal 400. The third connection terminal 700 may be formed in a shape different from that of the first connection terminal 500 and the second connection terminal 600. The third connection terminal 700 may be electrically coupled to the connection terminal 750.

The third connection terminal 700 may comprise: a first region 710 electrically coupled to the connection terminal 750; a second region 720 disposed inside the variable lens part 300; and a third region 730 being protruded to the outer side of the variable lens part 300. The first region 710 and the connection terminal 750 of the third connection terminal 700 may be exposed to face each other. The first region 710 of the third connection terminal 700 may be connected to the second region 720 of the third connection terminal 700. The second region 720 of the third connection terminal 700 may be connected to the third region 730 of the third connection terminal 700. The second region 720 of the third connection terminal 700 may have a U-shape. The third connection terminal 700 may comprise a second region 720. The second region 720 may be disposed in the liquid lens holder 320. The second region 720 may be fixed to the liquid lens holder 320. The second region 720 may comprise a bent portion. At least a portion of the second region 720 may be bent in a U shape. The second region 720 may comprise a hook shape that increases fixing force to the liquid lens holder 320.

In a first embodiment of the present invention, the outer surface of the second region 720 of the third connection terminal 700 may not be overlapped with the holder 100 in a direction perpendicular to an optical axis. The outer surface of the second region 720 may be disposed to be visible when viewed from the side after removing the cover 800 from the camera device according to the first embodiment of the present invention. The outer surface of the second region 720 may be a portion where a pogo pin is to be in contact with to apply a current to the liquid lens 310 in the process of aligning the liquid lens 310 with the lens module 200 and/or the image sensor.

The third connection terminal 700 may comprise a third region 730. The third region 730 may be extended outwardly from the second region 720. A portion of the third region 730 may be electrically connected to the holder terminal 400. The third region 730 may be connected to a conductive member disposed between the partition walls 150 of the holder 100. The third region 730 may be connected to the holder terminal 400 through a conductive member.

The third connection terminal 700 may comprise a first region 710. The first region 710 may be extended inward from the second region 720. The first region 710 may be electrically connected to the terminal 311 of the liquid lens 310. The first region 710 may be connected to the connection terminal 750 connected to the common terminal 311-2.

The camera device may comprise a connection terminal 750. The connection terminal 750 may be connected to the terminal 311 of the liquid lens 310. The connection terminal 750 may connect four common terminals 311-2 of the liquid lens 310. The connection terminal 750 may be a plate spring. In a first embodiment of the present invention, the first connection terminal 500 is connected to two individual terminals among the four individual terminals 311-1, and the second connection terminal 600 is connected to the remaining two individual terminals among the four individual terminals 311-1, and the third connection terminal 700 may be connected to a connection terminal 750 for connecting four common terminals 311-2.

The camera device may comprise a cover 800. The cover 800 may be coupled to the holder 100. The cover 800 may be disposed in the step portion 120 of the holder 100. The inner surface of the side plate 820 of the cover 800 may be fixed to the lateral surface of the holder 100 by an adhesive. The cover 800 may accommodate a portion of the lens module 200 therein. The cover 800 may form an outer appearance of the camera device. The cover 800 may have a hexahedral shape with an open lower surface. The cover 800 may be a non-magnetic material. The cover 800 may be formed of a metal material. The cover 800 may be formed of a metal plate. The cover 800 may be connected to the ground portion of the substrate 10. Through this, the cover 800 can be grounded. The cover 800 may block electromagnetic interference (EMI). At this time, the cover 800 may be referred to as an 'EMI shield can'.

The cover 800 may comprise an upper plate 810 and a side plate 820. The cover 800 may comprise an upper plate 810 comprising a hole, and a side plate 820 being extended downward from the outer circumference of the upper plate 810.

The camera device may comprise a conductive member 900. The conductive member 900 may comprise a silver (Ag) epoxy. The conductive member 900 may be conductive. The conductive member 900 may be disposed in an epoxy tank formed in the holder 100. The conductive member 900 may be disposed for coupling between terminals. The conductive member 900 may have viscosity.

Hereinafter, a configuration of a camera device according to a second embodiment of the present invention will be described with reference to the drawings.

Figure 15:
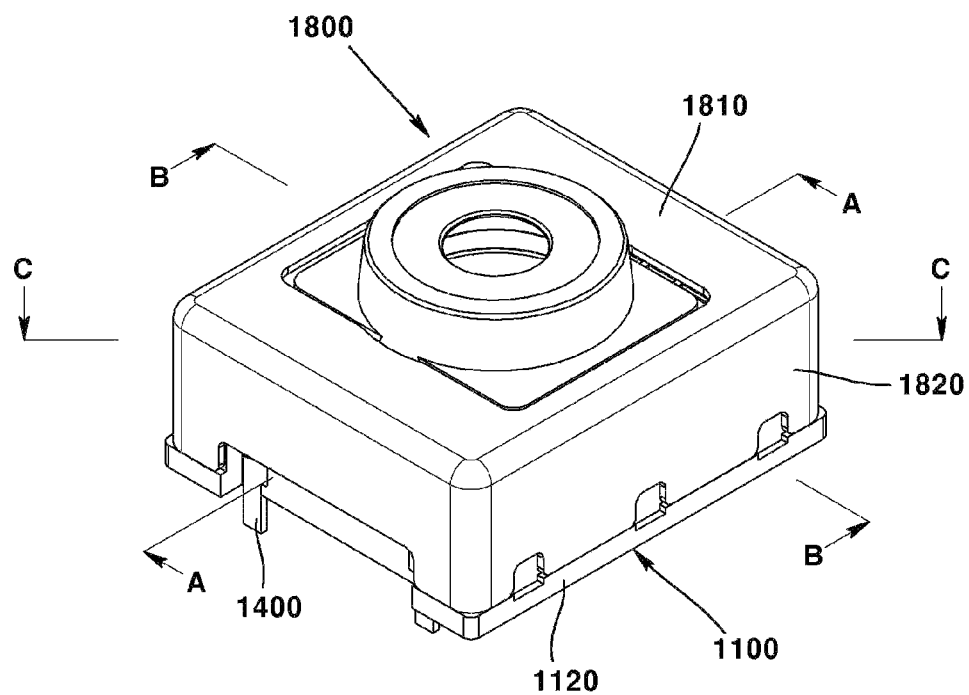
FIG. 15 is a perspective view of a partial configuration of a camera device according to a second embodiment of the present invention.
Figure 16:
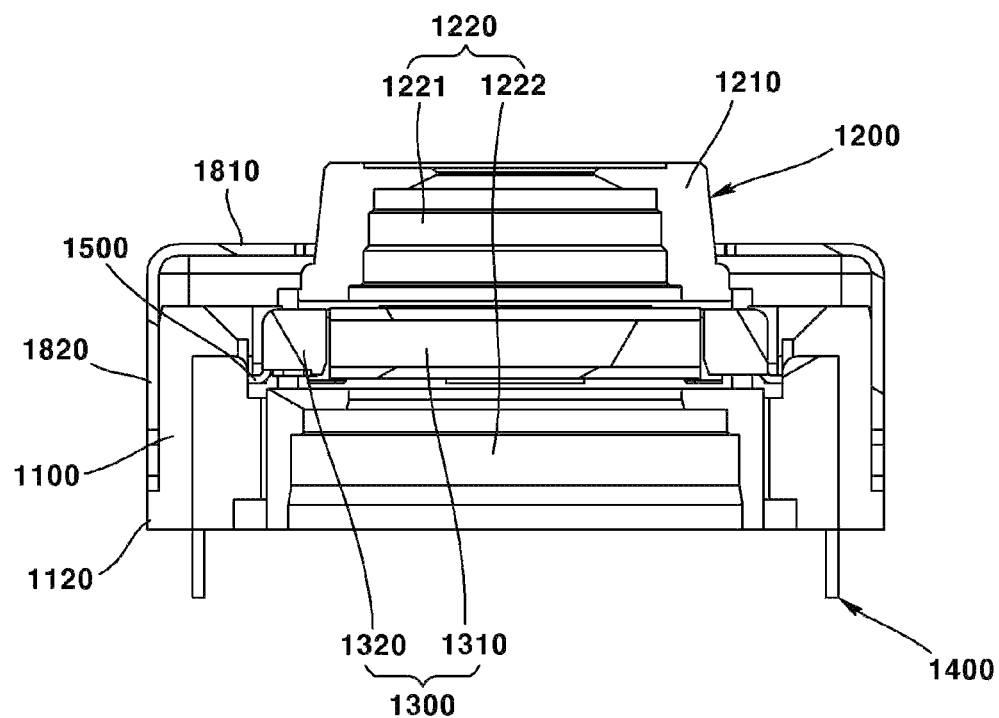
FIG. 16 is a cross-sectional view taken along line A-A of FIG. 15.
Figure 17:
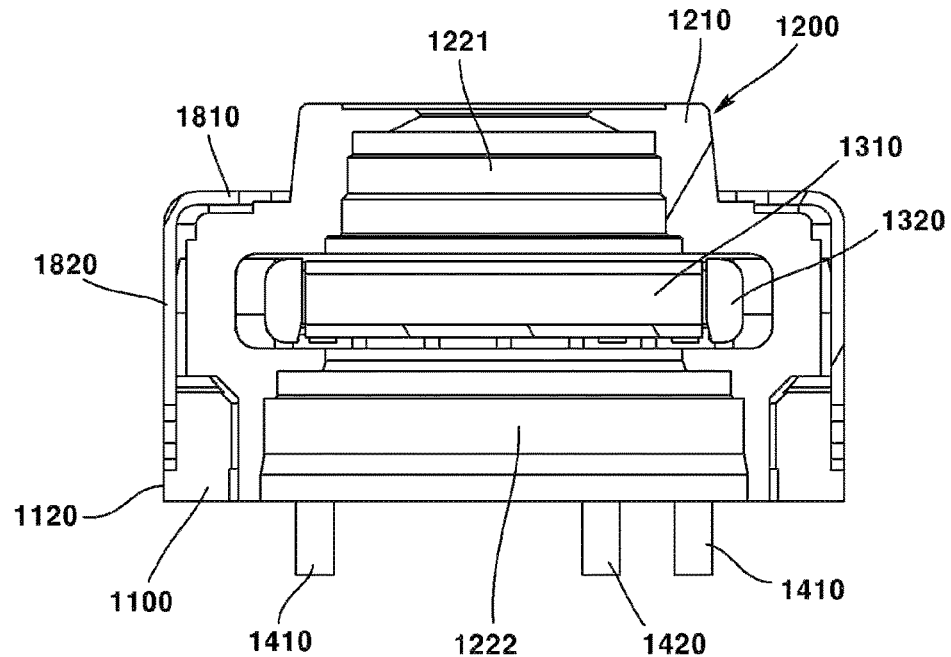
FIG. 17 is a cross-sectional view taken along line B-B of FIG. 15.
Figure 18:
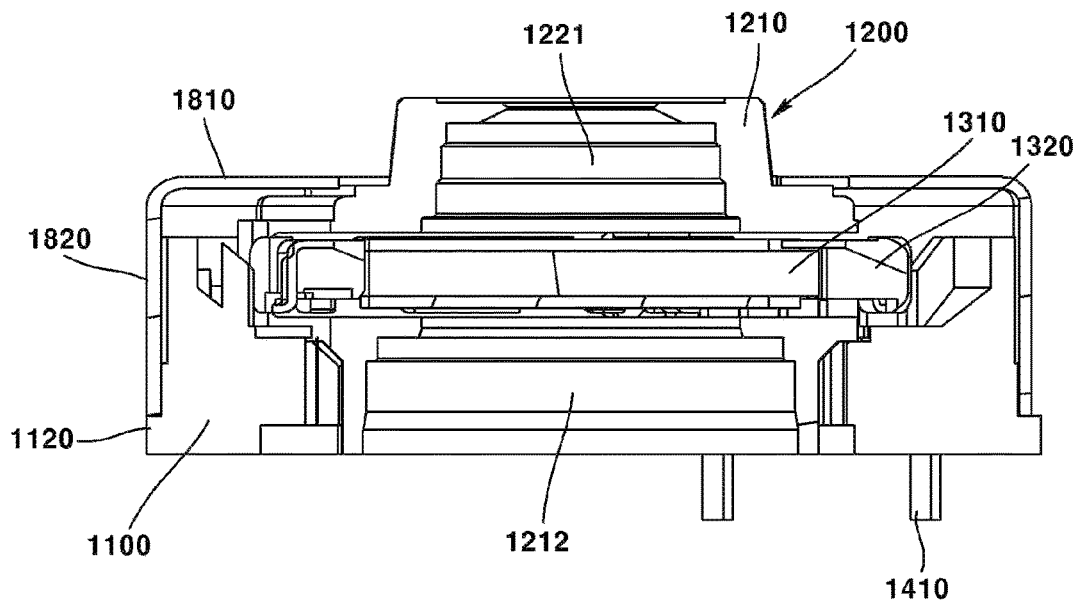
FIG. 18 is a cross-sectional view taken along line C-C of FIG. 15.
Figure 19:
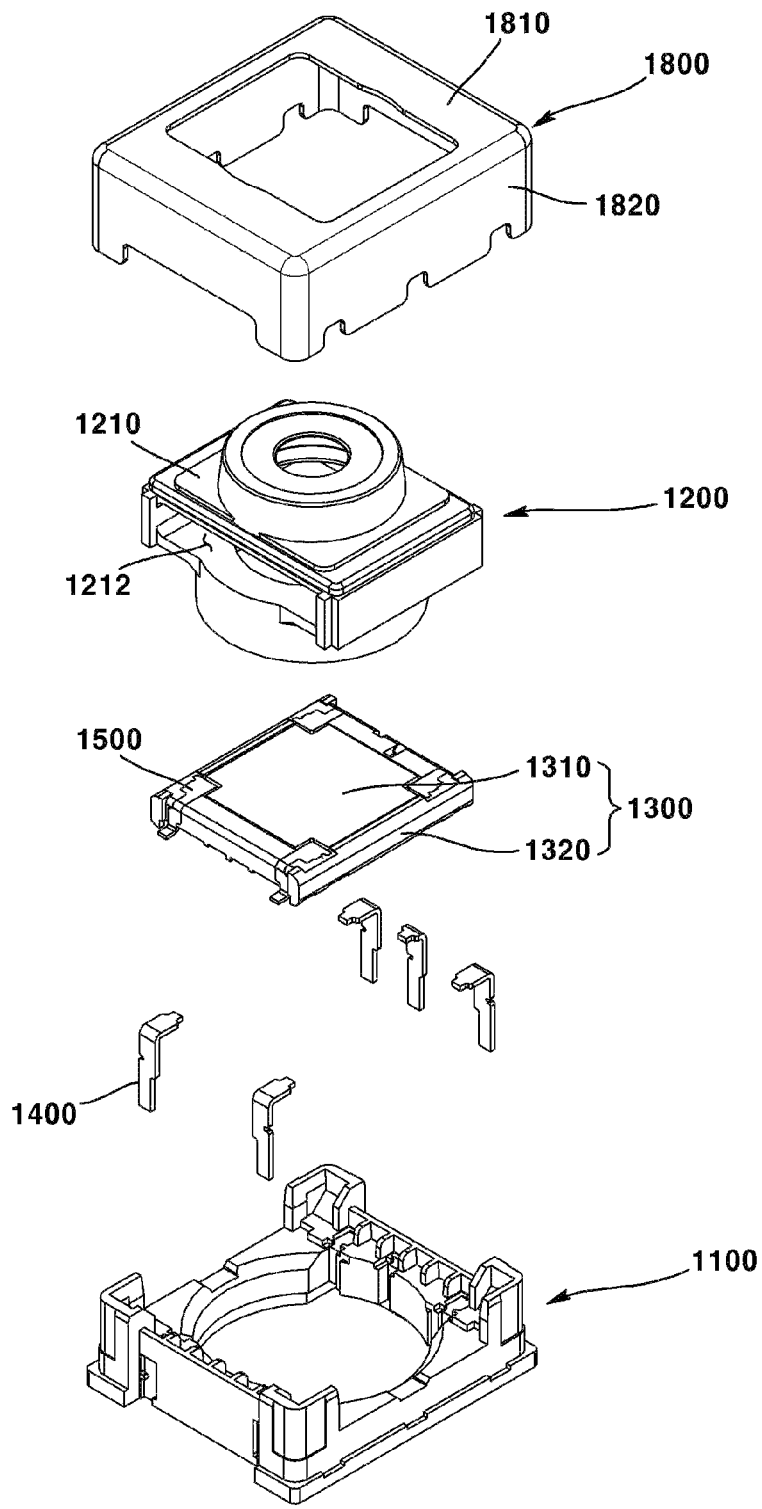
FIG. 19 is an exploded perspective view of a partial configuration of the camera device according to a second embodiment of the present invention.
Figure 20:
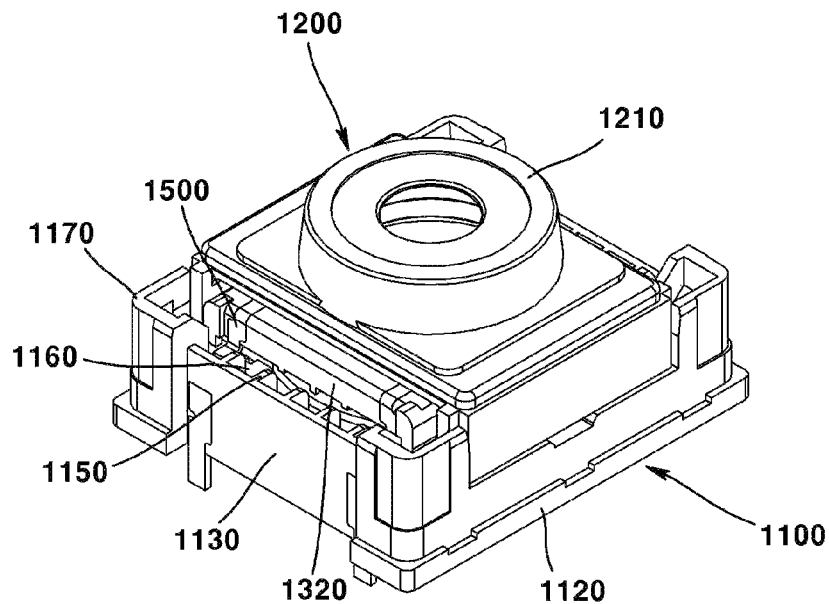
FIG. 20 is a perspective view of a partial configuration of a camera device according to a second embodiment of the present invention.
Figure 21:
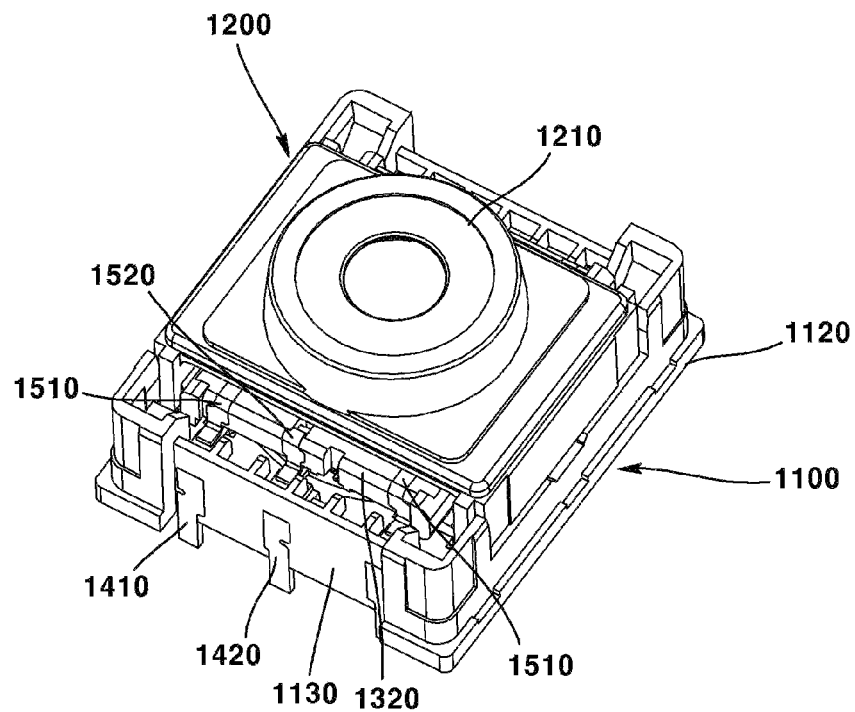
FIG. 21 is a perspective view of a partial configuration of a camera device of FIG. 20 viewed from another angle.
Figure 22:
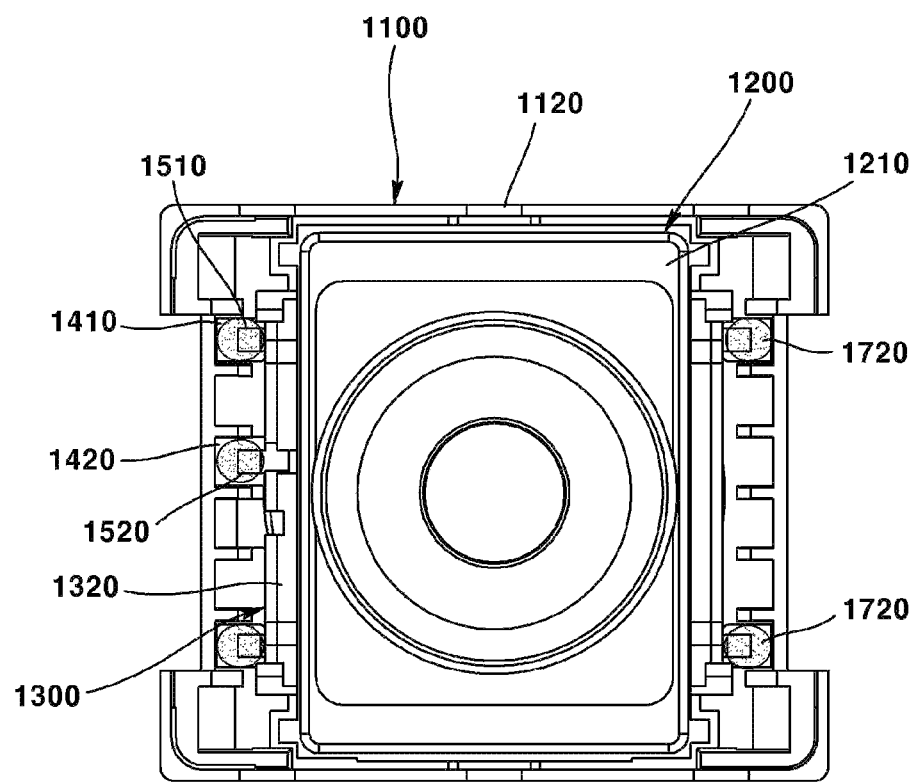
FIG. 22 is a plan view of a partial configuration of the camera device of FIG. 21.
Figure 23:
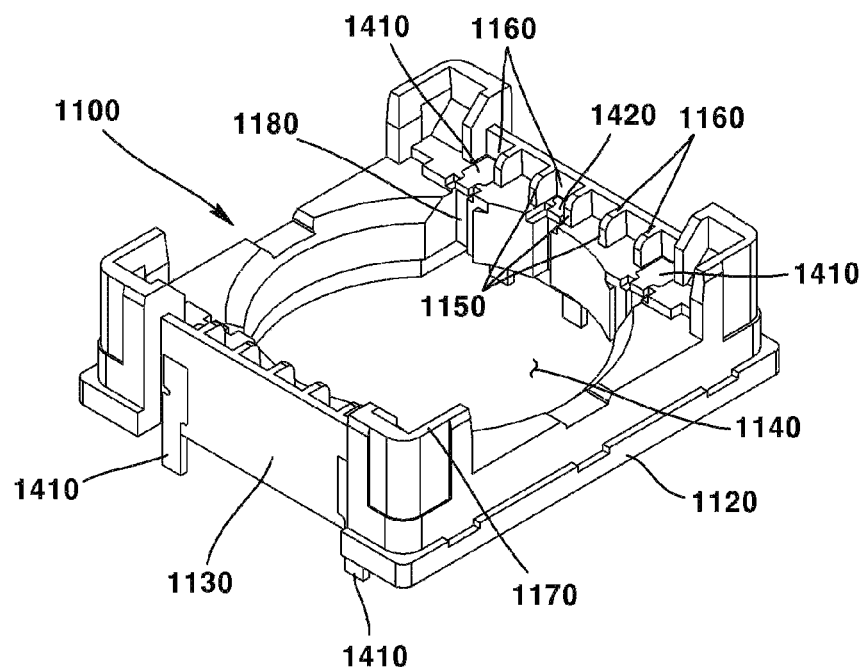
FIG. 23 is a perspective view of a partial configuration of a camera device according to a second embodiment of the present invention.
Figure 24:
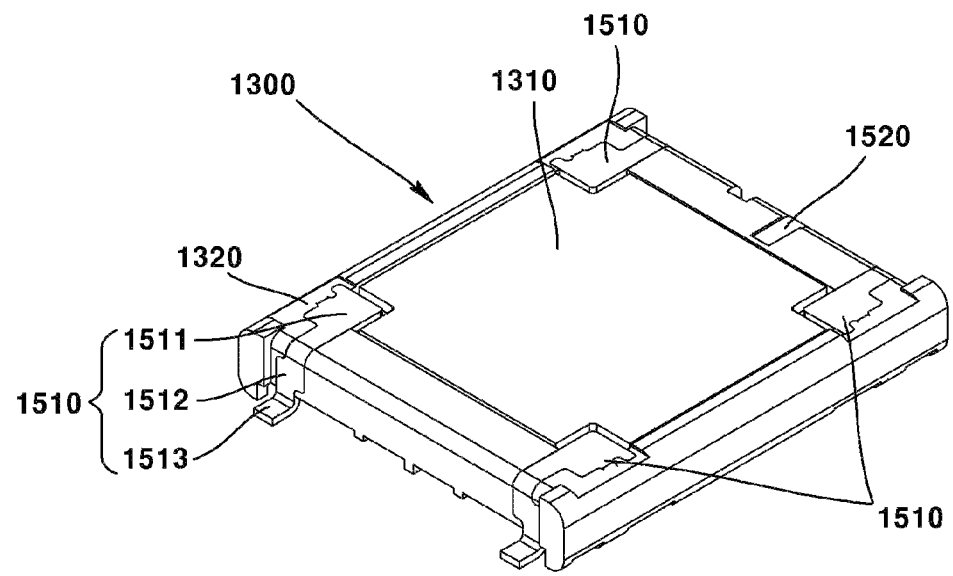
FIG. 24 is a perspective view of a partial configuration of a camera device according to a second embodiment of the present invention.
Figure 25:
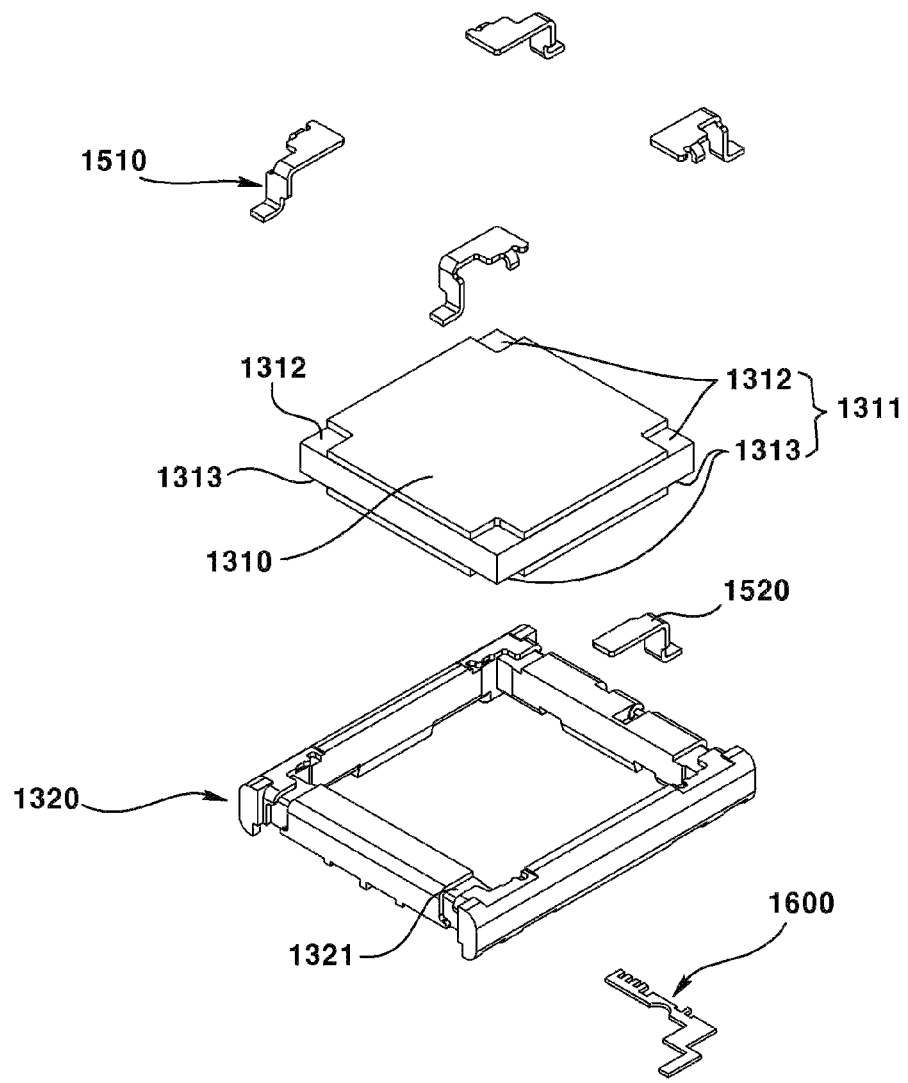
FIG. 25 is an exploded perspective view of a partial configuration of the camera device of FIG. 24.
Figure 26:
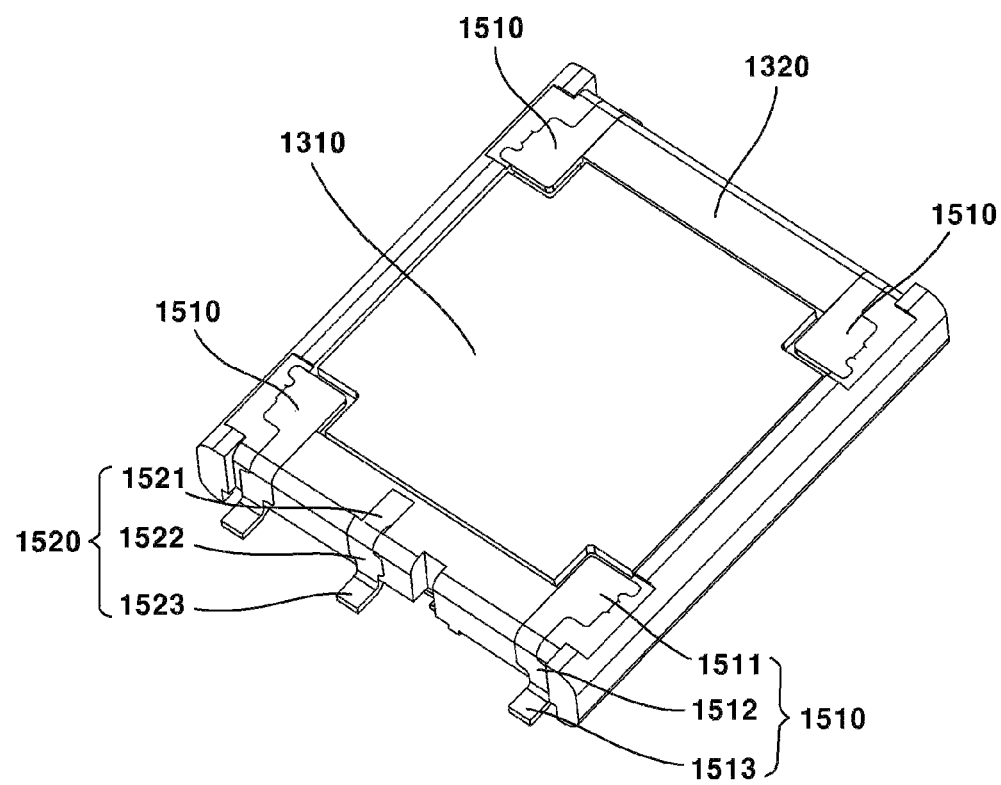
FIG. 26 is a perspective view of a partial configuration of a camera device of FIG. 24 viewed from another angle.
Figure 27A:
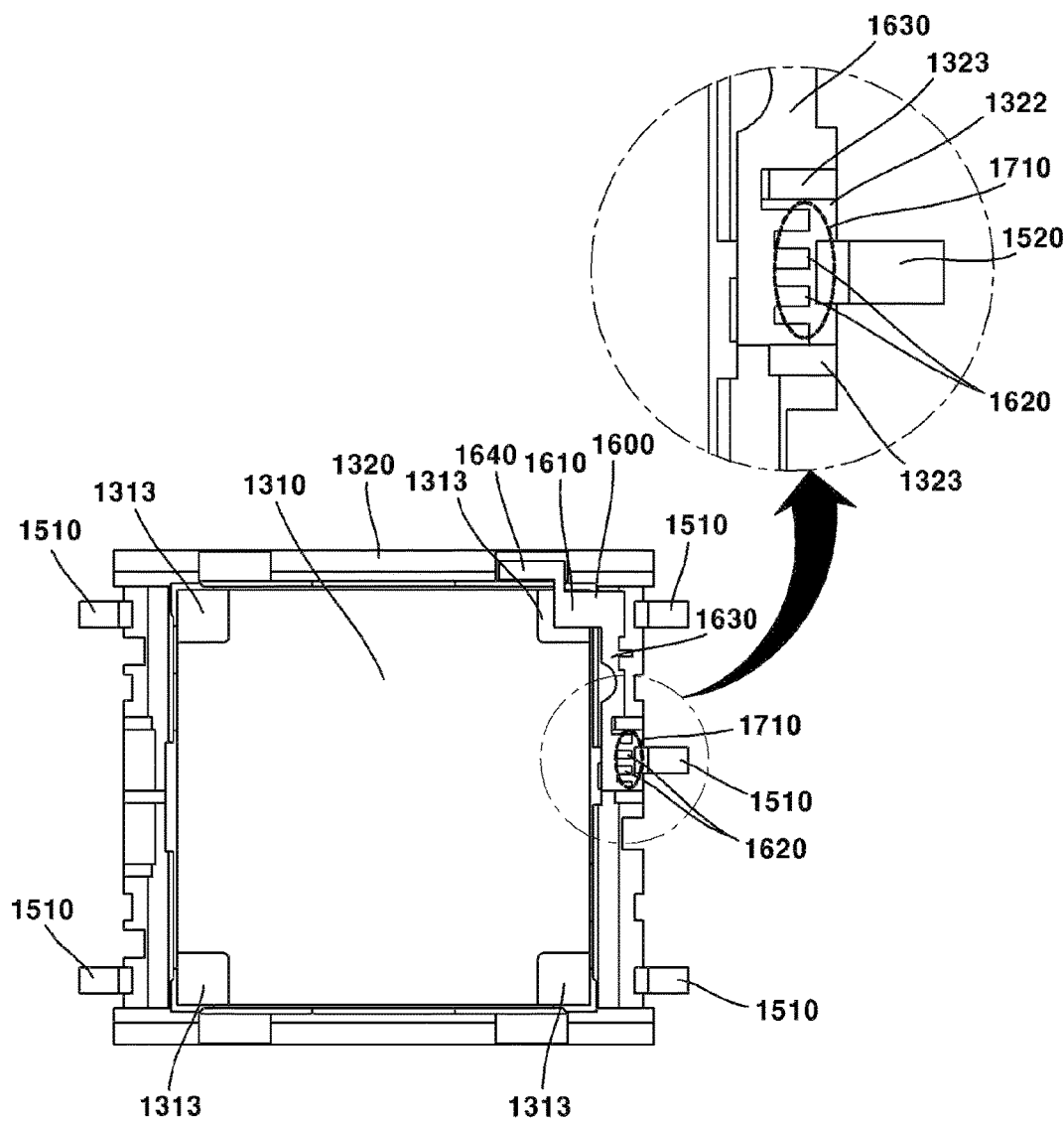
FIG. 27a is a bottom view and a partially enlarged view of a partial configuration of the camera device of FIG. 24.
Figure 27B:
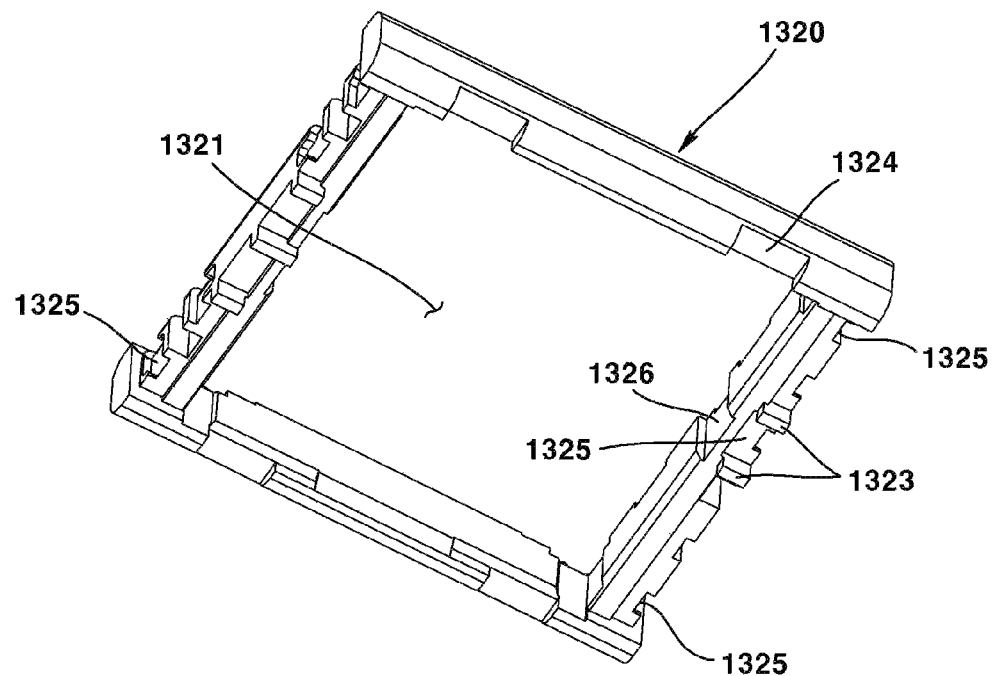
FIG. 27b is a bottom perspective view of a partial configuration of a camera device according to a second embodiment of the present invention.
Figure 28:
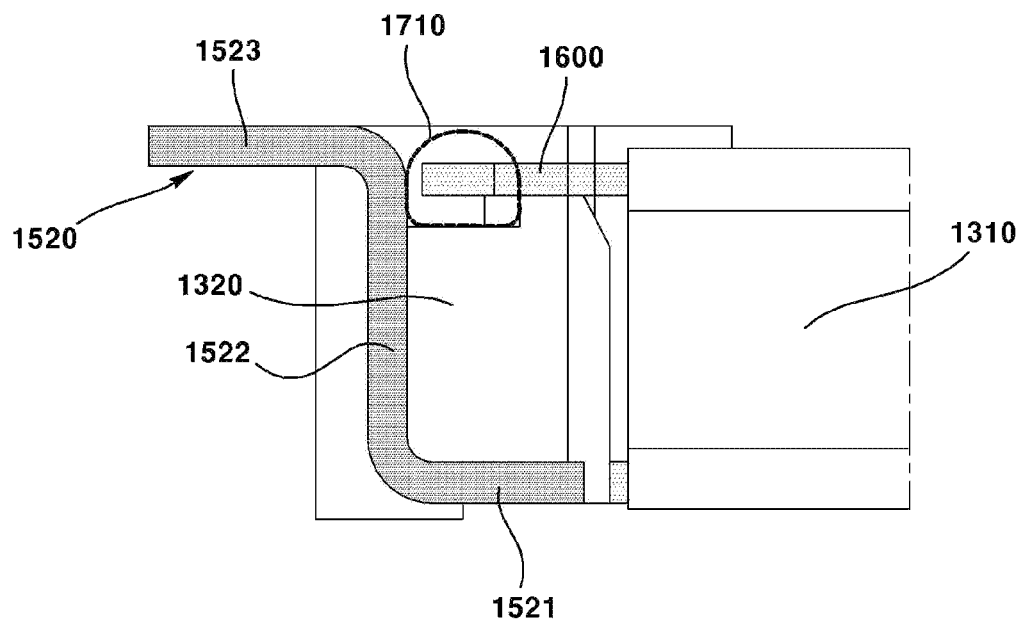
FIG. 28 is a cross-sectional view of a partial configuration of a camera device according to a second embodiment of the present invention.
Figure 29:
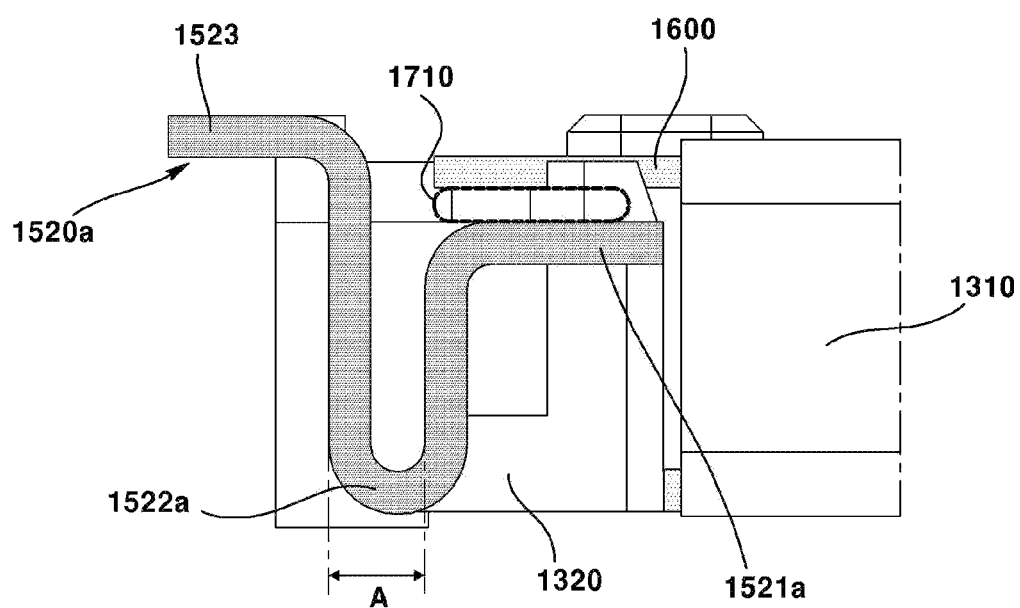
FIG. 29 is a cross-sectional view of a partial configuration of a camera device according to a modified embodiment.
Figure 30:
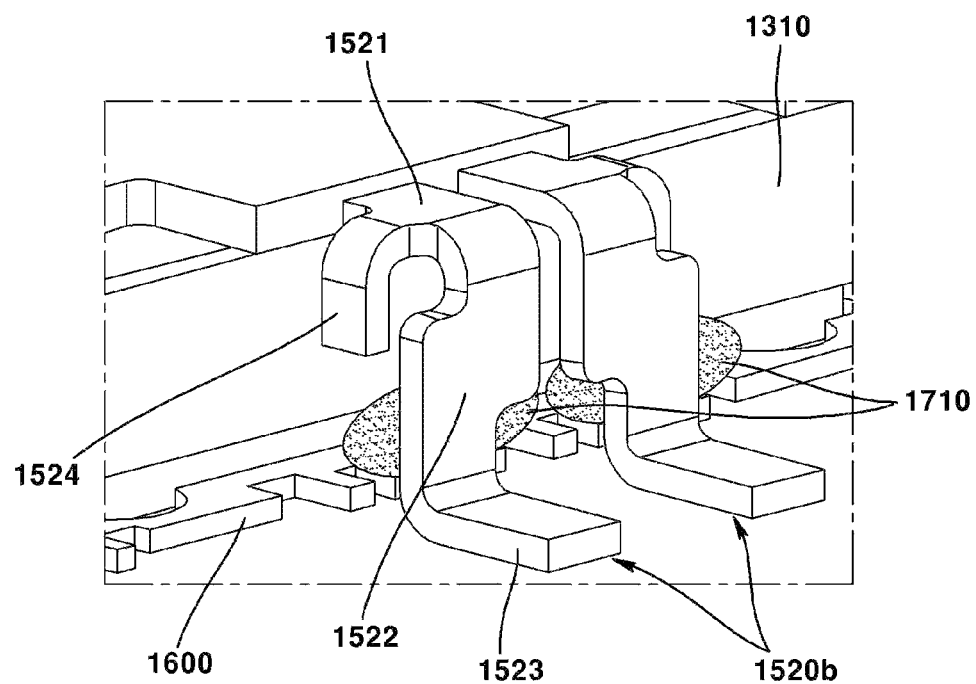
FIG. 30 is a bottom perspective view of a partial configuration of a camera device according to another modified embodiment.
Figure 31:
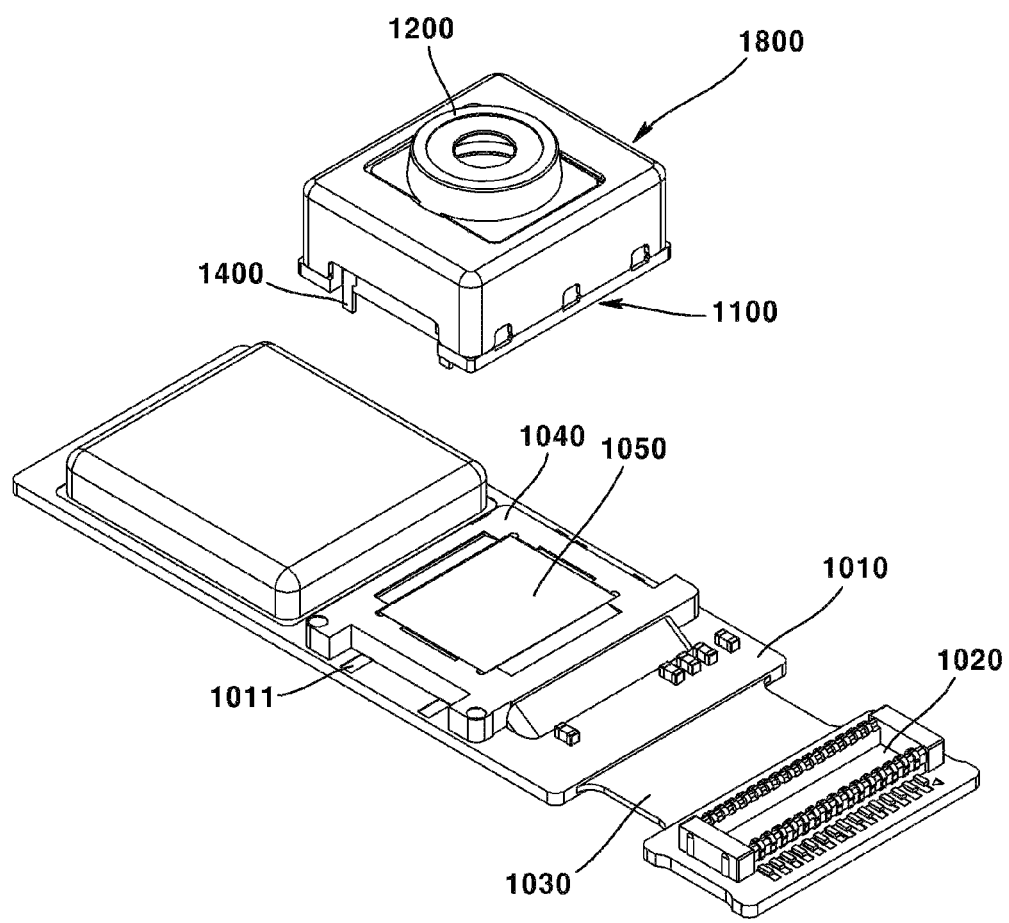
FIG. 31 is an exploded perspective view of a camera device according to a second embodiment of the present invention.

FIG. 15 is a perspective view of a partial configuration of a camera device according to a second embodiment of the present invention, FIG. 16 is a cross-sectional view taken along line A-A of FIG. 15, FIG. 17 is a cross-sectional view taken along line B-B of FIG. 15, FIG. 18 is a cross-sectional view taken along line C-C of FIG. 15, FIG. 19 is an exploded perspective view of a partial configuration of the camera device according to a second embodiment of the present invention, FIG. 20 is a perspective view of a partial configuration of a camera device according to a second embodiment of the present invention, FIG. 21 is a perspective view of a partial configuration of a camera device of FIG. 20 viewed from another angle, FIG. 22 is a plan view of a partial configuration of the camera device of FIG. 21, FIG. 23 is a perspective view of a partial configuration of a camera device according to a second embodiment of the present invention, FIG. 24 is a perspective view of a partial configuration of a camera device according to a second embodiment of the present invention, FIG. 25 is an exploded perspective view of a partial configuration of the camera device of FIG. 24, FIG. 26 is a perspective view of a partial configuration of a camera device of FIG. 24 viewed from another angle, FIG. 27*a* is a bottom view and a partially enlarged view of a partial configuration of the camera device of FIG. 24, FIG. 27*b* is a bottom perspective view of a partial configuration of a camera device according to a second embodiment of the present invention, FIG. 28 is a cross-sectional view of a partial configuration of a camera device according to a second embodiment of the present invention, FIG. 29 is a cross-sectional view of a partial configuration of a camera device according to a modified embodiment, FIG. 30 is a bottom perspective view of a partial configuration of a camera device according to another modified embodiment, and FIG. 31 is an exploded perspective view of a camera device according to a second embodiment of the present invention.

The camera device may comprise a substrate 1010. The substrate 1010 may be a printed circuit board (PCB). The substrate 1010 may comprise an upper surface. An image sensor and a sensor base 1040 may be disposed on the upper surface of the substrate 1010. The substrate 1010 may comprise a terminal 1011. The terminal 1011 of the substrate 1010 may be electrically connected to the holder terminal 1400 through a conductive member.

The camera device may comprise an image sensor. The image sensor may be disposed in the substrate 1010. The image sensor may be disposed on the substrate 1010. The image sensor may be disposed on an upper surface of the substrate 1010. The image sensor may be electrically connected to the substrate 1010. For example, the image sensor may be coupled to the substrate 1010 by a surface mounting technology (SMT). As another example, the image sensor may be coupled to the substrate 1010 by a flip chip technology. The image sensor may be disposed so that the lens 1220 and the optical axis coincide. That is, the optical axis of the image sensor and the optical axis of the lens 1220 may be aligned. The image sensor may convert light irradiated to an effective image region of the image sensor into an electrical signal. The image sensor may be any one among a charge coupled device (CCD), a metal oxide semi-conductor (MOS), a CPD, and a CID.

The camera device may comprise a connector 1020. The connector 1020 may be connected to the substrate 1010 through the connection substrate 1030. The connector 1020 may comprise a port for electrically connecting to an external device.

The camera device may comprise a sensor base 1040. The sensor base 1040 may be disposed between the holder 1100 and the substrate 1010. A filter 1050 may be disposed in the sensor base 1040. An opening may be formed in a portion of the sensor base 1040 in which the filter 1050 is disposed so that light passing through the filter 1050 may be incident on the image sensor.

The camera device may comprise a filter 1050. The filter 1050 may comprise an infrared filter. The infrared filter may block light of the infrared region from being incident on the image sensor. An infrared filter may reflect infrared radiation. Or, the infrared filter may absorb infrared radiation. The infrared filter may be disposed between the lens module 1200 and the image sensor. The infrared filter may be disposed in the sensor base 1040.

The camera device may comprise a holder 1100. The holder 1100 may be disposed on the substrate 1010. The holder 1100 may be disposed in the sensor base 1040. The holder 1100 may be disposed on an upper surface of the sensor base 1040. The holder 1100 may be coupled to the sensor base 1040. The holder 1100 may be coupled to the lens module 1200. The holder 1100 may be disposed inside the cover 1800. The holder 1100 may be formed of an insulating material.

The holder 1100 may comprise a step portion 1120. The step portion 1120 may be protruded from a lateral surface of the holder 1100. The step portion 1120 may be formed in an outer circumference of the holder 1100. A side plate 1820 of the cover 1800 may be disposed in the step portion 1120. The step portion 1120 may be overlapped with the side plate 1820 of the cover 1800 in a direction parallel to an optical axis (vertical direction).

The holder 1100 may comprise a groove 1130. The groove 1130 may be formed on a lateral surface of the holder 1100. The groove 1130 may be recessed from the lateral surface of the holder 1100 to the lateral surface of the holder terminal 1400. Through this, the groove 1130 may expose at least a portion of the lateral surface of the holder terminal 1400.

The holder 1100 may comprise a hole 1140. The hole 1140 may be a hollow hole penetrating the holder 1100 in an optical axis direction. A lens module 1200 may be disposed in the hole 1140.

The holder 1100 may comprise a partition wall 1150. The partition wall 1150 may be provided in plurality to form an epoxy tank in which a silver (Ag) epoxy is accommodated. That is, an epoxy tank may be formed between the plurality of partition walls 1150. In a second embodiment of the present invention, the epoxy tank can be described as being formed in a way that the partition wall 1150 is protruded from an upper surface and an inner lateral surface of the holder 1100. Or, the epoxy tank may be described as being formed by a groove 1160 into which a portion of the holder 1100 is recessed. In a second embodiment of the present invention, an epoxy tank, which is a space in which the epoxy is accommodated, is formed between the plurality of partition walls 1150, and this part may be referred to as a groove 1160. A second conductive member 1720 may be disposed between the partition walls 1150. A silver (Ag) epoxy may be disposed between the partition walls 1150.

The holder 1100 may comprise a pillar 1170. The pillar 1170 may be protruded from an upper surface of the holder 1100. The pillar 1170 may be formed at each of the four corners of the holder 1100. The four pillars 1170 may prevent the lens module 1200 and the variable lens part 1300 disposed therein from being separated. The pillar 1170 may be coupled to the cover 1800.

The camera device may comprise a lens module 1200. The lens module 1200 may be disposed in the holder 1100. The lens module 1200 may be coupled to the holder 1100. The lens module 1200 may be disposed inside the holder 1100.

The lens module 1200 may comprise a lens holder 1210. The lens holder 1210 may be a lens barrel. The lens holder 1210 may accommodate a lens therein. The inner circumferential surface of the lens holder 1210 may be formed in a shape corresponding to the outer circumference surface of the lens 1220. The lens holder 1210 may be formed of an insulating material.

The lens holder 1210 may comprise a hole 1212. The hole 1212 may be a variable lens accommodating hole in which the variable lens part 1300 is disposed. A variable lens part 1300 may be disposed in the hole 1212. The hole 1212 may be formed to have a height greater than the height of the variable lens part 1300 by a predetermined size. The hole 1212 may penetrate through the lens module 1200 in a direction perpendicular to an optical axis. The liquid lens 1310 may be horizontally inserted into the hole 1212 of the lens module 1200 and coupled thereto.

The lens module 1200 may comprise a lens 1220. The lens 1220 may be disposed in the lens holder 1210. The lens may be a solid lens. The lens may be a plastic lens. The lens 1220 may comprise a plurality of lenses. The lens 1220 may comprise an upper lens 1221 and a lower lens 1222. The upper lens 1221 may be disposed at an upper side of the liquid lens 1310. The lower lens 1222 may be disposed at a lower side the liquid lens 1310. Each of the upper lens 1221 and the lower lens 1222 may comprise a plurality of lenses. The upper lens 1221 may comprise three lenses and the lower lens 1222 may comprise two lenses. However, the number of lenses of the upper lens 1221 and the number of lenses of the lower lens 1222 are not limited thereto. Although a lens 1220, an upper lens 1221, and a lower lens 1222 are illustrated in the drawing, what the corresponding reference numbers refer to in the drawings may correspond to a space in which a lens is accommodated, not a lens.

The camera device may comprise a variable lens part 1300. The variable lens part 1300 may be coupled to the lens module 1200. The variable lens part 1300 may be coupled to the lens holder 1210. The variable lens part 1300 may be disposed in the lens holder 1210. The variable lens part 1300 may be spaced apart from the holder 1100. The variable lens part 1300 may be aligned with the lens 1220 and the image sensor. The variable lens part 1300 may be fixedly inserted into the lens module 1200 in a horizontal direction.

The variable lens part 1300 may comprise a variable lens. The variable lens may be a variable focus lens. The variable lens may be a lens whose focus is controlled. The focus may be adjusted by moving the lens and/or changing the shape of the lens. The variable lens may comprise at least one among a liquid lens 1310, a polymer lens, a liquid crystal lens, a voice coil motor (VCM) actuator, a shape memory alloy (SMA) actuator, and a micro electro mechanical systems (MEMS) actuator.

The liquid lens 1310 may comprise at least one of a liquid lens 1310 comprising one type of liquid and a liquid lens 1310 comprising two types of liquids. The liquid lens 1310 comprising one type of liquid may change the focus by adjusting a membrane disposed at a position corresponding to the liquid. For example, the focus can be changed by pressing the membrane by the electromagnetic force of the magnet and coil. The liquid lens 1310 comprising two types of liquids may comprise a conductive liquid and a non-conductive liquid. In this case, the focus may be changed by adjusting the interface formed between the conductive liquid and the non-conductive liquid using a voltage applied to the liquid lens 1310.

The polymer lens can change the focus by controlling a polymer material through a driving unit such as a piezo. The liquid crystal lens can change the focus by controlling the liquid crystal by electromagnetic force. The VCM actuator can change focus by moving a solid lens or a lens assembly comprising a solid lens through electromagnetic force between a magnet and a coil. The SMA actuator may change the focus by moving a solid lens or a lens assembly comprising the solid lens using a shape memory alloy. The MEMS actuator may change a focus by moving a solid lens or a lens assembly comprising the solid lens through electrostatic force generated when voltage is applied.

The variable lens part 1300 may comprise a liquid lens 1310. The liquid lens 1310 may be disposed in the lens module 1200. The liquid lens 1310 may be disposed inside the liquid lens holder 1320. The liquid lens 1310 may be disposed between the plurality of lenses 1220. The liquid lens 1310 may be disposed between the upper lens 1221 and the lower lens 1222. The liquid lens 1310 may be disposed in the hole 1212 of the lens module 1200.

The liquid lens 1310 whose focal length is adjusted in response to the driving voltage may receive an operating voltage through the terminal 1311. The terminal 1311 of the liquid lens 1310 may comprise an individual terminal 1312 and a common terminal 1313. The individual terminal 1312 may comprise four individual terminals disposed at four corners of the liquid lens 1310. The individual terminal 1312 may be disposed on the upper surface of the liquid lens 1310. At this time, the individual terminal 1312 may be referred to as an upper terminal. The common terminal 1313 may comprise four common terminals disposed at four corners of the liquid lens 1310. The common terminal 1313 may be disposed on a lower surface of the liquid lens 1310. At this time, the common terminal 1313 may be referred to as a lower terminal. When an operating voltage is applied through the individual terminal 1312 and the common terminal 1313, the interface between the conductive liquid and the non-conductive liquid disposed in the lens region may be deformed. Hereinafter, any one of the individual terminal 1312 and the common terminal 1313 may be referred to as a 'first terminal' and the other may be referred to as a 'second terminal'.

The liquid lens 1310 may be spaced apart from the solid lens. In a second embodiment of the present invention, epoxy may be applied to the space between the liquid lens 1310 and the solid lens. At this time, active alignment between the liquid lens 1310 and the solid lens may be performed. Active alignment between the liquid lens 1310 and the solid lens may be performed through the following steps. First, the liquid lens 1310 may be disposed on the solid lens, and the assembly of the liquid lens 1310 and the solid lens may be disposed on the master sensor. Thereafter, while moving the liquid lens 1310 on the virtual grid pattern and applying voltages assigned to a plurality of codes to the liquid lens 1310, a point in which the amount of light detected by the master sensor is greatest may be determined. When the point with the largest amount of light is determined, the liquid lens 1310 is positioned at the corresponding point, and the epoxy bonding the liquid lens 1310 to the solid lens can be pre-cured through ultraviolet rays. Thereafter, the liquid lens 1310 may be fixed to the solid lens by main curing of the epoxy through heat.

Meanwhile, the lens unit formed by fixing the liquid lens 1310 to the solid lens may be actively aligned with the image sensor. While the lens unit is moved on the virtual grid and voltages assigned to a plurality of codes are applied to the liquid lens 1310, the point where the amount of light sensed by the image sensor is the largest can be determined, and the lens unit can be fixed at the corresponding point. At this time, like the previously described coupling of the liquid lens 1310 and the solid lens, the lens unit can be fixed in place through pre-curing and main curing using epoxy.

Furthermore, in the above description, the liquid lens 1310 and the solid lens are first actively aligned and then the assembly of the liquid lens 1310 and the solid lens is actively aligned with the image sensor, but The solid lens and the image sensor may be first actively aligned, and then the liquid lens 1310 may be actively aligned, or, the liquid lens 1310 and the image sensor is first actively aligned, and then the solid lens may be actively aligned.

One side of the liquid lens 1310 may receive a voltage from the individual terminal 1312. The other side of the liquid lens 1310 may receive a voltage from the common terminal 1313. In a second embodiment of the present invention, the individual terminal 1312 of the liquid lens 1310 may be an individual electrode, and the common terminal 1313 may be a common electrode. Or, the individual terminal 1312 of the liquid lens 1310 may be a common electrode and the common terminal 1313 may be an individual electrode. In the liquid lens 1310, the interface formed between the conductive liquid and the non-conductive liquid may be deformed by the current and/or voltage applied to the individual terminal 1312 and the common terminal 1313. Through this, any one or more of the AF function and the OIS function may be performed.

The liquid lens 1310 may comprise a terminal 1311. The terminal 1311 may comprise a plurality of terminals. The terminal 1311 may comprise an individual terminal 1312 formed on an upper surface of the liquid lens 1310 and a common terminal 1313 formed on a lower surface of the liquid lens 1310. Each of the individual terminal 1312 and the common terminal 1313 may be formed at each of the four corners of the liquid lens 1310.

The terminal 1311 of the liquid lens 1310 may comprise an individual terminal 1312. The individual terminal 1312 may be an upper terminal. The individual terminal 1312 may be disposed on the first surface of the liquid lens 1310. In this case, the first surface of the liquid lens 1310 may be an upper surface. Or, the first surface of the liquid lens 1310 may be a lower surface. The individual terminal 1312 of the liquid lens 1310 may comprise a plurality of individual terminals. The individual terminal 1312 may comprise four individual terminals. For example, the liquid lens 1310 may be coupled to the lens holder 1210 such that the individual terminal 1312 faces upward. In a modified embodiment, the liquid lens 1310 may be coupled to the lens holder 1210 such that the individual terminal 1312 faces downward.

The terminal 1311 of the liquid lens 1310 may comprise a common terminal 1313. The common terminal 1313 may be a lower terminal. The common terminal 1313 may be disposed on a second surface opposite to the first surface of the liquid lens 1310. At this time, the second surface of the liquid lens 1310 may be a lower surface. Or, the second surface of the liquid lens 1310 may be an upper surface.

The common terminal 1313 of the liquid lens 1310 may comprise a plurality of common terminals 1313. The common terminal 1313 may comprise four second terminals. At least a portion of the plurality of common terminals 1313 may be electrically connected to the third connection terminal 1600. Any one of the four common terminals may be electrically connected to the third connection terminal 1600. Or, the third connection terminal 1600 may connect all four common terminals. Or, two or three terminals among the four common terminals may be connected by the third connection terminal 1600.

The description of the variable lens may be analogously applied to the description of the liquid lens 1310. Accordingly, the coupling structure between the liquid lens 1310 and other components may be applied to the coupling structure between the variable lens and other components.

The variable lens part 1300 may comprise a liquid lens holder 1320. The liquid lens holder 1320 may be coupled to the liquid lens 1310. A lower surface of the liquid lens holder 1320 may be disposed higher than an upper surface of the holder 1100. A liquid lens 1310 may be disposed inside the liquid lens holder 1320. A connection terminal 1500 may be coupled to the liquid lens holder 1320. A connection terminal 1500 may be integrally formed in the liquid lens holder 1320 by insert injection.

The liquid lens holder 1320 may comprise a hole 1321. The hole 1321 may be a hollow hole. The hole 1321 may penetrate through the liquid lens holder 1320 in an optical axis direction. A liquid lens 1310 may be disposed in the hole 1321 of the liquid lens holder 1320. Accordingly, the hole 1321 may be formed in a shape corresponding to the liquid lens 1310. The liquid lens holder 1320 may comprise a first groove 1322. A second region 1620 of the third connection terminal 1600 may be disposed in the first groove 1322. The first groove 1322 may be formed by being recessed in the lower surface of the liquid lens holder 1320. A first conductive member 1710 may be disposed in the first groove 1322. The liquid lens holder 1320 may comprise a partition wall 1323. The partition wall 1323 may be disposed at both sides of the first groove 1322. The partition wall 1323 may be formed to be protruded from a lower surface of the liquid lens holder 1320. The partition wall 1323 may prevent the first conductive member 1710 from being separated.

The liquid lens holder 1320 may comprise a second groove 1324. A fourth region 1640 of the third connection terminal 1600 may be disposed in the second groove 1324. The second groove 1324 may be formed in a shape corresponding to the fourth region 1640 of the third connection terminal 1600. The fourth region 1640 of the third connection terminal 1600 may be fixed to the second groove 1324 through epoxy. The second groove 1324 may be formed in a lower surface of the liquid lens holder 1320 by being recessed. The liquid lens holder 1320 may comprise a third groove 1325. A connection terminal 1500 may be disposed in the third groove 1325. The third groove 1325 may be formed by being recessed in at least one among an upper surface, a lateral surface, and a lower surface of the liquid lens holder 1320. The recessed depth of the third groove 1325 may correspond to the thickness of the connection terminal 1500. However, in a modified embodiment, the recessed depth of the third groove 1325 may be greater than the thickness of the connection terminal 1500. The liquid lens holder 1320 may comprise a fourth groove 1326. The fourth groove 1326 may be formed on the inner circumferential surface of the liquid lens holder 1320. An epoxy for fixing the liquid lens 1310 to the liquid lens holder 1320 may be disposed in the fourth groove 1326.

The liquid lens holder 1320 may comprise a third groove 1325 having a shape corresponding to the connection terminal 1500 so that the connection terminal 1500 is inserted. The variable lens part 1300 may comprise a variable lens holder. The description of the variable lens holder may be analogously applied to the description of the liquid lens holder 1320.

The camera device may comprise a holder terminal 1400. The holder terminal 1400 may be disposed in the holder 1100. The holder terminal 1400 may be exposed on the upper surface of the holder 1100. The holder terminal 1400 may be connected to the second conductive member 1720 disposed on an upper surface of the holder 1100. The holder terminal 1400 may be integrally formed in the holder 1100 through insert injection. The holder terminal 1400 may electrically connect the connection terminal 1500 and the substrate 1010.

The holder terminal 1400 may comprise a first holder terminal 1410. The first holder terminal 1410 may be electrically connected to the first connection terminal 1510. A portion of the first holder terminal 1410 may be exposed on the upper surface of the holder 1100. An upper surface of a portion of the first holder terminal 1410 may be disposed on a same plane as a bottom surface of the groove 1160 of the holder 1100. A lower end of the first holder terminal 1410 may be connected to the terminal 1011 of the substrate 1010 through solder.

The holder terminal 1400 may comprise a second holder terminal 1420. The second holder terminal 1420 may be electrically connected to the second connection terminal 1520. A portion of the second holder terminal 1420 may be exposed on the upper surface of the holder 1100. An upper surface of a portion of the second holder terminal 1420 may be disposed on a same plane as a bottom surface of the groove 1160 of the holder 1100. A lower end of the second holder terminal 1420 may be connected to the terminal 1011 of the substrate 1010 through solder. FIG. 23 is a modified embodiment, and the second holder terminal 1420 may be disposed at a position corresponding to the second connection terminal 1520. That is, the position of the second holder terminal 1420 may be changed according to the position of the second connection terminal 1520.

The camera device may comprise a connection terminal 1500. The connection terminal 1500 may be disposed in the liquid lens holder 1320. The connection terminal 1500 may be disposed in the variable lens holder. The connection terminal 1500 may be electrically connected to the liquid lens 1310. The connection terminal 1500 may be electrically connected to the variable lens. The connection terminal 1500 may electrically connect the liquid lens 1310 and the holder terminal 1400. The connection terminal 1500 may be integrally formed to the liquid lens holder 1320 through insert injection. A lateral surface of a portion of the connection terminal 1500 may be disposed on a same plane as a lateral surface of the liquid lens holder 1320.

The connection terminal 1500 may comprise a first connection terminal 1510. The first connection terminal 1510 may be electrically connected to the individual terminal 1312 of the liquid lens 1310. The first connection terminal 1510 may electrically connect the individual terminal 1312 of the liquid lens 1310 and the first holder terminal 1410. The first connection terminal 1510 may be provided in a number corresponding to the plurality of individual terminals 1312 to be electrically connected to each of the plurality of individual terminals 1312. The first connection terminal 1510 may be provided in pairs and connected to the four individual terminals 1312 in pairs.

The first connection terminal 1510 may comprise a first region 1511. The first region 1511 may be extended inwardly from the second region 1512. The first region 1511 may be connected to the individual terminal 1312 of the liquid lens 1310 through a conductive member. The first region 1511 may be disposed along the first surface of the variable lens holder corresponding to the first surface of the variable lens.

The first connection terminal 1510 may comprise a second region 1512. The second region 1512 may be fixed to the liquid lens holder 1320. The second region 1512 may be coupled to the liquid lens holder 1320. The second region 1512 may be disposed on a lateral surface of the liquid lens holder 1320. The second region 1512 may be disposed along a lateral surface of the liquid lens holder 1320. The second region 1512 of the first connection terminal 1510 may be a portion where a pogo pin is to be in contact with to apply a current to the liquid lens 1310 in the process of aligning the liquid lens 1310 with the lens module 1200 and/or the image sensor.

The first connection terminal 1510 may comprise a third region 1513. The third region 1513 may be extended outwardly from the second region 1512. The third region 1513 may be bent at the second region 1512. The third region 1513 may be extended to the outside of the variable lens holder. The third region 1513 may be connected to the second conductive member 1720 being connected to the holder terminal 1400.

The connection terminal 1500 may comprise a second connection terminal 1520. The second connection terminal 1520 may be electrically connected to the common terminal 1313 of the liquid lens 1310. The second connection terminal 1520 may electrically connect the common terminal 1313 and the second holder terminal 1420 of the liquid lens 1310. The second connection terminal 1520 may be provided as one. As a modified embodiment, the second connection terminal 1520 may comprise a plurality of terminals.

The second connection terminal 1520 may comprise a first region 1521. The first region 1521 may be disposed along a first surface of the liquid lens holder 1320 corresponding to a first surface of the liquid lens 1310. At this time, the first surface may be an upper surface. The first region 1521 may be extended along the first surface of the liquid lens holder 1320 corresponding to the first surface of the liquid lens 1310. The first region 1521 may be connected to one end of the second region 1522 of the second connection terminal 1520. The first region 1521 may be connected to an upper end of the second region 1522 of the second connection terminal 1520. The first region 1521 may be spaced apart from the third connection terminal 1600. The first region 1521 may be vertically overlapped with the third connection terminal 1600. The first region 1521 may be formed of a flat plate. However, even in this case, a portion where the first region 1521 and the second region 1522 meet may be formed to have a curvature.

The second connection terminal 1520 may comprise a second region 1522. The second region 1522 may be extended from the first region 1521 toward a second surface of the liquid lens holder 1320 corresponding to a second surface of the liquid lens 1310. At this time, the second surface may be a lower surface. An upper end of the second region 1522 may be connected to the first region 1521. The lower end of the second region 1522 may be connected to the third region 1523.

In a second embodiment of the present invention, an outer surface of the second region 1522 may be exposed. The outer surface of the second region 1522 may be exposed to the outer side. The outer surface of the second region 1522 may not be overlapped with the holder 1100 in a direction perpendicular to an optical axis. An outer surface of the second region 1522 may be exposed to be in contact with a pogo pin during a manufacturing process.

In a second embodiment of the present invention, an inner surface of the second region 1522 may be connected to the third connection terminal 1600 and the first conductive member 1710. The inner surface of the second region 1522 may be disposed perpendicular to the third connection terminal 1600. However, the inner surface of the second region 1522 may be disposed adjacent to the third connection terminal 1600. In a second embodiment of the present invention, since the first conductive member 1710 connecting the second region 1522 and the third connection terminal 1600 is connected to the inner surface of the second region 1522, the length in the horizontal direction of the second connection terminal 1520 can be reduced by a predetermined length (refer to A of FIG. 29) when compared to the modified embodiment of FIG. 29.

In a second embodiment of the present invention, the configuration of the second connection terminal 1520 closest to the third connection terminal 1600 may be a second region 1522. In this case, the second region 1522 of the second connection terminal 1520 may be vertically disposed with respect to the third connection terminal 1600.

In a second embodiment of the present invention, the second region 1522 of the second connection terminal 1520 may not be overlapped more than twice in a direction perpendicular to an optical axis. In a modified embodiment illustrated in FIG. 29, the second region 1522a may be doubly overlapped in a direction perpendicular to an optical axis. In a modified embodiment, a portion in which the second region 1522a is doubly overlapped may occur due to the portion bent in the U-shape of the second region 1522a. In a second embodiment of the present invention, when compared to the modified embodiment, the length of the second connection terminal 1520 and the liquid lens holder 1320 in the horizontal direction may be reduced by a predetermined length (refer to A of FIG. 29) through the difference in the shape of the second region 1522.

Meanwhile, when comparing the second embodiment of the present invention with the modified embodiment, the second embodiment of the present invention enables visual confirmation from the outside whether the first conductive member 1710 is in contact with the second region 1522 of the second connection terminal 1520 or not, so it has an advantage in that an inspection for electrical conduction is easy.

The second connection terminal 1520 may comprise a third region 1523. The third region 1523 may be extended outwardly from the second region 1522. The third region 1523 may be extended to a height corresponding to a second surface of the liquid lens holder 1320. In this case, the second surface may be a lower surface. The third region 1523 may be connected to the other end of the second region 1522 of the second connection terminal 1520. Here, the other end of the second region 1522 may be an end opposite to the end to which the first region 1521 is connected. The third region 1523 may be connected to a lower end of the second region 1522 of the second connection terminal 1520. The third region 1523 of the second connection terminal 1520 may be connected to the second conductive member 1720.

The camera device may comprise a third connection terminal 1600. The third connection terminal 1600 may connect the second terminal (common terminal 1313) and the second connection terminal 1520 of the variable lens. The third connection terminal 1600 may be connected to an inner surface of the second region 1522 of the second connection terminal 1520 through the first conductive member 1710. The third connection terminal 1600 may be connected to the common terminal 1313 of the liquid lens 1310 through a conductive member. The third connection terminal 1600 may be connected to only one of the four common terminals 1313 through the conductive member. In a modified embodiment, the third connection terminal 1600 may be connected to all four common terminals 1313 through a conductive member. The first conductive member 1710 may connect the third connection terminal 1600 to the second region 1522 and the third region 1523 of the second connection terminal 1520.

The third connection terminal 1600 may comprise a first region 1610. The first region 1610 may be connected to the common terminal 1313 of the liquid lens 1310. The first region 1610 may be electrically connected to the common terminal 1313 of the liquid lens 1310. The first region 1610 may be coupled to the common terminal 1313 of the liquid lens 1310. The third connection terminal 1600 may comprise a second region 1620. The second region 1620 may be connected to the second connection terminal 1520 and the first conductive member 1710. The second region 1620 may be electrically connected to the second connection terminal 1520. The second region 1620 may be coupled to the second connection terminal 1520. The second region 1620 may comprise a plurality of protrusions in the shape of a fork. The plurality of protrusions of the second region 1620 may increase the contact area with the silver (Ag) epoxy. The third connection terminal 1600 may comprise a third region 1630. The third region 1630 may connect the first region 1610 and the second region 1620. The third region 1630 may be fixed to the liquid lens holder 1320. The third connection terminal 1600 may comprise a fourth region 1640. The fourth region 1640 may be extended outwardly from the first region 1610. The fourth region 1640 may be fixed to the liquid lens holder 1320 by an epoxy.

The camera device may comprise a conductive member. The conductive member may comprise silver (Ag) epoxy. The conductive member may be electrically conductive. The conductive member may have viscosity. The conductive member may be a conductive adhesive. The conductive member may comprise a first conductive member 1710 electrically connecting the third connection terminal 1600 and the second connection terminal 1520. The conductive member may comprise a second conductive member 1720 connecting the connection terminal 1500 and the holder terminal 1400.

The camera device may comprise a cover 1800. The cover 1800 may be coupled to the holder 1100. The cover 1800 may be disposed in the step portion 1120 of the holder 1100. The inner surface of the side plate 1820 of the cover 1800 may be fixed to the lateral surface of the holder 1100 by an adhesive. The cover 1800 may accommodate a portion of the lens module 1200 therein. The cover 1800 may form an outer appearance of the camera device. The cover 1800 may have a hexahedral shape with an open lower surface. The cover 1800 may be a non-magnetic material. The cover 1800 may be formed of a metal material. The cover 1800 may be formed of a metal plate. The cover 1800 may be connected to the ground portion of the substrate 1010. Through this, the cover 1800 may be grounded. The cover 1800 may block electromagnetic interference (EMI). At this time, the cover 1800 may be referred to as an 'EMI shield can'.

The cover 1800 may comprise an upper plate 1810 and a side plate 1820. The cover 1800 may comprise an upper plate 1810 comprising a hole, and a side plate 1820 being extended downward from the outer circumference of the upper plate 1810.

Hereinafter, a camera device according to a modified embodiment and a camera device according to another modified embodiment will be described with reference to the drawings. Hereinafter, differences from the second embodiment of the present invention will be mainly described. Accordingly, the description of the second embodiment of the present invention may be analogously applied to portions not described.

FIG. 29 is a cross-sectional view of a partial configuration of a camera device according to a modified embodiment.

The camera device according to a modified embodiment may comprise a liquid lens 1310, a liquid lens holder 1320, and a second connection terminal 1520*a*. However, in the modified embodiment, as compared with the second embodiment of the present invention, the shape of the second connection terminal 1520*a* and the shape of the liquid lens holder 1320 related thereto may be changed.

The second connection terminal 1520*a* may comprise: a third region 1523 having a protruded structure for connecting to the holder terminal 1400 through a silver (Ag) epoxy, and a second region 1522*a* formed so that at least a portion of the liquid lens holder 1320 is exposed to the outside in order to be in contact with the pogo pin during the process; and a first region 1521*a* having a parallel face-to-face structure to be connected to the third connection terminal 1600 through a silver (Ag) epoxy.

In a modified embodiment, a face-to-face structure of the third connection terminal 1600 and the first region 1521*a* is comprised, and since the first conductive member 1710 is disposed on the surfaces facing each other, there is an advantage in that the conductive area between the third connection terminal 1600 and the first region 1521*a* is wide.

In a modified embodiment, the second region 1522*a* may comprise a portion bent in a U shape. The second region 1522*a* may be doubly overlapped in a direction perpendicular to an optical axis.

FIG. 30 is a bottom perspective view of a partial configuration of a camera device according to another modified embodiment.

In a camera device according to another modified embodiment, the second region 1522 of the second connection terminal 1520*b* may be extended downward from a first portion of an outer circumference of the first region 1521. The second connection terminal 1520*b* may comprise a fourth region 1524 being extended downward from a second portion of an outer circumference of the first region 1521. The fourth region 1524 may comprise a hook shape. The fourth region 1524 may be formed to be shorter than the second region 1522 in a direction parallel to an optical axis. The fourth region 1524 may comprise a shape to be fixed to the liquid lens holder 1320.

The fourth region 1524 may be extended from a different surface from the second region 1522 in the first region 1521. Through this, the fourth region 1524 may not affect the size of the second connection terminal 1520*b* in a horizontal direction.

Hereinafter, a configuration of a camera device according to a third embodiment of the present invention will be described with reference to the drawings.

Figure 32:
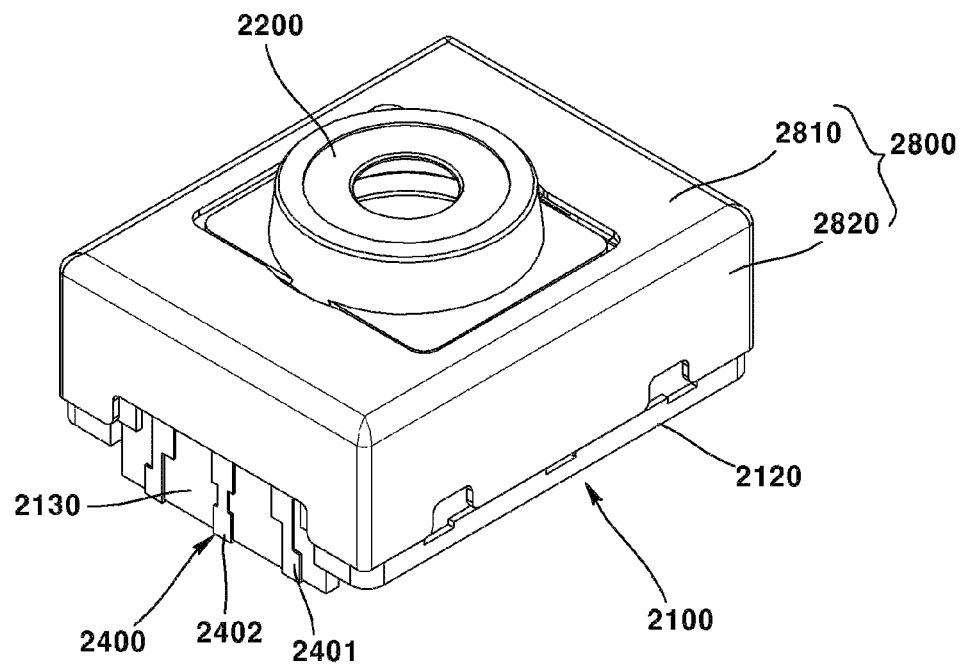
FIG. 32 is a perspective view of a partial configuration of a camera device according to a third embodiment of the present invention.
Figure 33:
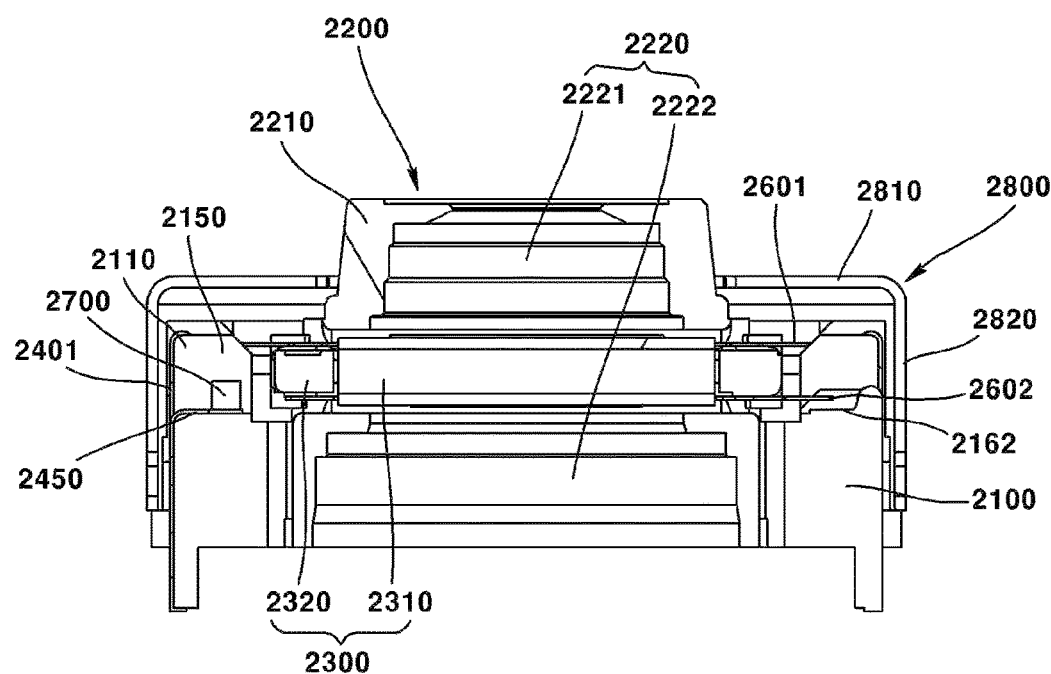
FIG. 33 is a cross-sectional view taken along line A-A of FIG. 32.
Figure 34:
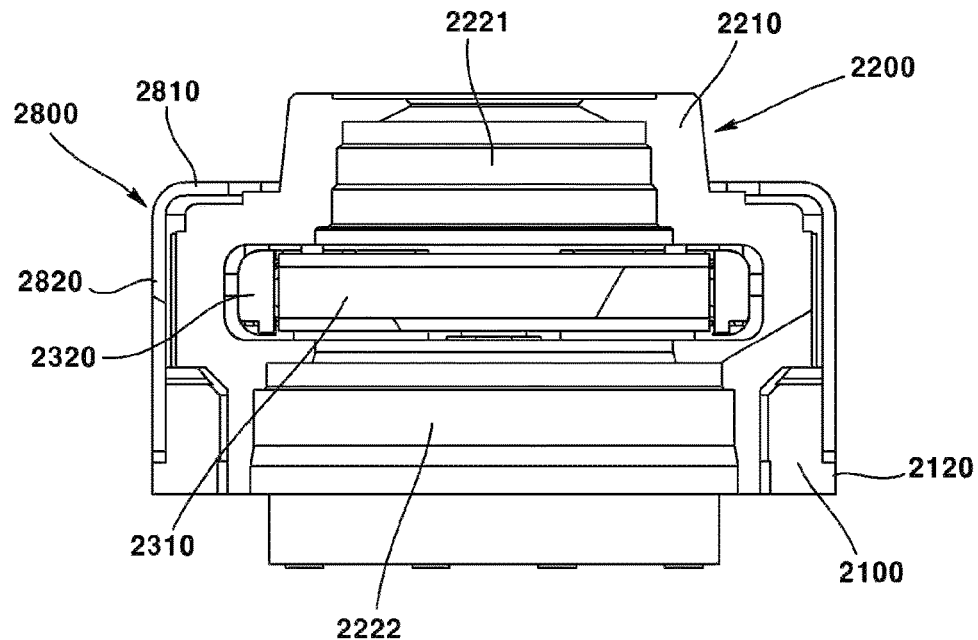
FIG. 34 is a cross-sectional view taken along line B-B of FIG. 32.
Figure 35:
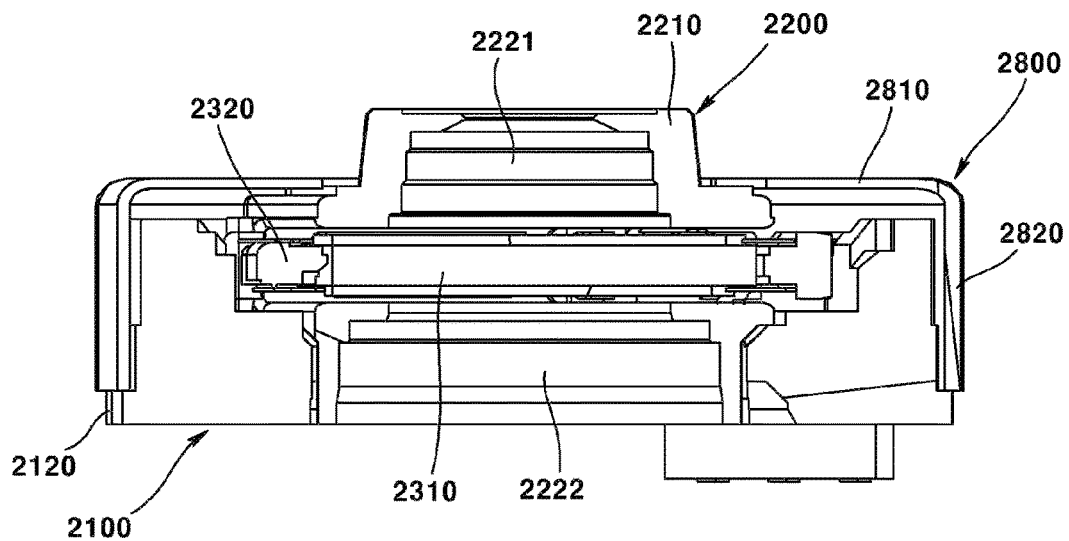
FIG. 35 is a cross-sectional view taken along line C-C of FIG. 32.
Figure 36:
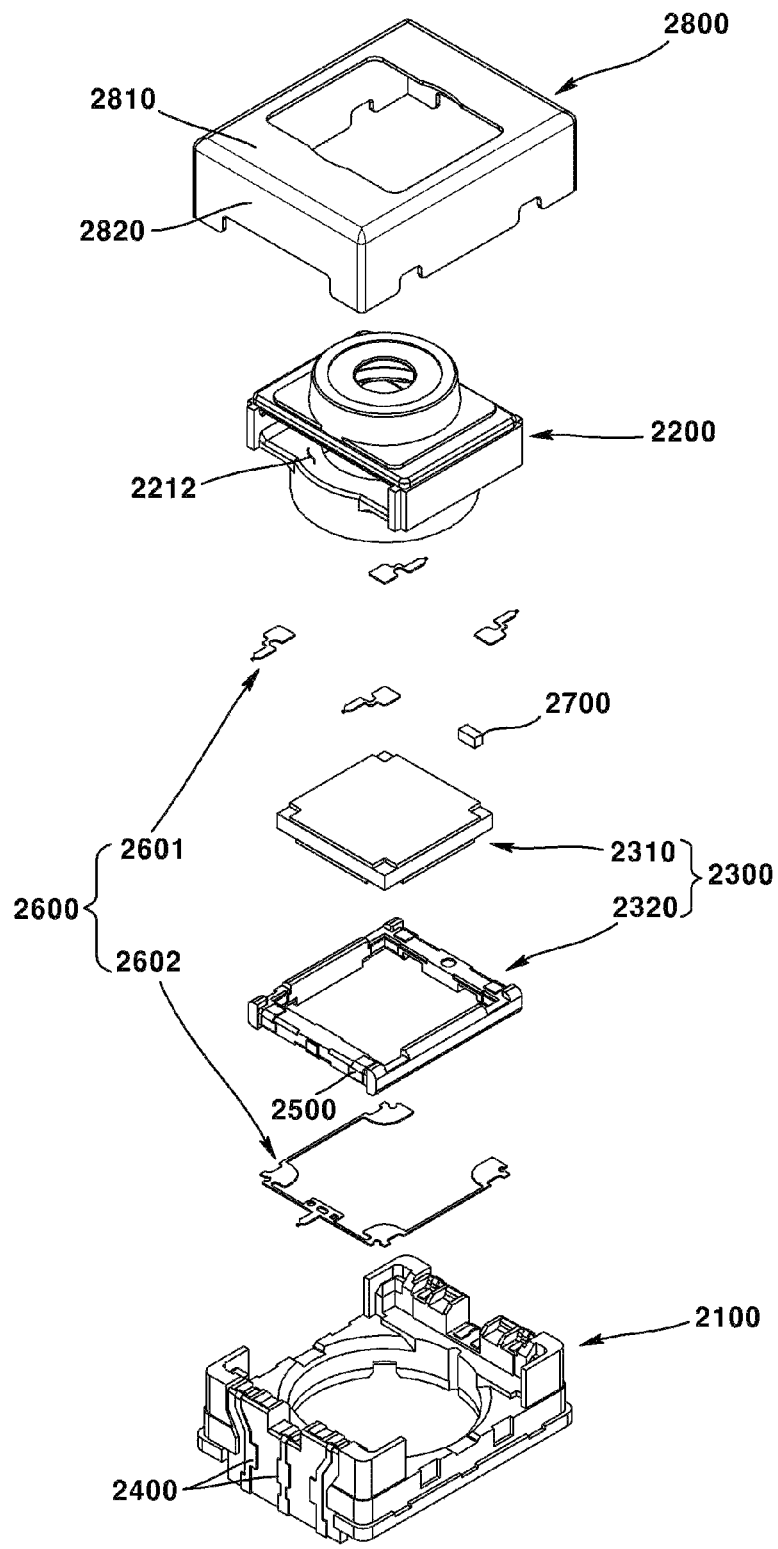
FIG. 36 is an exploded perspective view of a partial configuration of a camera device according to a third embodiment of the present invention.
Figure 37:
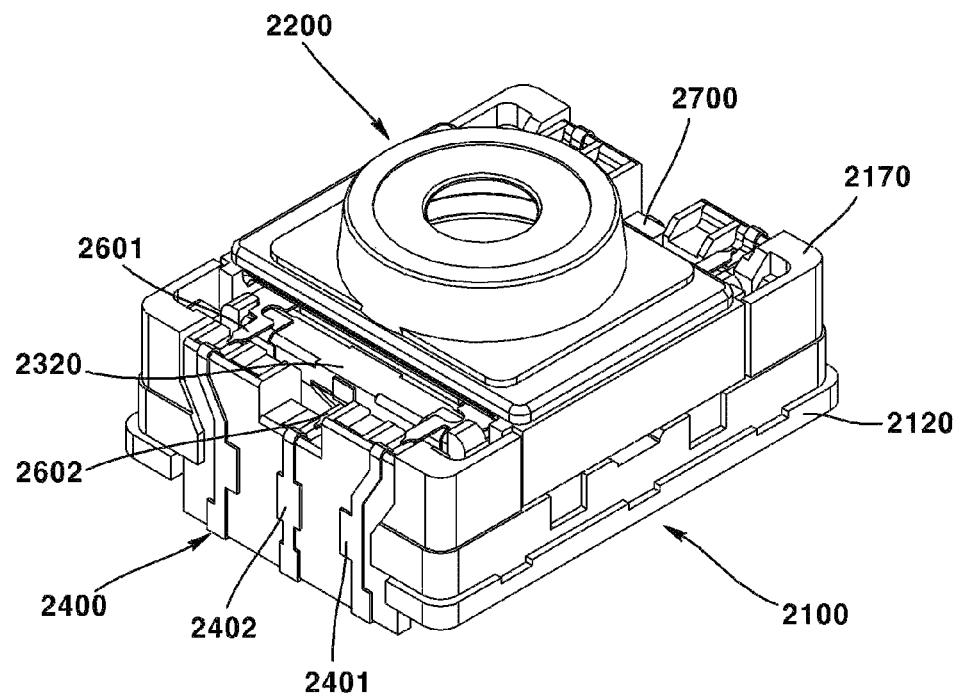
FIG. 37 is a perspective view of a partial configuration of a camera device according to a third embodiment of the present invention.
Figure 38:
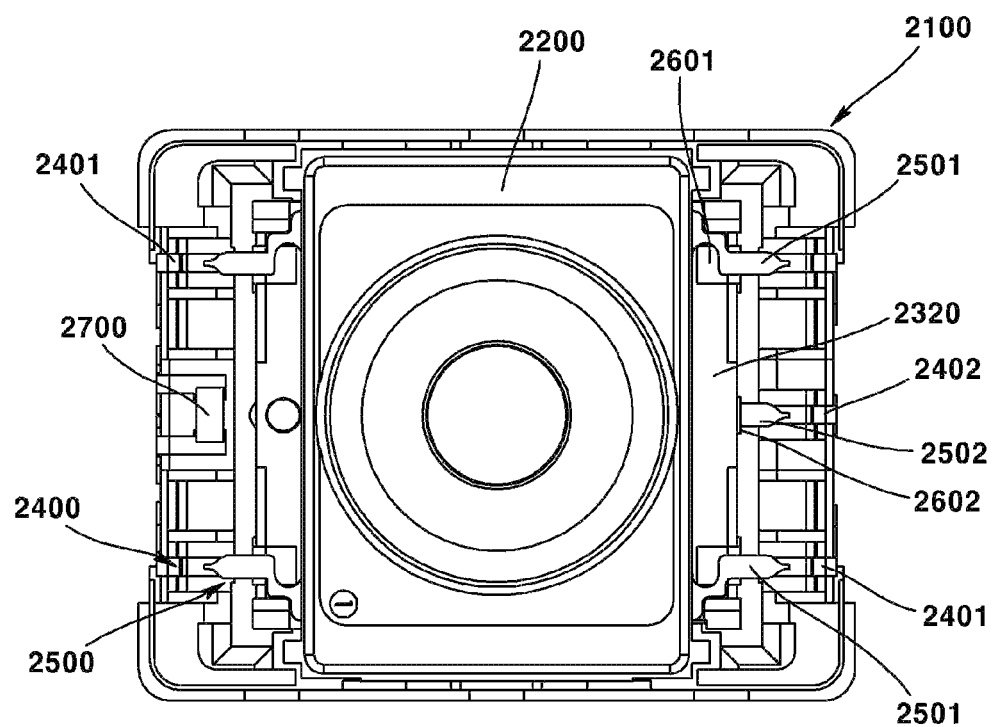
FIG. 38 is a plan view of a partial configuration of a camera device of FIG. 37.
Figure 39:
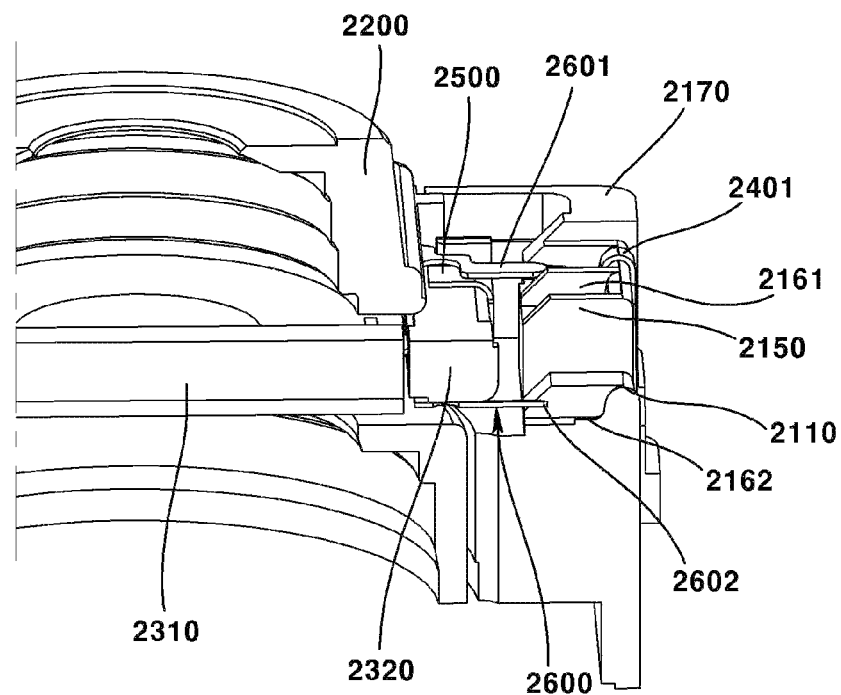
FIGS. 39 and 40 are cross-sectional perspective views of partial configurations of a camera device according to a third embodiment of the present invention.
Figure 40:
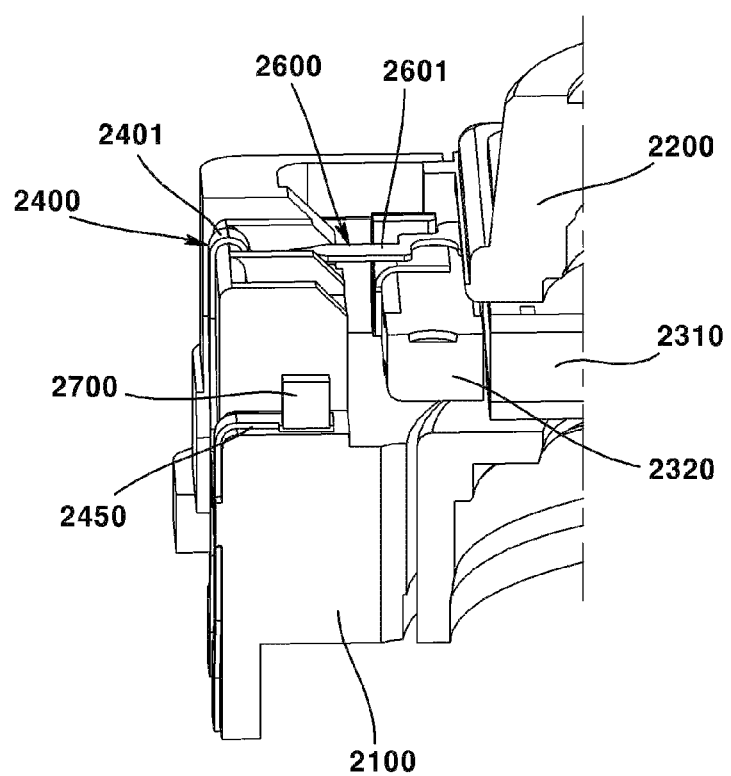
Figure 41:
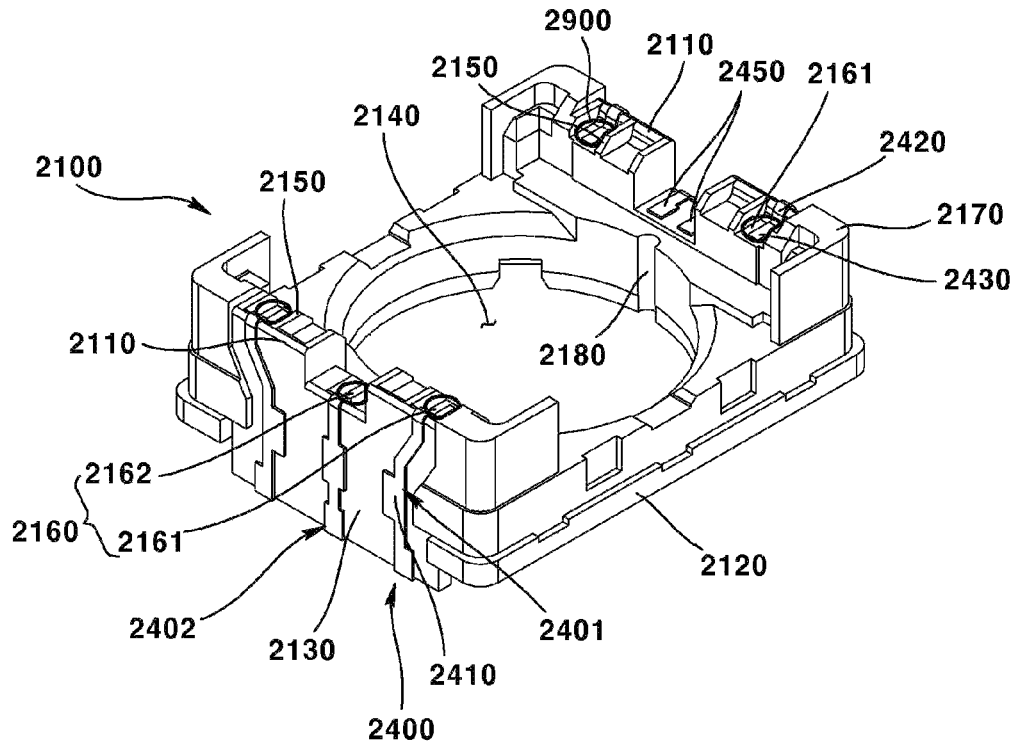
FIGS. 41 and 42 are perspective views of a partial configuration of a camera device according to a third embodiment of the present invention.
Figure 42:
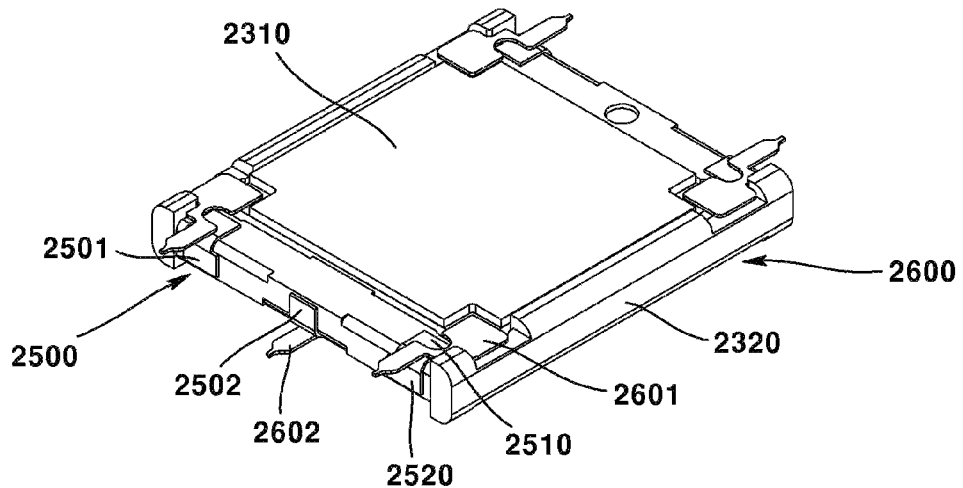
Figure 43:
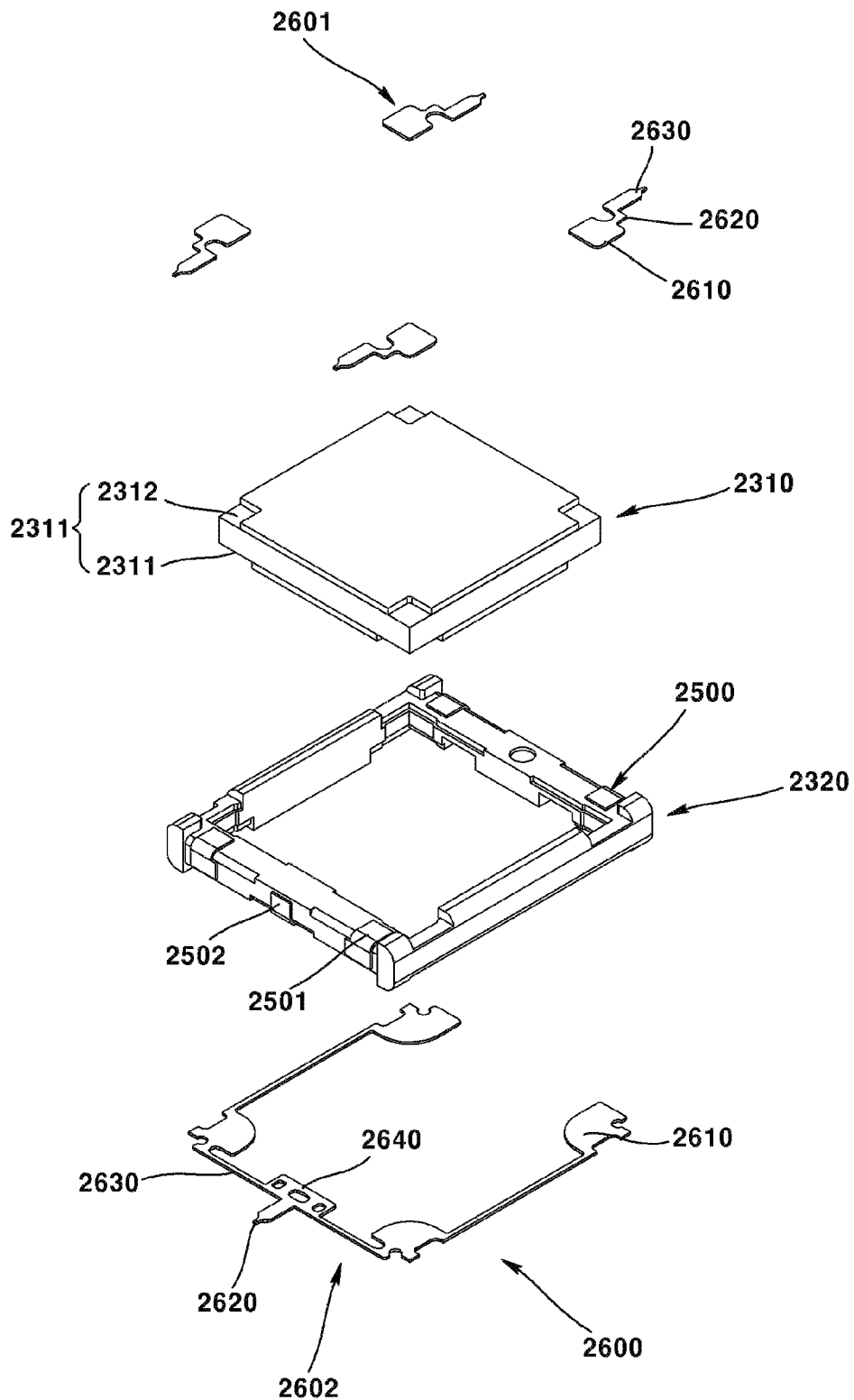
FIG. 43 is an exploded perspective view of a partial configuration of the camera device of FIG. 42.
Figure 44:
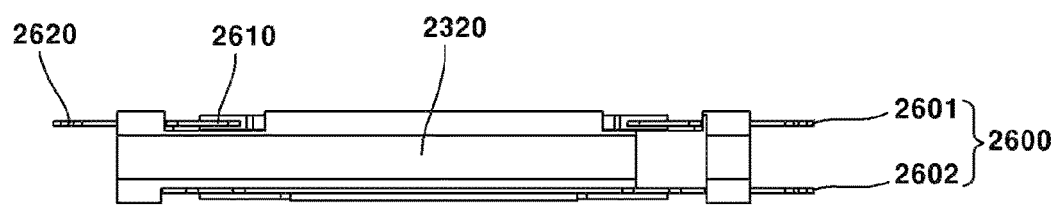
FIG. 44 is a side view of a partial configuration of the camera device of FIG. 42.
Figure 45:
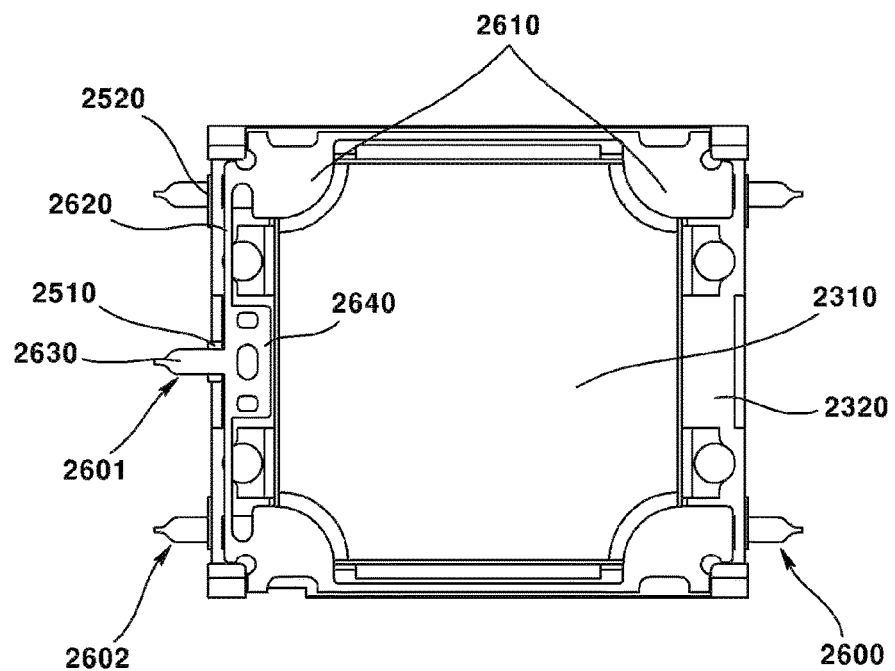
FIG. 45 is a bottom view of a partial configuration of the camera device of FIG. 42.
Figure 46:
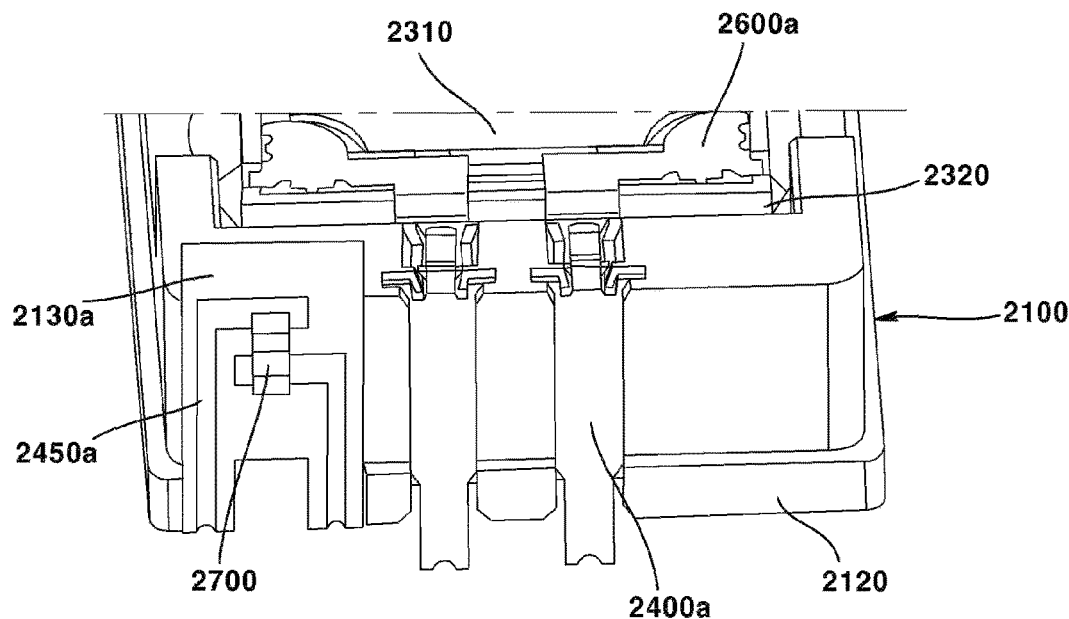
FIG. 46 is a perspective view of a partial configuration of a camera device according to a modified embodiment.
Figure 47:
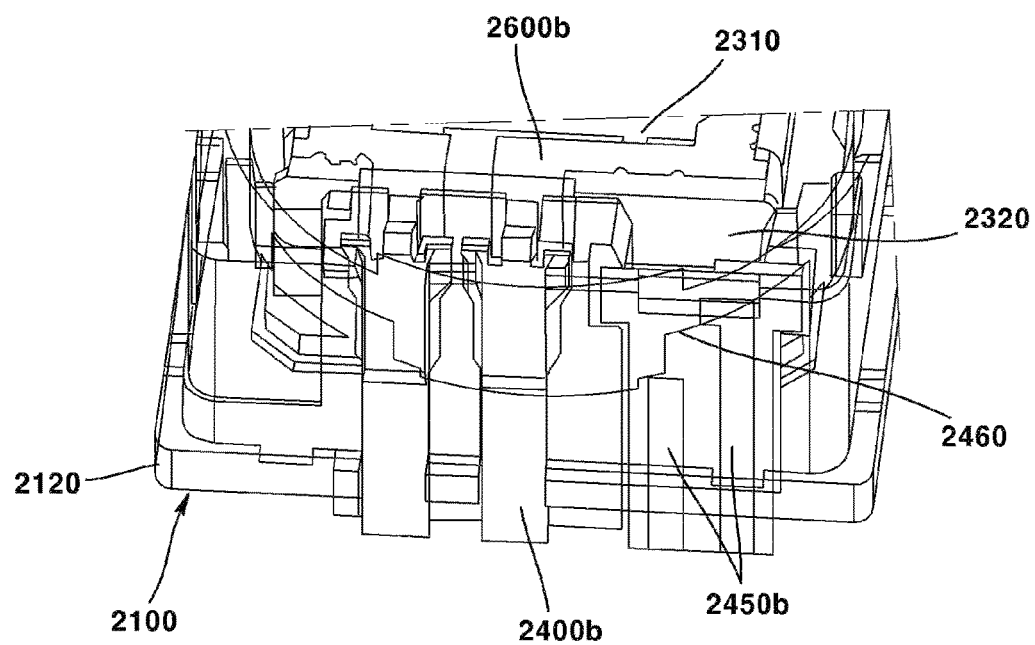
FIG. 47 is a perspective view of a partial configuration of a camera device according to another modified embodiment.
Figure 48:
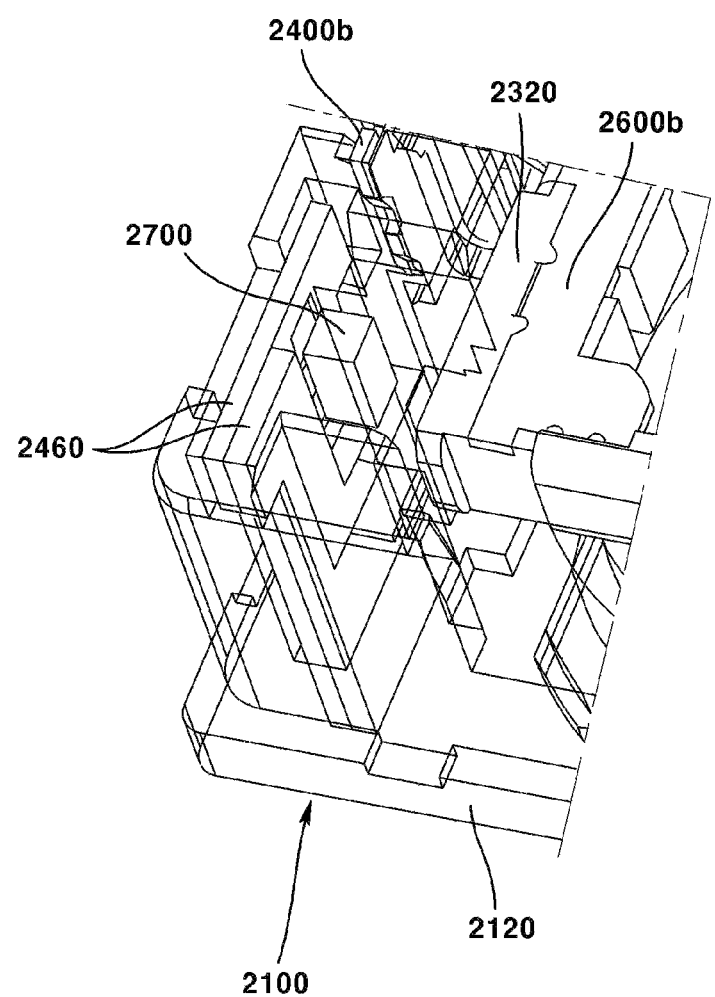
FIG. 48 is a perspective view of a partial configuration of the camera device of FIG. 47 viewed from another angle.
Figure 49:
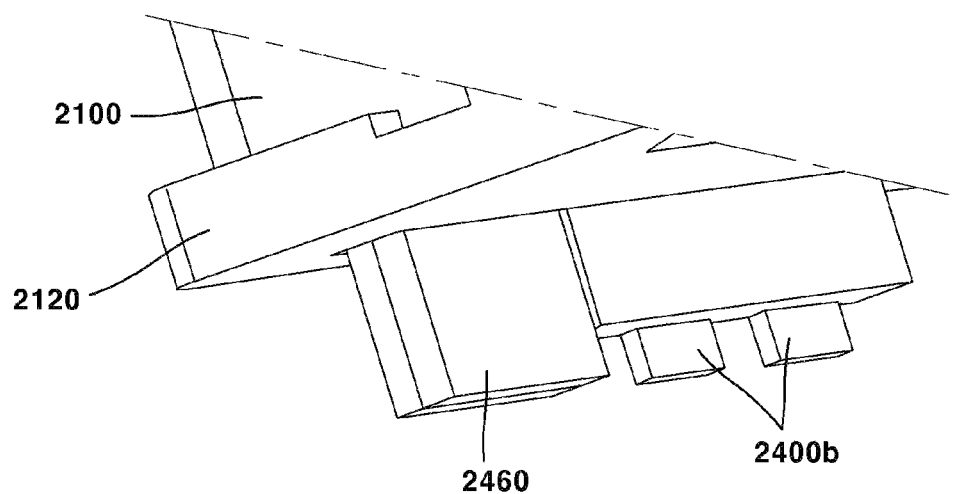
FIG. 49 is a bottom perspective view of a partial configuration of a camera device according to another modified embodiment.
Figure 50:
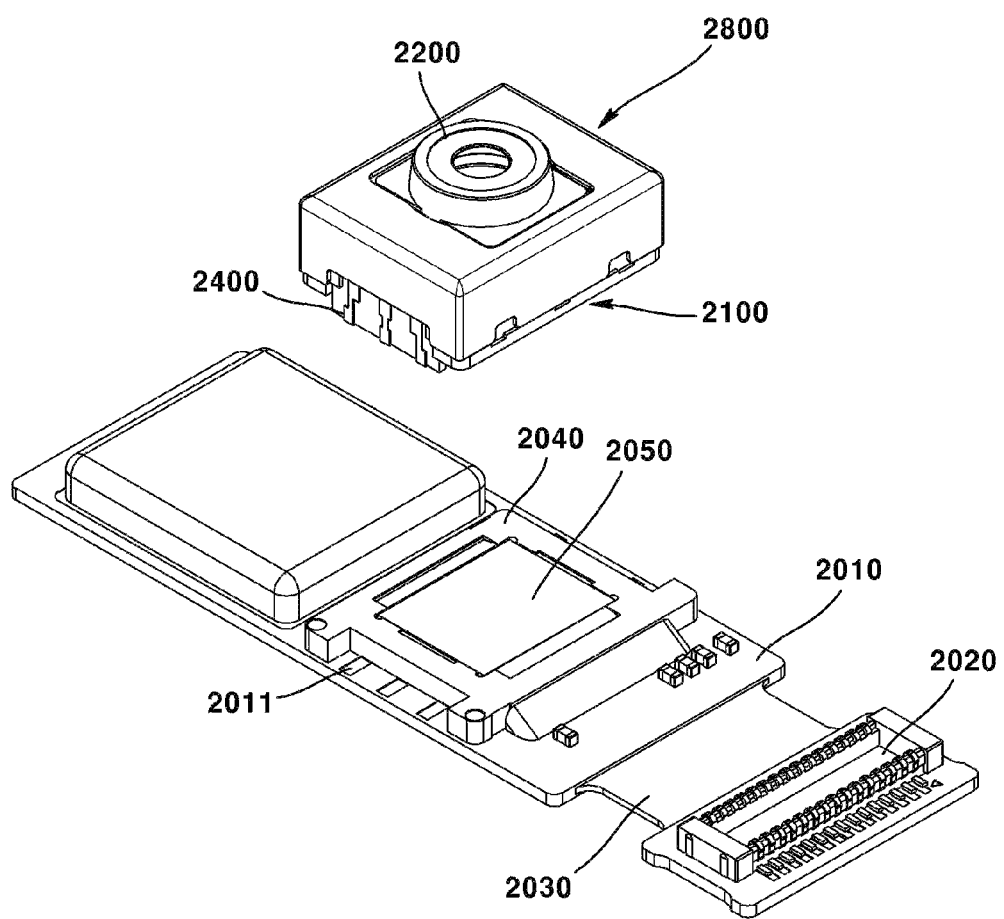
FIG. 50 is an exploded perspective view of a camera device according to a third embodiment of the present invention.

FIG. 32 is a perspective view of a partial configuration of a camera device according to a third embodiment of the present invention, FIG. 33 is a cross-sectional view taken along line A-A of FIG. 32, FIG. 34 is a cross-sectional view taken along line B-B of FIG. 32, FIG. 35 is a cross-sectional view taken along line C-C of FIG. 32, FIG. 36 is an exploded perspective view of a partial configuration of a camera device according to a third embodiment of the present invention, FIG. 37 is a perspective view of a partial configuration of a camera device according to a third embodiment of the present invention, FIG. 38 is a plan view of a partial configuration of a camera device of FIG. 37, FIGS. 39 and 40 are cross-sectional perspective views of partial configurations of a camera device according to a third embodiment of the present invention, FIGS. 41 and 42 are perspective views of a partial configuration of a camera device according to a third embodiment of the present invention, FIG. 43 is an exploded perspective view of a partial configuration of the camera device of FIG. 42, FIG. 44 is a side view of a partial configuration of the camera device of FIG. 42, FIG. 45 is a bottom view of a partial configuration of the camera device of FIG. 42, FIG. 46 is a perspective view of a partial configuration of a camera device according to a modified embodiment, FIG. 47 is a perspective view of a partial configuration of a camera device according to another modified embodiment, FIG. 48 is a perspective view of a partial configuration of the camera device of FIG. 47 viewed from another angle, FIG. 49 is a bottom perspective view of a partial configuration of a camera device according to another modified embodiment, and FIG. 50 is an exploded perspective view of a camera device according to a third embodiment of the present invention.

The camera device may comprise a substrate 2010. The board 2010 may be a printed circuit board (PCB). The substrate 2010 may comprise an upper surface. An image sensor and a sensor base 2040 may be disposed on an upper surface of the substrate 2010. The board 2010 may comprise a terminal 2011. The terminal 2011 of the substrate 2010 may be electrically connected to the holder terminal 2400 through a conductive member.

The camera device may comprise an image sensor. The image sensor may be disposed in the substrate 2010. The image sensor may be disposed on the substrate 2010. The image sensor may be disposed on an upper surface of the substrate 2010. The image sensor may be electrically connected to the substrate 2010. For example, the image sensor may be coupled to the substrate 2010 by a surface mounting technology (SMT). As another example, the image sensor may be coupled to the substrate 2010 by a flip chip technology. The image sensor may be disposed so that the lens 2220 and the optical axis coincide. That is, the optical axis of the image sensor and the optical axis of the lens 2220 may be aligned. The image sensor may convert light irradiated to an effective image region of the image sensor into an electrical signal. The image sensor may be any one among a charge coupled device (CCD), a metal oxide semi-conductor (MOS), a CPD, and a CID.

The camera device may comprise a connector 2020. The connector 2020 may be connected to the substrate 2010 through the connection substrate 2030. The connector 2020 may comprise a port for electrically connecting to an external device.

The camera device may comprise a sensor base 2040. The sensor base 2040 may be disposed between the holder 2100 and the substrate 2010. A filter 2050 may be disposed in the sensor base 2040. An opening may be formed in a portion of the sensor base 2040 in which the filter 2050 is disposed so that light passing through the filter 2050 may be incident on the image sensor.

The camera device may comprise a filter 2050. The filter 2050 may comprise an infrared filter. The infrared filter may block light of the infrared region from being incident on the image sensor. An infrared filter may reflect infrared radiation. Or, the infrared filter may absorb infrared radiation. The infrared filter may be disposed between the lens module 2200 and the image sensor. The infrared filter may be disposed in the sensor base 2040.

The camera device may comprise a holder 2100. The holder 2100 may be disposed on the substrate 2010. The holder 2100 may be disposed in the sensor base 2040. The holder 2100 may be disposed on an upper surface of the sensor base 2040. The holder 2100 may be coupled to the sensor base 2040. The holder 2100 may be coupled to the lens module 2200. The holder 2100 may be coupled to the lens holder 2210. The holder 2100 may be coupled to the lens module 2200. The holder 2100 may be coupled to the variable lens part 2300. The holder 2100 may be coupled to the liquid lens 2310. The holder 2100 may be disposed inside the cover 2800. The holder 2100 may be formed of an insulating material.

The holder 2100 may comprise a sidewall 2110. The sidewall 2110 may be horizontally overlapped with the variable lens holder 2320. The sidewall 2110 may be protruded from an upper surface of the holder 2100. The sidewall 2110 may form an outer circumference of the holder 2100. The sidewall 2110 may prevent the conductive member 2900 disposed inside the sidewall 2110 from leaking out.

The holder 2100 may comprise a step portion 2120. The step portion 2120 may be protruded from a lateral surface of the holder 2100. The step portion 2120 may be formed in an outer circumference of the holder 2100. A side plate 2820 of the cover 2800 may be disposed in the step portion 2120. The step portion 2120 may be overlapped with the side plate 2820 of the cover 2800 in a direction parallel to an optical axis (vertical direction).

The holder 2100 may comprise a groove 2130. The groove 2130 may be formed on a lateral surface of the holder 2100. The groove 2130 may be recessed from the lateral surface of the holder 2100 to the lateral surface of the holder terminal 2400. Through this, the groove 2130 may expose at least a portion of the lateral surface of the holder terminal 2400.

The holder 2100 may comprise a hole 2140. The hole 2140 may be a hollow hole penetrating the holder 2100 in an optical axis direction. A lens module 2200 may be disposed in the hole 2140.

The holder 2100 may comprise a partition wall 2150. The partition wall 2150 may be provided in plurality to form an epoxy tank in which a silver (Ag) epoxy is accommodated. That is, an epoxy tank may be formed between the plurality of partition walls 2150. In a third embodiment of the present invention, the epoxy tank can be described as being formed in a way that the partition wall 2150 is protruded from an upper surface and an inner lateral surface of the holder 2100. Or, the epoxy tank may be described as being formed by a groove 2160 into which a portion of the holder 2100 is recessed. In a third embodiment of the present invention, an epoxy tank, which is a space in which the epoxy is accommodated, is formed between the plurality of partition walls 2150, and this part may be referred to as a groove 2160. A second conductive member 2720 may be disposed between the partition walls 2150. A silver (Ag) epoxy may be disposed between the partition walls 2150.

The holder 2100 may comprise a groove 2160. The groove 2160 may be formed on an upper surface of the sidewall 2110. A conductive member 2900 connecting the holder terminal 2400 and the second connection terminal 2600 may be disposed in the groove 2160 of the holder 2100.

The groove 2160 of the holder 2100 may comprise a plurality of grooves. The groove 2160 of the holder 2100 may comprise a plurality of grooves formed at different heights. The groove 2160 of the holder 2100 may comprise a plurality of grooves having a difference in height. The groove 2160 of the holder 2100 may comprise a first groove 2161. The first groove 2161 may be formed at positions corresponding to the plurality of first terminals 2601. The groove 2160 of the holder 2100 may comprise a second groove 2162. The second groove 2162 may be formed at a position corresponding to the second terminal 2602.

In a third embodiment of the present invention, the bottom surface of the first groove 2161 of the holder 2100 may be disposed at a position higher than the position of the bottom surface of the second groove 2162. The height of the bottom surface of the first groove 2161 may be different from the height of the bottom surface of the second groove 2162. In a third embodiment of the present invention, a step structure may be applied between the plurality of grooves of the holder 2100 without applying bending or a bending structure to the second connection terminal 2600. That is, each of the plurality of second connection terminals is extended straight in the horizontal direction without being bent, and the bottom surfaces of the plurality of grooves of the holder 2100 corresponding thereto may be formed to have a height difference.

The holder 2100 may comprise a pillar 2170. The pillar 2170 may be protruded from an upper surface of the holder 2100. The pillar 2170 may be formed at each of the four corners of the holder 2100. The four pillars 2170 may prevent the lens module 2200 and the variable lens part 2300 disposed therein from being separated. The pillar 2170 may be coupled to the cover 2800.

The camera device may comprise a lens module 2200. The lens module 2200 may be coupled to the holder 2100. The lens module 2200 may be disposed in the holder 2100. The lens module 2200 may be disposed inside the holder 2100.

The lens module 2200 may comprise a lens holder 2210. The lens holder 2210 may be a lens barrel. The lens holder 2210 may accommodate a lens therein. The inner circumferential surface of the lens holder 2210 may be formed in a shape corresponding to the outer circumference surface of the lens 2220. The lens holder 2210 may be formed of an insulating material.

The lens holder 2210 may comprise a hole 2212. The hole 2212 may be a variable lens accommodating hole in which the variable lens part 2300 is disposed. A variable lens part 2300 may be disposed in the hole 2212. The hole 2212 may be formed to have a height greater than the height of the variable lens part 2300 by a predetermined size. The hole 2212 may penetrate through the lens module 2200 in a direction perpendicular to an optical axis. The liquid lens 2310 may be horizontally inserted into the hole 2212 of the lens module 2200 and coupled thereto.

The hole 2212 may be formed for bonding the liquid lens 2310 and the lens holder 2210. A contact area between the liquid lens 2310 and the lens holder 2210 may be increased through the hole 2212. Accordingly, when an adhesive (bond) is applied between the liquid lens 2310 and the lens holder 2210, the bonding force between the liquid lens 2310 and the lens holder 2210 may be increased.

The lens module 2200 may comprise a lens 2220. The lens 2220 may be disposed in the lens holder 2210. The lens may be a solid lens. The lens may be a plastic lens. The lens 2220 may comprise a plurality of lenses. The lens 2220 may comprise an upper lens 2221 and a lower lens 2222. The upper lens 2221 may be disposed at an upper side of the liquid lens 2310. The lower lens 2222 may be disposed at a lower side the liquid lens 2310. Each of the upper lens 2221 and the lower lens 2222 may comprise a plurality of lenses. The upper lens 2221 may comprise three lenses and the lower lens 2222 may comprise two lenses. However, the number of lenses of the upper lens 2221 and the number of lenses of the lower lens 2222 are not limited thereto. Although a lens 2220, an upper lens 2221, and a lower lens 2222 are illustrated in the drawing, what the corresponding reference numbers refer to in the drawings may correspond to a space in which a lens is accommodated, not a lens.

The camera device may comprise a variable lens part 2300. The variable lens part 2300 may be coupled to the lens module 2200. The variable lens part 2300 may be coupled to the lens holder 2210. The variable lens part 2300 may be disposed in the lens holder 2210. The variable lens part 2300 may be spaced apart from the holder 2100. The variable lens part 2300 may be aligned with the lens 2220 and the image sensor. The variable lens part 2300 may be fixedly inserted into the lens module 2200 in a horizontal direction.

The variable lens part 2300 may comprise a variable lens. The variable lens may be a variable focus lens. The variable lens may be a lens whose focus is controlled. The focus may be adjusted by moving the lens and/or changing the shape of the lens. The variable lens may comprise at least one among a liquid lens 2310, a polymer lens, a liquid crystal lens, a voice coil motor (VCM) actuator, a shape memory alloy (SMA) actuator, and a micro electro mechanical systems (MEMS) actuator.

The liquid lens 2310 may comprise at least one of a liquid lens 2310 comprising one type of liquid and a liquid lens 2310 comprising two types of liquids. The liquid lens 2310 comprising one type of liquid may change the focus by adjusting a membrane disposed at a position corresponding to the liquid. For example, the focus can be changed by pressing the membrane by the electromagnetic force of the magnet and coil. The liquid lens 2310 comprising two types of liquids may comprise a conductive liquid and a non-conductive liquid. In this case, the focus may be changed by adjusting the interface formed between the conductive liquid and the non-conductive liquid using a voltage applied to the liquid lens 2310. As a modified embodiment, the liquid lens 2310 may comprise three or more types of liquids.

The polymer lens can change the focus by controlling a polymer material through a driving unit such as a piezo. The liquid crystal lens can change the focus by controlling the liquid crystal by electromagnetic force. The VCM actuator can change focus by moving a solid lens or a lens assembly comprising a solid lens through electromagnetic force between a magnet and a coil. The SMA actuator may change the focus by moving a solid lens or a lens assembly comprising the solid lens using a shape memory alloy. The MEMS actuator may change a focus by moving a solid lens or a lens assembly comprising the solid lens through electrostatic force generated when voltage is applied.

The variable lens part 2300 may comprise a liquid lens 2310. The liquid lens 2310 may be disposed in the lens module 2200. The liquid lens 2310 may be disposed inside the liquid lens holder 2320. The liquid lens 2310 may be disposed between the plurality of lenses 2220. The liquid lens 2310 may be disposed between the upper lens 2221 and the lower lens 2222. The liquid lens 2310 may be disposed in the hole 2212 of the lens module 2200.

The liquid lens 2310 whose focal length is adjusted in response to the driving voltage may receive an operating voltage through the terminal 2311. The terminal 2311 of the liquid lens 2310 may comprise an individual terminal 2312 and a common terminal 2313. The individual terminal 2312 may comprise four individual terminals disposed at four corners of the liquid lens 2310. The individual terminal 2312 may be disposed on the upper surface of the liquid lens 2310. At this time, the individual terminal 2312 may be referred to as an upper terminal. The common terminal 2313 may comprise four common terminals disposed at four corners of the liquid lens 2310. The common terminal 2313 may be disposed on a lower surface of the liquid lens 2310. At this time, the common terminal 2313 may be referred to as a lower terminal. When an operating voltage is applied through the individual terminal 2312 and the common terminal 2313, the interface between the conductive liquid and the non-conductive liquid disposed in the lens region may be deformed. Hereinafter, any one of the individual terminal 2312 and the common terminal 2313 may be referred to as a 'first terminal' and the other may be referred to as a 'second terminal'.

The liquid lens 2310 may be spaced apart from the solid lens. In a third embodiment of the present invention, epoxy may be applied to the space between the liquid lens 2310 and the solid lens. At this time, active alignment between the liquid lens 2310 and the solid lens may be performed. Active alignment between the liquid lens 2310 and the solid lens may be performed through the following steps. First, the liquid lens 2310 may be disposed on the solid lens, and the assembly of the liquid lens 2310 and the solid lens may be disposed on the master sensor. Thereafter, while moving the liquid lens 2310 on the virtual grid pattern and applying voltages assigned to a plurality of codes to the liquid lens 2310, a point in which the amount of light detected by the master sensor is greatest may be determined. When the point with the largest amount of light is determined, the liquid lens 2310 is positioned at the corresponding point, and the epoxy bonding the liquid lens 2310 to the solid lens can be pre-cured through ultraviolet rays. Thereafter, the liquid lens 2310 may be fixed to the solid lens by main curing of the epoxy through heat.

Meanwhile, the lens unit formed by fixing the liquid lens 2310 to the solid lens may be actively aligned with the image sensor. While the lens unit is moved on the virtual grid and voltages assigned to a plurality of codes are applied to the liquid lens 2310, the point where the amount of light sensed by the image sensor is the largest can be determined, and the lens unit can be fixed at the corresponding point. At this time, like the previously described coupling of the liquid lens 2310 and the solid lens, the lens unit can be fixed in place through pre-curing and main curing using epoxy.

Furthermore, in the above description, the liquid lens 2310 and the solid lens are first actively aligned and then the assembly of the liquid lens 2310 and the solid lens is actively aligned with the image sensor, but The solid lens and the image sensor may be first actively aligned, and then the liquid lens 2310 may be actively aligned, or, the liquid lens 2310 and the image sensor is first actively aligned, and then the solid lens may be actively aligned.

One side of the liquid lens 2310 may receive a voltage from the individual terminal 2312. The other side of the liquid lens 2310 may receive a voltage from the common terminal 2313. In a third embodiment of the present invention, the individual terminal 2312 of the liquid lens 2310 may be an individual electrode, and the common terminal 2313 may be a common electrode. Or, the individual terminal 2312 of the liquid lens 2310 may be a common electrode and the common terminal 2313 may be an individual electrode. In the liquid lens 2310, the interface formed between the conductive liquid and the non-conductive liquid may be deformed by the current and/or voltage applied to the individual terminal 2312 and the common terminal 2313. Through this, any one or more of the AF function and the OIS function may be performed.

The liquid lens 2310 may comprise a terminal 2311. The terminal 2311 may comprise a plurality of terminals. The terminal 2311 may comprise an individual terminal 2312 formed on an upper surface of the liquid lens 2310 and a common terminal 2313 formed on a lower surface of the liquid lens 2310. Each of the individual terminal 2312 and the common terminal 2313 may be formed at each of the four corners of the liquid lens 2310.

The individual terminal 2312 of the liquid lens 2310 may comprise a plurality of individual terminals. The individual terminal 2312 may comprise four individual terminals. The common terminal 2313 of the liquid lens 2310 may comprise a plurality of common terminals. The common terminal 2313 may comprise four common terminals. At least a portion of the plurality of common terminals 2313 may be electrically connected to the second terminal 2602. Any one among the four second connection terminals may be electrically connected to the second terminal 2602. Or, the second terminal 2602 may connect all four second connection terminals. Or, two or three terminals among the four second connection terminals may be connected by the second terminal 2602.

Hereinafter, any one of the individual terminal 2312 and the common terminal 2313 may be referred to as a first terminal and the other may be referred to as a second terminal.

The description of the variable lens may be analogously applied to the description of the liquid lens 2310. Accordingly, the coupling structure between the liquid lens 2310 and other components may be applied to the coupling structure between the variable lens and other components.

The variable lens part 2300 may comprise a variable lens holder 2320. The variable lens holder 2320 may be coupled to the liquid lens 2310. A lower surface of the variable lens holder 2320 may be disposed higher than an upper surface of the holder 2100. A liquid lens 2310 may be disposed inside the variable lens holder 2320. A first connection terminal 2500 may be coupled to the variable lens holder 2320. A first connection terminal 2500 may be integrally formed in the variable lens holder 2320 by insert injection. The variable lens holder 2320 may comprise a groove having a shape corresponding to the first connection terminal 2500 so that the first connection terminal 2500 is inserted.

The camera device may comprise a holder terminal 2400. The holder terminal 2400 may be disposed in the holder 2100. The holder terminal 2400 may be formed along the surface of the holder 2100. The holder terminal 2400 may be connected to the terminal 2011 of the substrate 2010 by a conductive member. The holder terminal 2400 may be exposed on the upper surface of the holder 2100. The holder terminal 2400 may be connected to the conductive member 2900 disposed on the upper surface of the holder 2100. The holder terminal 2400 may be integrally formed in the holder 2100 through insert injection. The holder terminal 2400 may electrically connect the second connection terminal 2600 and the substrate 2010.

The holder terminal 2400 may comprise a first holder terminal 2401. The first holder terminal 2401 may be electrically connected to the first terminal 2601. A portion of the first holder terminal 2401 may be exposed to the upper surface of the holder 2100. An upper surface of a portion of the first holder terminal 2401 may be disposed on the same plane as a bottom surface of the first groove 2161 of the holder 2100. A lower end of the first holder terminal 2401 may be connected to the terminal 2011 of the substrate 2010 through solder.

The holder terminal 2400 may comprise a second holder terminal 2402. The second holder terminal 2402 may be electrically connected to the second terminal 2602. A portion of the second holder terminal 2402 may be exposed on the upper surface of the holder 2100. An upper surface of a portion of the second holder terminal 2402 may be disposed on the same plane as a bottom surface of the second groove 2162 of the holder 2100. A lower end of the second holder terminal 2402 may be connected to the terminal 2011 of the substrate 2010 through solder.

In a third embodiment of the present invention, the upper surface of the first holder terminal 2401 facing the lower surface of the first terminal 2601 may be disposed at a position higher than the position of the upper surface of the second holder terminal 2402 facing the lower surface of the second terminal 2602.

At this time, the upper surface of the first holder terminal 2401 is disposed at a height corresponding to the bottom surface of the first groove 2161, and the upper surface of the second holder terminal 2402 may be disposed at a height corresponding to the bottom surface of the second groove 2162. That is, the upper end of the first holder terminal 2401 and the upper end of the second holder terminal 2402 may be disposed to have a height difference. This may be for coupling to each of the first terminal 2601 and the second terminal 2602 being disposed to have a height difference.

The holder terminal 2400 may comprise a first region 2410. The first region 2410 may be disposed on the outer surface of the sidewall 2110 of the holder 2100. The first region 2410 may comprise a portion having a wider width than other portions. This portion may be a portion where a pogo pin is in contact with during the manufacturing process.

The holder terminal 2400 may comprise a second region 2420. The second region 2420 may be connected to the first region 2410 of the holder terminal 2400. The second region 2420 may be disposed on the inner surface of the sidewall 2110 of the holder 2100. The second region 2420 is extended beyond the upper end of the sidewall 2110 from the first region 2410 and may have a curvature at least in a portion. The second region 2420 may be connected to the conductive member 2900.

The holder terminal 2400 may comprise a third region 2430. The third region 2430 may be connected to the second region 2420 of the holder terminal 2400. The third region 2430 may have a curvature at a portion connected to the second region 2420. The third region 2430 may be disposed on the bottom surface of the groove 2160 of the holder 2100. The third region 2430 may be connected to the conductive member 2900.

The camera device may comprise a thermistor terminal 2450. The thermistor terminal 2450 may electrically connect two terminals of a thermistor 2700 to the substrate 2010. The thermistor terminal 2450 may be formed on the surface of the holder 2100. The thermistor terminal 2450 may comprise two terminals. The thermistor terminal 2450 may be understood as one configuration of the holder terminal 2400. Alternatively, the thermistor terminal 2450 may be understood as a separate configuration from the holder terminal 2400.

The camera device may comprise a first connection terminal 2500. The first connection terminal 2500 may be a MID terminal. The first connection terminal 2500 may be formed on a surface of the variable lens holder 2320 in a molded interconnection device (MID) method. The first connection terminal 2500 may be a separate metal terminal. The first connection terminal 2500 may be disposed on the variable lens holder 2320. The first connection terminal 2500 may be formed along the surface of the variable lens holder 2320. The first connection terminal 2500 may be integrally formed with the second connection terminal 2600. Or, the second connection terminal 2600 may be omitted and the first connection terminal 2500 may comprise a portion disposed on the lateral surface of the variable lens holder 2320.

The first connection terminal 2500 may comprise a plurality of terminals. The first connection terminal 2500 may comprise a total of five terminals. The first connection terminal 2500 may comprise a first-first terminal 2501 and a first-second terminal 2502. The first-first terminal 2501 may be electrically connected to the individual terminals 2312 of the liquid lens 2310. The first-first terminal 2501 may be formed in a number corresponding to the number of individual terminals 2312 of the liquid lens 2310 and may be individually electrically connected. The first-first terminal 2501 may comprise four first-first terminals. The first-second terminal 2502 may be electrically connected to the common terminal 2313 of the liquid lens 2310. The first-second terminal 2502 may be formed of one terminal. However, in a modified embodiment, the first-second terminal 2502 may comprise a plurality of first-second terminals.

The first connection terminal 2500 may comprise a first region 2510. The first region 2510 may be connected to the second connection terminal 2600. The first region 2510 may be disposed on an upper surface and/or a lower surface of the variable lens holder 2320. For example, the first region 2510 is disposed on the upper surface of the variable lens holder 2320 in the first-first terminal 2501 and on the lower surface of the variable lens holder 2320 in the first-second terminal 2502.

The first connection terminal 2500 may comprise a second region 2520. The second region 2520 may be extended from the first region 2510 of the first connection terminal 2500. The second region 2520 may be disposed on a lateral surface of the variable lens holder 2320. The second region 2520 may be exposed to the outer side. The second region 2520 of the first connection terminal 2500 may be a portion where a pogo pin is to be in contact with to apply a current to the liquid lens 2310 in the process of aligning the liquid lens 2310 with the lens module 2200 and/or the image sensor.

The camera device may comprise a second connection terminal 2600. The second connection terminal 2600 may be disposed in the variable lens holder. The second connection terminal 2600 may electrically connect the first connection terminal 2500 and the variable lens. The second connection terminal 2600 may electrically connect the liquid lens 2310, the first connection terminal 2500, and the holder terminal 2400. The second connection terminal 2600 may be connected to the terminal 2311 of the liquid lens 2310 through a conductive member. The second connection terminal 2600 may be in direct contact with the first connection terminal 2500. Or, the second connection terminal 2600 may be connected to the first connection terminal 2500 through a conductive member. The second connection terminal 2600 may be connected to the holder terminal 2400 through the conductive member 2900. The second connection terminal 2600 may comprise a plurality of second connection terminals. Each of the plurality of second connection terminals may be formed in a flat plate shape. In a third embodiment of the present invention, each of the plurality of second connection terminals may only be extended in the horizontal direction and may not be extended in a direction inclined with the horizontal direction. In a third embodiment of the present invention, each of the plurality of second connection terminals may not have a bent or curved portion.

The second connection terminal 2600 may comprise a first terminal 2601. The first terminal 2601 may be electrically connected to the individual terminals 2312 disposed on an upper surface of the liquid lens 2310. The first terminal 2601 may be disposed on an upper surface of the variable lens holder 2320. The first terminal 2601 may be electrically connected to the individual terminal 2312, the first-first terminal 2501, and the first holder terminal 2401 of the liquid lens 2310. The first terminal 2601 may comprise a plurality of first terminals. The plurality of first terminals may be individually connected to the plurality of individual terminals 2312 of the liquid lens 2310.

The second connection terminal 2600 may comprise a second terminal 2602. The second terminal 2602 may be electrically connected to the common terminal 2313 disposed on a lower surface of the liquid lens 2310. The second terminal 2602 may be disposed on a lower surface of the variable lens holder 2320. The second terminal 2602 may be electrically connected to the common terminal 2313, the first-second terminal 2502, and the second holder terminal 2402 of the liquid lens 2310. The second terminal 2602 may be commonly connected to a plurality of common terminals 2313 of the liquid lens 2310.

The second connection terminal 2600 may comprise a first region 2610. The first region 2610 may be connected to the terminal 2311 of the liquid lens 2310 through a conductive member. The first region 2610 may be extended inward from the second region 2620. The first region 2610 may be overlapped with the terminal 2311 of the liquid lens 2310 in a direction parallel to an optical axis.

The second connection terminal 2600 may comprise a second region 2620. The second region 2620 may connect the first region 2610 and the third region 2630 of the second connection terminal 2600. The second region 2620 may be connected to the first region 2510 of the first connection terminal 2500. The second region 2620 may be in direct contact with the first region 2510 of the first connection terminal 2500. Or, the second region 2620 may be connected to the first region 2510 of the first connection terminal 2500 through a conductive member.

The second connection terminal 2600 may comprise a third region 2630. The third region 2630 may be protruded further outer side than the variable lens holder 2320. The third region 2630 of the second connection terminal 2600 may be extended straight in a horizontal direction. The third region 2630 of the second connection terminal 2600 may be connected to the holder terminal 2400 by the conductive member 2900. At least a portion of the third region 2630 may be overlapped with the holder terminal 2400 in a direction parallel to an optical axis. At least a portion of a lower surface of the third region 2630 may face an upper surface of the holder terminal 2400. The lower surface of the third region 2630 and the upper surface of the holder terminal 2400 may be connected through the conductive member 2900. The third region 2630 may comprise a portion whose width becomes narrower as it travels toward the outer side. In a third embodiment of the present invention, an upper surface of the third region 2630 of the second connection terminal 2600 may be disposed on the same plane as an upper surface of the second region 2620. That is, the third region 2630 and the second region 2620 of the second connection terminal 2600 may be a portion of the flat plate.

In a third embodiment of the present invention, the first region 2610, the second region 2620, and the third region 2630 may comprise the first terminal 2601 and the second terminal 2602 in common. However, the first terminal 2601 and the second terminal 2602 may have different shapes. The second terminal 2602 may further comprise a fixing part 2640. The fixing part 2640 may be fixed to the variable lens holder 2320 by an adhesive. The fixing part 2640 may comprise a hole for increasing the contact area with the adhesive.

The camera device may comprise a thermistor 2700. The thermistor 2700 may be disposed to control the temperature characteristic of the variable lens. The thermistor 2700 may be disposed in the holder 2100. The resistance value of the thermistor 2700 may change according to temperature. The thermistor 2700 may comprise two terminals.

An inflection point may occur due to the temperature characteristics of the liquid lens 2310. In order to improve this, the third embodiment of the present invention receives feedback on the characteristics of each temperature of the liquid lens 2310 and may perform calibration and control with a driver IC. The third embodiment of the present invention may comprise a structure for detecting a temperature change of the liquid lens 2310 by applying a thermistor 2700 near the liquid lens 2310.

The camera device may comprise a cover 2800. The cover 2800 may be coupled to the holder 2100. The cover 2800 may be disposed in the step portion 2120 of the holder 2100. The inner surface of the side plate 2820 of the cover 2800 may be fixed to the lateral surface of the holder 2100 by an adhesive. The cover 2800 may accommodate a portion of the lens module 2200 therein. The cover 2800 may form an outer appearance of the camera device. The cover 2800 may have a hexahedral shape with an open lower surface. The cover 2800 may be a non-magnetic material. The cover 2800 may be formed of a metal material. The cover 2800 may be formed of a metal plate. The cover 2800 may be connected to the ground portion of the substrate 2010. Through this, the cover 2800 may be grounded. The cover 2800 may block electromagnetic interference (EMI). At this time, the cover 2800 may be referred to as an 'EMI shield can'.

The cover 2800 may comprise an upper plate 2810 and a side plate 2820. The cover 2800 may comprise an upper plate 2810 comprising a hole, and a side plate 2820 being extended downward from the outer circumference of the upper plate 2810.

The camera device may comprise a conductive member 2900. The conductive member 2900 may be disposed in the groove 2160 of the holder 2100. The conductive member 2900 may be connected to any one or more of the second region 2420 and the third region 2430 of the holder terminal 2400. The conductive member 2900 may comprise a silver (Ag) epoxy. The conductive member 2900 may be conductive. The conductive member 2900 may have viscosity. The conductive member 2900 may be a conductive adhesive. The conductive member 2900 may be used to connect terminals and terminals in addition to the groove 2160 of the holder 2100, and the description of the conductive member 2900 will be analogously applied to other parts described as conductive members in this specification.

Hereinafter, a camera device according to a modified embodiment and a camera device according to another modified embodiment will be described with reference to the drawings. Hereinafter, differences from the third embodiment of the present invention will be mainly described. Accordingly, the description of the third embodiment of the present invention may be analogously applied to portions not described.

FIG. 46 is a perspective view of a partial configuration of a camera device according to a modified embodiment.

In a modified embodiment, the temperature of the liquid lens 2310 may be detected through the resistance change amount according to the temperature of the thermistor 2700 to be controlled by a driver IC (driver IC). In a modified embodiment, the thermistor terminal 2450a may use a space minimized through the MID structure design. In a modified embodiment, the thermistor 2700 may be mounted on the thermistor terminal 2450a on a surface of the groove 2130a being formed on the lateral surface of the holder 2100. Or, the thermistor 2700 may not be directly mounted on the holder 2100, but may be coupled to a flexible printed circuit board (FPCB) and disposed in the holder 2100.

In a modified embodiment, the second connection terminal 2600a and the holder terminal 2400a may be electrically conducted by contact according to the pressing force of the holder terminal 2400a formed of a contact spring.

FIG. 47 is a perspective view of a partial configuration of a camera device according to another modified embodiment, FIG. 48 is a perspective view of a partial configuration of the camera device of FIG. 47 viewed from another angle, and FIG. 49 is a bottom perspective view of a partial configuration of a camera device according to another modified embodiment.

In another modified embodiment, a thermistor 2700 may be disposed on a FPCB 2470. Thermistor 2700 may be coupled to FPCB 2470. The thermistor 2700 may be disposed on an inner surface of the FPCB 2470. A stiffener 2460 may be disposed on the inner surface of the FPCB 2470. The stiffener 2460 may comprise a cutout that avoids the thermistor 2700. In another modified embodiment, design stabilization may be possible through the structural design of the FPCB 2470 and the stiffener 2460. However, the FPCB 2470 and the stiffener 2460 may be replaced with a PCB.

In another modified embodiment, a solder pad part support may be removed through the stiffener 2460. That is, when the stiffener 2460 is provided, the protruded portion of the holder 2100 being protruded from a lower surface of the holder 2100 may be omitted.

The modified embodiment according to the present embodiment may comprise any two or more among the partial configuration of the first embodiment, the partial configuration of the second embodiment, and the partial configuration of the third embodiment together. That is, the modified embodiment may comprise the first embodiment, but partial configurations of the first embodiment are omitted, and may comprise the corresponding partial configurations of the second embodiment and/or partial configurations of the third embodiment. Or, another modified embodiment may comprise the second embodiment, but partial configurations of the second embodiment are omitted, and may comprise the corresponding partial configurations of the first embodiment and/or partial configurations of the third embodiment. Or, another modified embodiment may comprise the third embodiment, but partial configurations of the third embodiment are omitted, and may comprise the corresponding partial configurations of the first embodiment and/or partial configurations of the second embodiment.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera device comprising:
  a holder comprising a groove formed on an upper surface thereof;
  a lens holder coupled to the holder;
  a variable lens part disposed on the lens holder;
  a holder terminal disposed on the holder;
  a first connection terminal coupled to the variable lens part;
  a second connection terminal coupled to the variable lens part;
  a third connection terminal coupled to the variable lens part; and
  a conductive member disposed on the groove,
  wherein a portion of the first connection terminal extends outside the variable lens part so as to be electrically connected to the holder terminal by the conductive member,
  wherein the first connection terminal comprises a first terminal disposed on a first corner region of the variable lens part and a second terminal disposed on a second corner region of the variable lens part,
  wherein the second connection terminal comprises a first terminal disposed on a third corner region of the variable lens part and a second terminal disposed on a fourth corner region of the variable lens part, and
  wherein the third connection terminal is spaced apart from the first connection terminal and the second connection terminal.

2. The camera device of claim 1, wherein the variable lens part is any one among a liquid lens, a polymer lens, a liquid crystal lens, a voice coil motor (VCM) actuator, a shape memory alloy (SMA) actuator, and a micro electro mechanical systems (MEMS) actuator.

3. The camera device of claim 1, wherein the variable lens part comprises a liquid lens and a liquid lens holder coupled to the liquid lens.

4. A camera device comprising:
  a holder;
  a lens holder coupled to the holder;
  a variable lens part disposed on the lens holder and comprising a variable lens;
  a holder terminal disposed on the holder;
  a first connection terminal coupled to the variable lens part and electrically connected to the holder terminal;
  a second connection terminal coupled to the variable lens part and electrically connected to the holder terminal, and
  a third connection terminal coupled to the variable lens part and electrically connected to the holder terminal,
  wherein the first connection terminal comprises a first region disposed on one side of the variable lens part and electrically connected to the variable lens, and a second region extending from the first region in an optical axis direction and electrically coupled to the holder terminal,
  wherein the first connection terminal comprises a first terminal disposed on a first corner region of the variable lens part and a second terminal disposed on a second corner region of the variable lens part,
  wherein the second connection terminal comprises a first terminal disposed on a third corner region of the variable lens part and a second terminal disposed on a fourth corner region of the variable lens part, and
  wherein the third connection terminal is spaced apart from the first connection terminal and the second connection terminal.

5. The camera device of claim 4, wherein the second region of the first connection terminal is exposed on a lateral surface of the variable lens part and extending lower than a lower surface of the variable lens part.

6. The camera device of claim 4, wherein the first region of the first connection terminal is exposed on an upper surface of the variable lens part, and the second region of the first connection terminal is bent and extended from the first region of the first connection terminal.

7. The camera device of claim 4, wherein the holder comprises a groove, and
  wherein a portion of the second region of the first connection terminal is disposed on the groove and coupled to the holder terminal by a conductive member.

8. The camera device of claim 4, wherein the second connection terminal is disposed on an other side of the variable lens part, and
- wherein the second connection terminal comprises a first region disposed on an upper surface of the variable lens part, a second region extending from the first region of the second connection terminal and disposed on a lateral surface of the variable lens part, and a third region extending from the second region of the second connection terminal in a direction perpendicular to the optical axis direction and overlapped with a part of the holder terminal in the optical axis direction.

9. The camera device of claim 8, wherein the second connection terminal is not overlapped with the lens holder in a direction from one side of the variable lens part toward the other side of the variable lens part.

10. The camera device of claim 8, further comprising a fourth connection terminal coupled to a terminal of the variable lens,
- wherein the third connection terminal is electrically coupled to the fourth connection terminal.

11. The camera device of claim 10, wherein the third connection terminal comprises a first region electrically coupled to the fourth connection terminal, a second region disposed on the variable lens part, and a third region protruding outside the variable lens part.

12. The camera device of claim 11, wherein the first region of the third connection terminal and the fourth connection terminal face each other.

13. The camera device of claim 11, wherein the first region of the third connection terminal is connected to the second region of the third connection terminal,
- wherein the second region of the third connection terminal is connected to the third region of the third connection terminal, and
- wherein the second region of the third connection terminal has a round shape.

14. The camera device of claim 11, wherein the first region of the third connection terminal and the third region of the third connection terminal are bent from the second region of the third connection terminal.

15. The camera device of claim 4, wherein the variable lens part comprises a variable lens, and
- wherein the first region of the first connection terminal is coupled to an individual terminal of the variable lens.

16. The camera device of claim 4, wherein the variable lens part is overlapped with the holder in a direction perpendicular to the optical axis direction.

17. The camera device of claim 4, wherein the variable lens part and the lens holder are overlapped with the holder in the optical axis direction.

18. The camera device of claim 4, wherein the variable lens part comprises a variable lens holder coupled to the variable lens, and
- wherein the first region of the first connection terminal extends to an inner side of the variable lens holder.

19. An optical apparatus, comprising:
- a main body;
- the camera device of claim 4 disposed on the main body; and
- a display unit outputting an image photographed by the camera device.

20. The camera device of claim 4, wherein the third connection terminal is disposed between the first terminal and the second terminal of the second connection terminal.

* * * * *